United States Patent [19]

McCauley

[11] Patent Number: 5,059,568
[45] Date of Patent: Oct. 22, 1991

[54] INTERCALATED CLAY HAVING LARGE INTERLAYER SPACING

[75] Inventor: John F. McCauley, Louisville, Md.

[73] Assignee: UOP, Des Plaines, Ill.

[21] Appl. No.: 583,788

[22] Filed: Sep. 17, 1990

Related U.S. Application Data

[63] Continuation-in-part of Ser. No. 304,319, Jan. 31, 1989, Pat. No. 4,957,889, which is a continuation-in-part of Ser. No. 21,972, Mar. 5, 1987, Pat. No. 4,952,544.

[51] Int. Cl.$^5$ .................. B01J 21/16; B01J 29/04
[52] U.S. Cl. ........................... 502/65; 502/63; 502/68; 502/73; 502/84
[58] Field of Search .............. 502/63, 65, 68, 73, 502/84

[56] References Cited

U.S. PATENT DOCUMENTS

| | | | |
|---|---|---|---|
| 4,176,090 | 11/1979 | Vaughan et al. | 252/455 |
| 4,216,188 | 8/1980 | Shabtai et al. | 423/118 |
| 4,238,364 | 12/1980 | Shabtai | 252/455 |
| 4,248,739 | 2/1981 | Vaughan et al. | 252/455 |
| 4,271,043 | 6/1981 | Vaughan et al. | 252/455 |
| 4,436,832 | 3/1984 | Jacobs et al. | 502/84 |
| 4,452,910 | 6/1984 | Hopkins et al. | 502/84 |
| 4,510,257 | 4/1985 | Lewis et al. | 502/63 |
| 4,579,832 | 4/1986 | Shabta et al. | 502/84 |
| 4,753,909 | 6/1988 | Bousquet et al. | 502/84 |

FOREIGN PATENT DOCUMENTS 58-55332 4/1983 Japan .

OTHER PUBLICATIONS

Lahav, Shani, and Shabtai, *Clay and Clay Minerals* 1978 26(2), 107–116.
Brindley and Sempels, Clay Minerals, 1977, 12, 229, Zirconium oligomers.
Yamanaka and Brindley, Clay and Clay Minerals, 1979 27(2), 119 Imekik, B. et al., "Catalysts by Acids and Bases": Elsevier Science Publishers Amsterdam, The Netherlands, 1985.
Occelli, M. L. Ind. Eng. Chem. Prod. Res. Dec. 1983, 22 (553).
Tokarz, M. and J. Shabatai, Clays and Clay Minerals, vol. 3, No. 2 (1985), pp. 89–98.
Pinnavaia, T. J., "Intercalated Clay Catalysts", Science vol. 220, pp. 365–371 (1983).
Pinnavia, T. J., "New Chromia Pillared Clay Catalysts", J. Am. Chem. Soc. (1985) 107, pp. 4783–4785.
Chemical Abstracts 104:96367x (1986).
Chemical Abstracts 104:50491x (1986).
Chemical Abstracts 102:45425h (1985).
Baes, C. F., Jr., and Mesmer, R. E., "The Hydrolysis of Cations", John Wiley and Sons Inc., New York, N.Y. 1976.
Plee, D. et al., J. Am. Chem. Soc. 1985, 107, 2362.
Shabtai, Massoth, Tokarz, Tasai and McCauley, 85h Int'l Congress on Catalysts (Jul. 2–6, 1984), Proceedings, vol. IV, pp. 735–745.
McCauley, J., "Catalytic Cracking Properties of Cross-Linked Montmorillonite (CLM) Molecular Sieves", MSc. Thesis, University of Utah, Salt Lake City, Utah 1983.

*Primary Examiner*—Carl F. Dees
*Attorney, Agent, or Firm*—Thomas K. McBride; John F. Spears

[57] ABSTRACT

Hydrothermally stable intercalated clays having interlayer (gallery) spacings of about 16 to 18 angstroms or more are provided by pillars comprising aluminum and cerium. Other pillaring metal/rare earth combinations and differing preparation conditions, such as pH, result in different interlayer spacings. Interlayer spacings of 16 to 40 or 18 to 50 angstroms may be produced.

14 Claims, 22 Drawing Sheets

X-RAY DIFFRACTION SCAN

X-RAY DIFFRACTION SCAN
$d_{001} = 18.0 \text{ Å}$
INTERCALATED CLAY
(OLIGOMER: CHLORHYDROL ONLY)

X-RAY DIFFRACTION SCAN
$d_{001} = 27.4 \text{ Å}$
INTERCALATED CLAY
(OLIGOMER: CHLORHYDROL-CERIUM)

INTERCALATED CLAY HAVING LARGE INTERLAYER SPACING

CROSS REFERENCE TO RELATED APPLICATION

This application is a continuation-in-part of application Ser. No. 304,319 filed Jan. 31, 1989, (now U.S. Pat. No. 4,957,889) which was a continuation-in-part of application Ser. No. 021,972, filed Mar. 5, 1987 (now U.S. Pat. No. 4,952,544).

FIELD OF THE INVENTION

The invention relates to intercalated clays and to methods of preparing such intercalated clays.

This invention also relates to alumina oligomers used in the preparation of the aforementioned intercalated clays which also demonstrate independent utility.

Layered naturally occurring and synthetic smectites, such as bentonite, montmorillonites and hecorites, may be visualized as a "sandwich" composed of two outer layers of silicon tetrahedra and an inner layer of alumina octahedra. These "sandwiches" or platelets are stacked one upon the other to yield a clay particle. Normally this arrangement yields a repeated structure about every nine and one-half angstroms. Pillared or intercalated clays are produced by the insertion of "pillars" of inorganic oxide material between these layers to provide a larger space between the natural clay layers.

The subject invention relates to the production of pillared clays having a wider layer spacing, and increased hydrothermal stability, as compared to prior art pillared clays.

Prior Art

U.S. Pat. No. 4,753,909 issued to Jacques Bousquet et al. (assigned to Elf France, equivalent to Belgium Patent 905,662 of Feb. 16, 1987) describes "bridged" clays having improved thermal stability and useful as cracking catalysts. The materials of this reference do not appear to have the interlayer spacing of clays of the subject invention. Furthermore, the subject pillared clays have pillars formed of both specified pillaring metals and a separate rare earth which confers exceptional hydrothermal stability and surface area retention when exposed to high temperature steam.

Intercalated clays have been prepared by replacing the exchangeable cations of the original clay with aluminum oligomers [U.S. Pat. Nos. 4,176,090; 4,248,739; 4,216,188; Lahav, N., Shani, U., and Shabtai, J. S., *Clay and Clay Minerals*, 1978, 26(2), 107; Lahav, N., and Shani, U., *Clay and Clay Minerals*, 1978, 26(2), 116; and Brindley, G. W., and Sempels, R. E., *Clay Minerals*, 1977, 12, 229] Zirconium oligomers [Yamanaka, S., and Brindly, G. W., *Clay and Clay Minerals*, 1979, 27(2), 119] and chromium oligomers (U.S. Pat. No. 4,452,901). The concept used is that aluminum cations hydrolyze and, through the addition of base to increase pH (see U.S. Pat. No. 4,176,070, Examples 16 and 21 and column 4, line 9), an oligomer of large molecular weight would form. Information on the deactivation and regeneration behavior of these catalysts is not well documented, however, it is generally recognized that they are not hydrothermally stable. (Imelik, B., et al., "Catalysis by Acids and Bases", Elsevier Science Publishers, Amsterdam, The Netherlands, 1985; and Occelli, M. L., *Ind. Eng. Chem. Prod. Res. Dev.*, 1983, 22, 553).

It is known that 2:1 layered clays (e.g., bentonite, montmorillonite, and hectorite) can be intercalated to yield catalysts that exhibit activity and selectivity. The problem of insufficient thermal and hydrothermal stability of these clays is also well known (see Occelli, Marlo L., ibid., 533–559 and FIGS. 4 and 5). The pillars of these clays collapse at temperatures of over 650° C. due to dehydroxylation and possible cation migration replacing aluminum.

Of the above-mentioned oligomers, aluminum oligomers have apparently been researched the most extensively. These oligomers can be formed in a variety of ways involving hydrolysis of the aluminum cation and are commercially available. During hydrolysis many cationic species are formed. Their equilibrium concentrations are very dependent upon temperature and pH. The maximum concentration of a desired species may be in a very narrow range of these variables. In addition, the species cannot be easily isolated or identified. If conditions are favorable, hydrolysis of the aluminum cation will proceed to form highly charged species [e.g., $Al_2(OH)_2^{4+}$, $Al_3(OH)_4^{5+}$ and $Al_{13}O_4(OH)_{24}^{7+}$] (See Baes, C. F., Jr., and Mesmer, R. E., "The Hydrolysis of Cations", John Wiley and Sons, Inc., New York, N.Y., 1976.) Of particular interest is the cation $Al_{13}O_4(OH)_{24}^{7+}$. From NMR studies, this species has been found to be the oligomer species responsible for the typical $d_{001}$ spacing of 18 Å in intercalated clays, (Plee, D., et al., *J. Am. Chem. Soc.* 1985, 107, 2362). The structure of this cation is a central four-coordinated aluminum atom surrounded by twelve $AlO_6$ octahedra joined by common edges to form a Keggin-type structure. Because of its large charge and size it can easily replace exchangeable cations from the clay. Upon heating this oligomer forms a pillar of alumina yielding an intercalated clay with the characteristic $d_{001}$ spacing with 18 Å. At temperatures above 650° C., dehydroxylation occurs and the pillars collapse (i.e., the intensity of $d_{001} = 18$ Å disappears).

Lahav, N., Shani, U., and Shabtai, J. S., ibid., p. 108, discloses that in the in situ formation method, the relevant metal cation is introduced into the clay exchange complex followed by in situ transformation into the hydroxide by raising the pH. In the crosslinking method, the metal hydroxide oligomer (polymorph) is prepared separately and then interacted with the clay particles, leading to the formation of a crosslinked framework. Application of the in situ method, which can be considered as a simulated natural process, leads to slow, gradual formation of the interlayered structure, whereas in the crosslinking method, the metal hydroxide oligomers crosslink the clay platelets in a fast reaction and the product is obtained almost instantaneously. If a freshly prepared metal hydroxide solution is used in the crosslinking method, both the in situ sequence and crosslinking probably take place, since the formation of stable oligomeric species is a slow process.

U.S. Pat. No. 4,510,257 (Lewis et al.) discloses a clay composition having silica pillars intercalated between the layers of an expandable, swelling, layer, lattice clay mineral or synthetic analogue thereof. The silica pillars have at least two silicon atom layers. The clay composition is prepared by contacting a smectite type clay with a solution of a polyhedral oligosilsesquioxane of the following general formula $(ZSiO_{1.5})_n(OSiZ_2)_m$, wherein n and m are zero or integers and n+m does not equal zero and Z is an organic moiety containing an atom(s) possessing cationic and/or coordinating characteristics with the proviso that all of the Z's on a particular oligosilsesquioxane need not be the same. A cracking catalyst is disclosed which is the silica intercalated clay product functionalized with ions which are hydrogen or the rare earth elements.

U.S. Pat. No. 4,176,090 (Vaughan et al. I) discloses pillared interlayered clay compositions which are prepared by reacting smectite-type clays with polymeric cationic hydroxo metal complexes of metals such as aluminum, zirconium and/or titanium. The interlayered clay compositions which possess substantial surface area in pores of less than 30 Å in diameter are used as catalysts, catalytic supports and sorbents. The interlayered smectite can be prepared by reacting a smectite with a mixture of a polymeric cationic hydroxo inorganic metal complex, which is comprised of aluminum or zirconium complexes or mixtures thereof, plus water. The interlayered smectite is separated from the mixture. Column 6, lines 28 to 32, discloses that the intercalated clays are particularly useful in the preparation of catalysts which contain active/stabilizing metals such as platinum, palladium, cobalt, molybdenum, nickel, tungsten, rare earths and so forth.

U.S. Pat. No. 4,271,043 (Vaughan et al. II) is a continuation-in-part of U.S. Pat. No. 4,176,090 and also discloses the use of the copolymerization of ammonium and alkali metal hydroxides, carbonates, silicate and borate. Vaughan et al. II describes a process for preparing a pillared interlayered clay product having a high degree of ion exchange capacity. A smectite clay is reacted with a mixture of a polymeric cationic hydroxo metal complex, such as, polymeric cationic hydroxo aluminum and zirconium complexes, and water to obtain a pillared interlayered smectite. The interlayered smectite is calcined to obtain an interlayered clay product having greater than 50 percent of its surface area in pores less than 30 Å in diameter. The calcined interlayered clay product is reacted with a base to increase the ion exchange capacity thereof. Some of the examples show the calcined interlayered clay being impregnated or exchanged using La(NO$_3$)$_3$ or LaCl$_3$.

U.S. Pat. No. 4,248,739 (Vaughan et al. III) is a continuation-in-part of U.S. Pat. No. 4,176,090. Vaughan et al. III discloses a method for preparing a pillared interlayered smectite clay product wherein a smectite clay is reacted with a mixture of polymeric cationic hydroxo metal complex and water to obtain a pillared, interlayered smectite having greater than 50 percent of its surface area in pores of less than 30 Å in diameter after dehydration. The polymeric cationic hydroxo metal complex is a high molecular weight cationic hydroxo metal complex and copolymers thereof having a molecular weight of from about 2000 to 20,000. Example 3 hydrolyzes and polymerizes the aluminum chlorhydroxide by the addition of magnesium metal. Example 4 prepared a mixed Al-Mg polymer for pillaring interlayered smectite by dissolving AlCl$_3$.6H$_2$O and MgCl$_2$.H$_2$O in deionized water and drying at 250° F.

U.S. Pat. No. 4,452,910 (Hopkins) discloses a process for the preparation of stabilized, porous expanded layer, smectite clays. An aqueous slurry of smectite clay is contacted with an aged chromium-oligomer solution. A product clay is separated from the mixture. The product clay is dried, and is then stabilized by an inert gas atmosphere heat treatment, which includes a temperature above about 200° C. to effect the production of a stabilized clay. The product is a porous catalytic material composed of a smectite clay having expanded molecular layers with a multiplicity of chromium-base "pillars" interposed between the molecular layers of the smectite clay.

U.S. Pat. No. 4,216,188 (Shabtai et al. I) discloses a process for the production of molecular sieves by reacting a colloidal solution of a monoionic montmorillonite having a concentration of 100 to 800 mg montmorillonite per liter, in the form of fully dispersed negatively charged unit layers at room temperature, with an aged sol of a metal hydroxide which has been aged for at least 5 days at ambient temperature. The metal hydroxide is aluminum hydroxide or chromium hydroxide. The reaction is conducted at a pH adjusted below the zero charge point having a residual net positive charge on the metal hydroxide, and under vigorous agitation, resulting in a rapid flocculation of the montmorillonite crosslinked with the metal hydroxide. The product is separated from the liquid phase and stabilized by heat treatment.

U.S. Pat. No. 4,238,364 (Shabati II) describes a cracking catalyst comprising a crosslinked smectite framework material functionalized with acid ions selected from the group consisting of the ions of hydrogen and rare earth elements. The preparatory method includes: preparing an acidic form of smectite clay including ions selected from the group consisting of hydrogen, cerium, gadolinium, lanthanum, neodymium, praseodymium, and samarium; crosslinking the acid form of smectite with oligomeric species of aluminum hydroxide; and stabilizing the crosslinked acidic form of smectite. Column 4, lines 15 to 23, of Shabtai II explains the difference between interlayer and lateral distance. As explained on line 54 of column 4, Shabtai II has obtained an interlayer spacing of 9 Å. The lateral distance of 8 to 30 Å mentioned in Shabtai II is the distance between the pillars as calculated by the ratio of reactant to clay (i.e., fully or partially reacted clay). In Claim 12 Shabtai II clarifys the matter of the 8 to 30 Å as being the lateral distance in the interlayer space so as to provide a measure of the effective lateral (between the pillars, not between the layers of the clay) pore size. Referring to the drawings and col. 4, lines 15 to 23, the lateral distance (E) is termed the interpillar distance.

U.S. Pat. No. 4,579,832 (Shabtai et al.) describes a hydroprocessing catalyst possessing activity hydrocracking and/or hydrogenation activity. The catalyst includes a cross-linked smectite framework material prepared through interaction of the polyanionic smectite layers with oxygen containing oligomeric cations, that is, oligomeric hydroxo metal cations or oxo-metal cations. The catalyst also includes incorporated interlamellar components consisting of preselected combinations of catalytically active transition metal derivatives selected from the group consisting of Mo, Cr, Ni, Co, W and other transition metals. The transition metals are present in the form of metal derivatives selected from the group consisting of oxygen containing oligomers and oligomeric cations, and cations selected from the group consisting of mononuclear cations and binuclear cations. The catalysts can have lateral pore sizes of 11 to 35 Å. Since Shabtai et al. used hydroxo aluminum oligomer, its intercalated clays had an interlayer distance of about 9 Å.

U.S. Pat. No. 4,753,909 (Bousquett et al) teaches clays of limited structure bridged by metallic oxides selected from oxides of aluminum and zirconoium and containing from 10 to 50% and preferrably 20–40% of an oxide of the metal of the group of lanthanides, preferablly of cerium. The metallics produced have relatively no hydrothermal stability as shown by the data provided and require an extraordinarily high mol percent cerium.

Shabtai, J., F. E. Massoth, M. Tokarz, G. M. Tsai and J. McCauley, 8th International Congress On Catalysts, (July 2-6, 1984), Proceedings, Vol. IV, pp. 735-745, discloses a series of cross-linked hydroxo-Al montmorillonite having basal spacings of 1.75 to 1.95 nm and surface areas of 300 to 500 m$^2$/g after heat treatment at temperatures of up to 873° K. The series of pillared clay was in Ce$^{3+}$-, La$^{3+}$-, Li$^+$- and Na$^+$/Ca$^{2+}$- forms. The first three forms were formed by ion exchanging Na$^+$/Ca$^{2+}$-montmorillonite with aqueous solutions of CeCl$_3$, LaCl$_3$, LaCl$_3$ and LiCl, respectively. The pillared clays had catalytic cracking activity. Details of some of the techniques and procedures were stated to be in McCauley, J., "Catalytic Cracking Properties Of Cross-Linked Montmorillonite (CLM) Molecular Sieves", MSc. Thesis, University of Utah, Salt Lake City, Utah (1983).

Tokarz, M. and J. Shabtai. Clays And Clay Minerals, Vol. 3, No. 2, (195), pp. 89-97, discloses partially hydroxo-Al montmorillonites prepared by the reaction of hydroxo-Al oligocations with Ce$^{3+}$- and La$^{3+}$- exchanged montmorillonites.

U.S. Pat. No. 4,436,832 (Jacobs et al.) relates to a bridged clay catalyst and a method of making it. The method consists of subjecting a mixture of an aqueous solution of at least one metal hydroxide and aqueous clay suspension to dialysis. (The hydroxide solution can be prepared before it is mixed with the clay suspension or by adding the hydroxide solution precursors to the clay suspension.) The clay catalyst is used for conversion of paraffinic or olefinic hydrocarbons. The hydroxides can be selected from the group formed by the hydroxides of the elements of groups IIB, IIIB, IVB, VB, VIB, VIIB, VIIIB, IA, IIA, IIIA, IVA, VA and VIA of the periodic table of the elements. Example 4 uses Ho(NO$_3$)$_3$.6H$_2$O.

Pinnavia, T. J., "Intercalated Clay Catalysts", Science, Vol. 220, pp. 365-371, (1983) describes that intercalation of polynuclear hydroxo metal cations and metal cluster cations in smectites to produce pillared clay catalysts having large size pores. Page 366, while not dealing with pillaring, states that the hydrated cations on the interlameller surfaces of the native minerals can be replaced with almost any desired cation by utilizing simple ion exchange methods and that homoionic exchange derivatives are readily achievable with simple hydrated cations, including hydrated transition metal ions. Pinnavia also stated that, although polynuclear hydroxo metal ions formed by hydrolysis in aqueous solution can yield pillared clays with interlayer free spacings, the number of metals that form suitable oligomeric species is limited. New approaches to the pillaring of smectite clays promise to extend the number of pillaring species. Page 371 states that an approach involving hydrolysis and oxidation of metal cluster cations, such as Nb$_6$C$_{12}$$^{2+}$ and Ta$_6$C$_{12}$$^{2+}$, affords clay pillared by small custers of metal oxide approximately 10 Å in diameter and stable to about 400° C.

Japanese Kokai 58-55,332 shows a heat-resistant modified smectite clay catalyst with a large surface area, having a trinuclear ferric acetate cation. This clay catalyst is prepared by using bentonite modified montmorillonite in aqueous solution.

Pinnavia, T. J., "New Chromia Pillared Clay Catalysts", J. Am. Chem. Soc. (1985) 107, pp. 4783-4785 describes a method of making chromia pillared clays wherein solutions containing cationic polyoxychromium oligmers were prepared by the hydrolysis of chromium nitrate using Na$_2$CO$_3$ as the base. To this solution was added typical smectite. Chromium was maintained in large excess during the pillaring reaction and after a reaction time of 1.5 hours, products were collected by centrifugation and washed free of excess salt.

Chemical Abstracts. 104:96367x (1986), states that Zr-pillared clays are more stable than equivalent Al-pillared clays. Chemical Abstracts. 104:88077e (1986), also deals with Zr-containing pillared interlayer clays. Chemical Abstracts, 104: 50491x (1986), states that, in the conversion of trimethylbenzenes, the selectivity of montmorillonites pillared by aluminum and zirconium oxides is not dependent upon interlayer distance. Chemical Abstracts. 102:45425h (1985), deals with pillaring smectite clay using polyoxo cations of aluminum.

BRIEF SUMMARY OF THE INVENTION

The invention provides a novel intercalated or pillared clay characterized by a large interlayer spacing and also by excellent hydrothermal stability. The clay of the subject invention possesses an interlayer spacing greater than about 16 angstroms and preferably in the range of about 16 to 18 angstroms. The pillars will contain a rare earth element, oxygen, and a second metal such as aluminum, zirconium, chromium or iron.

DETAILED DESCRIPTION OF THE INVENTION

Figure 1:
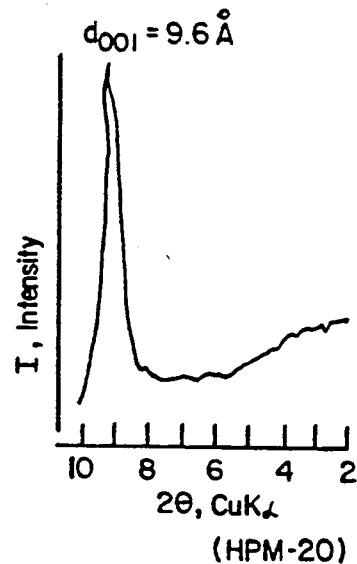
FIG. 1 is an X-ray diffraction scan of unreacted bentonite.

The product of the invention is a hydrothermally stable microporous catalytic material composed of a layered, colloidal clay having expanded molecular layers with a multiplicity of pillars interposed between the molecular layers of the clay. The pillars, which are themselves novel and exhibit independent utility, are composed of aluminum, at least one rare earth element, oxygen and/or a halogen. The aluminum can be replaced in part or total by other suitable, pillaring metals, such as, chromium and zirconium. The product has relatively large pores and possesses considerable internal micropore volume. The intercalated clays of the invention are excellent cracking catalysts for heavy cracking oils. The pillars maintain the spacing of the expanded molecular layers of the clay even at temperatures as high as 1450° F., with the intercalated clay maintaining its surface area and cracking catalytic activity. The invention material can also be described as a molecular sieve framework prepared by intercalating clay unit layers with oligomeric or polymeric species. Upon intercalation, the material is dried and subjected to heat treatment to stabilize the expanded layers. The open, porous network of the expanded clay is stabilized by the intercalated aluminum-rare earth element-oxygen structures between the interlayers of the clay. The oligomers are ion exchanged with the clay. The three-dimensional pillars are composed of stable inorganic polymers of (i) aluminum or other pillaring metal(s), (ii) rare earth element(s) and (iii) oxygen and/or halogen. While the pillars preferably contain oxides of aluminum, other suitable polyoxocations (for example, of Zr and Cr) can be used.

The term "intercalation" is a term of art which indicates the insertion of a material between the layers of a clay substrate. Leoppert, Jr., et al., Clays and Clay Minerals, 27(3), 201–208 (1979), is an example of a reference which uses the term in the same way it is used herein.

The invention is based upon preparing microporous materials by interlayering expandable, colloidal clay minerals with novel oligomeric molecules derived from trivalent rare earth salts and the hydrolysis of polyvalent cations such as Al$^{+3}$. As can be readily seen elsewhere herein, other preparation methods, other pillaring metals and rare earth salts having other oxidation states can be used. The invention intercalated clay is activated once it is reacted (formed) and could then even be used in slurry form for separations.

The forms of smectite clays with pillars based upon aluminum-oxygen (just aluminum and oxygen) derivatives exhibit d$_{001}$ spacings of about 18 Å. Neither spacing is sufficient for large molecules as incur in heavy cracking oils. The pillared invention product has pore heights generally of 16 to 40 Å, although the pore heights can be as low as about 10 Å or as large as about 50 Å. (Different clays will provide different pore sizes.) The pore heights secured with montmorillonite are about 18 Å (which is a very advantageous size). As montmorillonite pillared with aluminum-oxygen oligomers has a pore height (that is, interlayer distance) of about 8.5 Å, the inclusion of a rare earth element with the aluminum and oxygen in a pillar doubles the expansion over the Al-O pillared clay. This advantage, which is unexpected from the prior art teachings, provides an excellent cracking catalyst for heavy cracking oils.

One embodiment of the invention may be characterized an intercalated smectite clay having pillars comprising at least one rare earth metal and also characterized by an interlayer spacing greater than about 16 but less than about 40 angstroms.

Yet another embodiment of the invention may be characterized as an intercalated clay having pillars which comprise a rare earth metal and a metal chosen from the group consisting of aluminum, chromium and zirconium and also characterized by an interlayer spacing of about 16–18 angstroms.

If there is insufficient reaction in the formation of the invention pillared clay, some of the pillars may only be of the aluminum-oxygen derivative type with the accompanying local areas or points of smaller d$_{001}$ spacing.

As the feedstocks for refiners become heavier, diffusion restrictions in the catalyst become more important. For example, the micropore diameter of Y-type zeolites is limited to about 9 Å. This excludes large molecules, such as those found in heavy residuals, from entering its pore system. Because of diffusion limitations inherent to Y-type zeolites the invention intercalated clay catalysts which exhibit different pore sizes and geometries from Y-type zeolites were developed. The invention catalysts have increased LCO selectivity, and exhibit improved bottoms cracking relative to Y-type zeolites.

The trend in the industry is to use heavier crudes having larger molecules and higher boiling temperatures (ranges), so more coke is inherently formed and, accordingly, higher temperatures are needed to burn off the deposited coke. This means that the industry needs catalysts which are more thermally stable.

The clays useful in the invention are crystalline, expandable, colloidal clays or clay minerals, and have ion exchange capacity. The clays should be of the three-layer type, namely, sheet structures composed of two layers of silica tetrahedrons and one central alumina dioctahedral or trioctahedral layer. This type of clay includes equidimensional expanding lattice forms (e.g., the montmorillonite groups, such as, montmorillonite and sauconite) and the elongate expanding lattice forms (e.g., the montmorillonite groups, such as nontronite, saponite and hectorite). Vermiculite is believed to not be useful in the invention. The useful clays can be natural or synthetic forms.

The invention is especially useful with clays which are swellable clays generally known as smectites. The unit layer oI smectite, such as, montmorillonite, is composed of two silica tetrahedral sheets and a central alumina octahedral sheet. (Such type of clay is termed a 2:1 layered clay.) The simplified formula, without considering lattice substitutions, is $Si_8Al_4O_{20}(OH)_4 \cdot nH_2O$, wherein n is usually a whole number. In reality, however, there are isomorphic substitutions within the lattice, e.g., replacement of aluminum by magnesium or iron, and in particular, substitution of silicon by aluminum. The leads to a net negative charge on the smectite layers which is compensated for by exchangeable cations situated between the unit layers.

The intercalated or bridged clays of the invention possesses catalytic activity and catalytic selectivity which are superbly suitable for the cracking of heavy feed stocks. The invention provides catalysts with greater light cycle oil (LCO) selectivity and bottoms cracking than Y-type zeolites. In addition, the invention catalysts can be synthesized from inexpensive, commercially-available materials using a simple process. The intercalated clay/zeolite of the invention is a compatible system exhibiting desirable synergisms (e.g., less $C_1$–$C_4$ and more gasoline).

The invention provides hydrothermally stable cracking catalysts with larger pore diameters than conventional zeolites, as is required for the cracking of heavy feed stocks.

An advantage of the product of the invention is that it does not have to be stabilized by means of thermal treatment in an inert gas atmosphere. The intercalated clay is active upon being formed—the follow up steps are to drive off the solvent and to stabilize the product.

The hydrothermally stable intercalated clays of the invention do not have the prior art problem of their pillars collapsing at over the dehydroxylation temperature. The invention intercalated clays have commercial potential as hydrothermally stable large pore materials.

Another embodiment of the invention is that the invention intercalated clays contain different catalytic combinations and/or ions which have been incorporated inside of the interlamellar space thereof. Or in other words, catalytic activity is provided in such interlamellar space by incorporating essential components consisting of different catalytically active transition metal derivatives or combinations thereof, such as, hydroxo-M or sulfhydro-M oligomers or oligomeric cations (where M is one or different combinations of molybdenum, chromium, nickel, cobalt, tungsten or other transition metal), and/or simple mono or binuclear transition metal ions, such as, those of nickel, cobalt, molybdenum, chromium or other transition metals in such interlamellar space. This embodiment of the invention provides hydrothermally-stable hydroprocessing catalysts. Such invention catalysts possess high activity for hydrotreatment and/or hydrocracking of organic molecules present in heavy petroleum fractions, synthetic fuels and other heavy oils have the high catalytic activity of this invention for bulky organic molecules (kinetic diameters, 10 to 30 Å). The lateral pore size of the invention can range generally from about 11 to about 35 Å by varying the amount of oligomer and clay in the preparation of the intercalated clay.

The clay used in preparing the intercalated clay can be ion exchanged with at least transition metal. Alternatively, the oligomers used in preparing the intercalated clay can be isomorphically substituted with at least one transition metal during the formation of the oligomers. The intercalated clay, that is, its pillars and clay layers, can be ion exchanged or isomorphically substituted with at least one transition metal. This can be achieved by, for example, preparing a solution of a soluble compound, such as a sulfide, of at least one transition metal in a solvent, such as water, and reducing at least one transition metal compound with at least one reducing agent, such as hydrogen.

The invention also includes a hydroprocessing catalyst composition of 0.1 to about 40 weight percent of at least one zeolite and about 60 to about 99.9 weight percent of the intercalated clay. Both components are usually in particulate form. The intercalated clay can have been ion exchanged and/or isomorpically substituted with at least one transition metal.

The invention further includes a hydroprocessing catalyst composition of 0 to about 40 (also 0.1 to about 40) weight percent of at least one zeolite, 0.1 to about 30 weight percent of alumina and the remainder (about 30 to 99.9 weight percent) of the invention intercalated clay. All of the components are usually in particulate form. The intercalated clay can have been ion exchanged and/or isomorpically substituted with at least one transition metal. The inclusion of alumina provides a hydroprocessing catalyst composition with much enhanced stability.

The intercalated compositions of the invention are types of non-zeolitic molecular sieves having three dimensional microporous framework structures.

Figure 22:
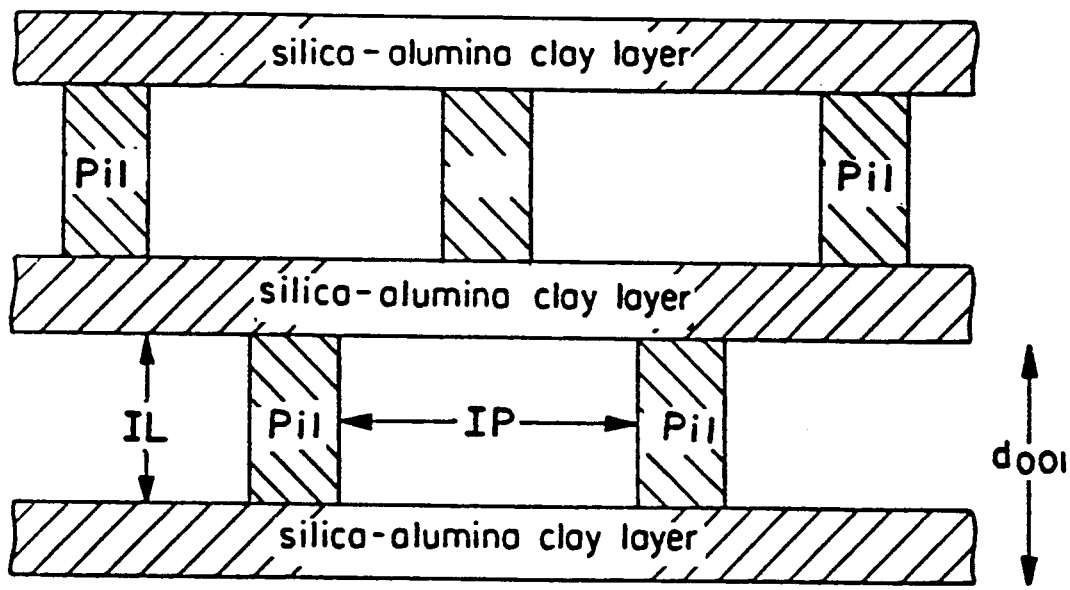
FIG. 22 is a schematic illustration of a cross-section of the intercalated clay (bentonite) of the invention.

In FIG. 22, there is a schematic of a cross-section of the aluminum-rare earth element-oxygen pillared clay (bentonite) of the invention. In the figure, $d_{001}$ is the distance between the bottom of two adjacent silica-alumina clay layers, Pil is an aluminum-rare earth element-oxygen pillar, IL is interlayer spacing or distance and IP is the lateral or interpillar distance or spacing.

In the subject clays the interlayer distance IL is larger and pillars have a crystalline structure as shown by X-ray patterns.

In the invention, hydrothermally stable intercalated clay is prepared by reacting a 2:1 layered clay with an oligomer prepared by copolymerizing soluble rare earth salts with a cationic metal complex of aluminum. The preferred 2:1 layered clays have a layer charge, x, of about 0.5 to 1. (Vermiculite has a layer charge, x, of about 1 to 1.5. Also, vermiculite is not a colloidal clay) Preferably the clay is added to a solution of the oligomer.

The intercalated clays of the invention are improved over the prior art because they have significantly higher hydrothermal stability than previously made clays as reflected by their higher surface areas and conversions after 1400.F steaming. In the invention, it is believed that, for example, if cerium cations are complexed or reacted with aluminum chlorhydroxide, (or, more broadly, with Al cations which have been hydrolyzed), the cerium will be incorporated into the structure of the oligomer. The invention data implies that this has a stabilizing effect (perhaps by preventing cation migration through obstruction). Steaming simulates deactivation.

The X-ray diffraction scan of aluminum chlorhydrol exhibits a single broad peak whereas the invention exhibits two sharp peaks. This material is unique over aluminum chlorohydrol for pillaring clay because it produces a catalyst that has larger pore openings and is more hydrothermally stable.

The invention utilizes polymeric cationic hydroxo inorganic metal complexes, polymers or copolymers in the preparation of of the novel oligomers, that is, in conjunction with the soluble rare earth salts. The preferred polymeric cationic hydroxo inorganic metal complexes are basic aluminum complexes formed by the hydrolysis of aluminum salts, basic zirconium complexes formed by the hydrolysis of zirconium salts, and basic chromium complexes formed by the hydrolysis of chromium salts. The most preferred polymeric cationic hydroxo inorganic metal complexes are the basic aluminum complexes, and the most preferred basic aluminum complex is chlorhydrol.

The best way to make this material is to mix aluminum chlorophydrol 24% $Al_2O_3$ (tradename Chlorhydrol marketed by Reheis Chemical Co.) with lanthanum chloride such that Al/La=25. This solution is then placed in a teflon Parr bomb at 130C for 4 days. Variations of this procedure is to adjust the pH of the solution or add other ionic species to produce different types of oligomers.

The desired alumina containing rare earth oligomer can be formed between the temperatures of 90 and 150° C. (over 104° C. under pressure) for 1 to 40 days with 130° C. for 4 days being preferred. The molar ratio of alumina to rare earth should be between 1 and 100 with 25 being preferred. The concentration of the reactants can vary between 24% (saturated) to 2.4% $Al_2O_3$ with 24% being preferred.

It is known that the type of rare earth used for formation of the oligomer can have a pronounced affect on the resulting structure. The crystallinity of the oligomer (see FIG. 23-26) decreases from lanthanum (most crystalline) to Neodymium (least crystalline).

The structure of this material can be altered by pH and by other ions present. The molar ratio of aluminum to chloride of Chlorhydrol (aluminum chlorohydrol) is 2:1. Variations of this ratio will produce different structured oligomers as indicated by X-ray diffraction scans of pH adjusted oligomers. Specifically, a solution refluxed such that Ce/OH=11 and Al/Ce=20 produced an oligomer with a X-ray diffraction scan vary different from one without pH adjustment (compare FIG. 24 to FIG. 28).

In addition, cations (e.g., iron, nickel, silicon, and magnesium) can make isomorphic substitutions for aluminum thereby altering the characteristics of the oligomer. The extent of replacement is determined by equilibria. However, substitutions for aluminum is thermodynamically favored by elements of similar size and charge. Other cations such as lithium can also alter the structure depending on their concentrations. Also, anions (phosphate, flouride, hydroxide, and carbonate) can displace chloride from the oligomer's structure thereby altering its structure. Pillared clay resulting from the altered oligomers possess different chemical and physical properties than clay containing unaltered oligomers. For Example, pillared clay containing 1% chloride is an excellent binder. Pillared clay that has had its chloride removed by carbonate substitution is a very poor binder. Small quantities of fluoride (Al/F=1000) in the oligomer can result in pillared clay with different acidity and binding properties.

For example, the aluminum portion of the reactant solution could be substituted in all or part by zirconium, chromium, and titanium since these elements are also know to form large polymeric species.

It is theorized that since aluminum cations species are in equilibrium with each other as a function of pH, concentration, and temperature it is expected that structures not yet found exists. Any cation that exists at the concentrations and pH range of the alumina-rare earth oligomer and capable of making ismoorphic substitutions for aluminum could be copolymerized and incorporated into that oligomer's structure. However, the basic composition of the oligomer remains aluminum, rare earth, oxygen, and/or a halogen.

The basic aluminum, zirconium and chromium complexes can be used alone or in combinations. [Any cation, anion or colloidal material that can exist at the concentrations and pH of the salt (e.g., aluminum, zirconium or chromium) that forms an oligomer can be copolymerized and incorporated into the structure of the oligomer. The key is if the species obstructs or inhibits cation migration (thereby stabilizing the system).]

A suitable class of the inorganic aluminum complexes or polymers are those having the general formula $Al_{2+n}(OH)_{3n}X_6$, wherein n has a value of about 4 to 12, and X is usually Cl, Br and/or $NO_3$. These inorganic metal polymers are generally believed to have an average molecular weight on the order of from about 2000 and larger.

To date the preferred inorganic aluminum complex has been aluminum chlorhydroxide.

A suitable class of the zirconium complexes used to prepare pillared interlayed clay products of the invention has the following general formula: $[Zr_4(OH)_{12}(H_2O)_{12}]^{+4}$. Aqueous solutions of zirconyl chloride, $ZrOCl_2$ contain tetrameric hydroxo complexes of the type $[Zr_4(OH)_{16-n8}]^{n+}$, the charge per Zr atom being n/4.

The preparation of the above-noted aluminum and zirconium complexes and polymers is generally known to those skilled in the art and is disclosed, for example, in the following references:

(a) Tsuitida and Kobavashi. J. Chem. Soc. Japan (Pure Chem. Sect.), 64, 1268 (1943), discloses the reaction of solutions of $AlCl_3.6H_2O$ or HCl with an excess of metallic aluminum:

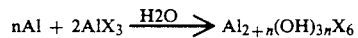

(b) Inove, Osugi and Kanaya. J. Chem. Soc. Japan (Ind. Chem. Sec.), 61, 407 (1958), discloses that more than an equivalent amount of aluminum hydroxide is reacted with an acid:

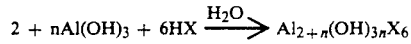

(c) H. W. Kohlschuter et al., Z. Anorg. Allgem. Chem., 248, 319 (1941), describes a method wherein alkali is added to an aluminum salt solution:

(d) T. G. Cwe Bero. X. Anorg. Allgem. Chem., 269, 213 (1952), discloses a procedure wherein an aqueous solution of $AlX_3$ is passed through an ion exchange column of OH-form.

(e) German Patent No. 1,102,713 describes extended heating at about 150° C. of salts, such as $AlCl_3.6H_2O$.

(f) A. Clearfield and P. A. Vauohan, Acta Cryst. 9, 555 (1956).

(g) A. N. Ermakov, I. N. Marov, and V. K. Belvaeva, Zh. Neorgan, Khim. 8, (7), 1923 (1963).

(h) G. H. Muha and P. A. Vauohan, J. Chem. Phys. 33, 194-9, (1960). In the above formulae, X is Cl, Br or $NO_2$.

Zirconium oligomer solutions can be prepared by the method disclosed in R. Burch et al., J. of Cat., 97, (1986), pp. 503-510. For example, solid zirconyl chloride ($ZrOCl_2.8H_2O$) on dissolution produces the tetrameric ion $[Zr_4OH)_8(H_2O)16]^{8+}$. This quickly hydrolyses to form cations with lower charge. These cations polymerize slowly at room temperature, and quite rapidly at higher temperatures, eventually resulting in the formation of hydrous zirconia. The degree of polymerization can be controlled by varying the temperature or time of ageing of the Zr solution, and the pH of the solution.

Chromium oligomer solutions can be prepared by combining a chromium salt with a hydroxyl ion source in solution. This solution is aged to allow formation of a sufficient concentration of cationic oligomers. In preparing chromium oligomer solutions, chromium salts capable of being used include the hydrated forms of chromium nitrate, chromium sulfate, and chromium chloride. The ratio of chromium salt to water is obtained by determination of the concentration of chromium oligomer necessary to produce a measurable amount of clay layer expansion. Thus, the lower limit on the quantity of chromium salt must be ascertained from the result of the "aging" step described below. The upper limit is the solubility of the salt in water. The preferred salt is chromium nitrate with a range of 6 to 72 grams per liter of oligomer solution. Furthermore, suitable sources for the hydroxyl ion component of the oligomer include ammonia, lithium hydroxide, sodium hydroxide and potassium hydroxide. The preferred combination is chromium nitrate and ammonia. When using ammonia as the hydroxyl ion source, the upper limit on pH is the largest pH attainable using concentrated ammonia. However, when using LiOH, NaOH or KOH as the hydroxy ion source, the total amount of added hydroxide should be kept below 2 moles per mole of Cr ion in order to avoid precipitation of chromium oxide.

The chromium oligomer preparation requires an aqueous mixture of at least one of the chromium salts and one of the hydroxy ion sources. This mixture also must undergo an aging treatment. Aging is not needed if the clay and oligomer are initially well dispersed.

The clay, in the preparation of the invention intercalated clays, preferably is added to a solution of the oligomer. Slurries, suspensions, dispersions and the like of the clay can also be used.

The hydrolysis-polymerization can be conducted in the presence of a base or acid which changes the pH of the reaction mixture to a pH range preferably of 2.9 to 4.0 for aluminum polymers. The pH of the starting solution goes to 3.1; one can start at pH 4 and it goes to 3.1; a starting pH of below 3.1 also goes to 3.1, but the pH shift takes longer. The further away the starting pH is from 3.1, the longer the time necessary for the formation of the oligomer. Bases, such as, ammonium hydroxide and sodium hydroxide or a base forming reactant such as magnesium metal, are added to a heated solution of the metal complex in amounts ranging from about 0.5 to 3 equivalents of base per equivalent of complex. Where the hydrolysis polymerization reaction is conducted in the presence of a base, the solutions are usually reacted at a temperature of from about 50° to 100° C. for a period of from about 0.1 to 24 hours.

Furthermore, the high molecular weight polymers can be prepared by copolymerizing an aluminum, zirconium, chromium or other pillaring metal complex with a copolymerizing reactant, such as, $SiO_3^{-2}$, $ZrO_2^{+2}$ or $BO_3^{+3}$, which can be included in the reaction mixture as sodium silicate, $ZrOCl_2$, $MgCl_3$, zirconium chloride, boric acid or sodium borate, for example. The use of Fe in the oligomer will provide a different type of catalyst. The use of Mo in the oligomer will provide a hydrogenation catalyst. The reactions are conducted in aqueous solutions which contain up to 50 percent by weight of solids and are conducted at temperatures on the order of 80° to 190° C. for periods of 1 to 100 hours. The temperature is time dependent so the balance of an effective temperature for a suitable time should be used. The surface area of the resultant intercalated clay depends upon the solids content in the reaction solution. For example: a surface area of about 250 $m^2/g$ results from a solids content of 40 weight percent; a surface area of about 300 $m^2/g$ results from a solids content of 35 weight percent; and a surface area of about 400 $m^2/g$ results from a solids content of 25 weight percent.

Additional guidance on the production of intercalated materials may be obtained from the following references:

European Published Patent Application No. 130,055 (British Petroleum Co.) describes a stabilized pillared layered clay and a process for its production. This pillared layered clay consists of a layered clay pillared by the residue of a material which has reacted with the hydroxo groups of the clay structure. The process steps are reacting under substantially anhydrous conditions in an organic solvent, a layered clay having desired hydroxo groups associated therewith, and a material capable of reacting with the hydroxo groups to leave a residue of the material in the form of pillars for the clay.

European Published Patent Application No. 83,970 (British Petroleum Co.) discloses pillared clays prepared by reacting a smectite-type clay, such as bentonite, with an aqueous solution of a polymeric cationic hydroxo inorganic metal complex, such as chlorhydrol.

U.S. Pat. No. 4,367,163 (Pinnavaia et al.) discloses silica-intercalated clay. The material is prepared by exchanging at least a portion of the native metal ions of a swelling clay with complex silicon ions and then hydrolyzing the complex silicon ions. The intercalated material can be used as a catalyst support for a rare earth.

WO 8503016 (British Petroleum Co.) discloses silanized pillared interlayered clays and a method of producing it. The clay consists of a pillared interlayered clay chemically modified by incorporation therein of a silicon containing residue. The method comprises the steps of forming the precursor of a pillared interlayered clay, recovering the precursor of the pillared clay and optionally washing the recovered precursor, calcining the precursor obtained in the previous step to form the pillared interlayered clay and hydrolyzing a hydrolyzable silicon compound.

WO 8503015 (British Petroleum Co.) describes a silanized layered clay and a process of its manufacture. The clay consists of a layered clay chemically modified by incorporation therein of a silicon-containing residue in the absence of a polymeric cationic hydroxo inorganic metal complex. These clays are produced by hydrolyzing a hydrolyzable silicon compound, for example, a tetraalkoxysilane, in the presence of the layered clay and in the absence of a polymeric cationic hydroxo metal complex.

U.S. Pat. No. 4,367,163 (Pinnavaia et al.) describes a clay composition having silica intercalated between the interlayers of clay and a method of preparing it. The main step in the preparation consists of exchanging at least a portion of the native metal ions of a swelling clay with complex ions and hydrolyzing the complex ions.

British Patent No. 2,151,603 (British petroleum Co.) describes a pillared layered clay having beryllium containing pillars that is produced by hydrolyzing a beryllium compound such as a salt and subjecting this treated compound to cation-exchanging with a cation-exchangable layered clay.

U.S. Pat. No. 4,469,813 (Gaaf et al.) discloses preparing pillared hydroisomerization catalysts by heating from 300° to 450° C. at subatmospheric pressure, a mixture of nickel synthetic mica montmorillonite with one or more polymerized hydroxy metal complexes, such as, a hydroxo aluminum polymeric solution.

U.S. Pat. No. 4,515,901 (Elatter) discloses a method of preparing an interlayered pillared clay by mixing a clay with a polar solvent, a soluble carbohydrate, and a soluble pillaring agent, drying the mixture, and then heating the mixture at a temperature between 100° to 600° C. to decompose the carbohydrate and form the interlayered pillared clay. (The temperature of stabilization is dependent upon the type of clay. The dehydroxylation temperature is different for each type of clay.)

In the invention, the above-described methods of preparing aluminum, zirconium, chromium and other metal complexes are modified to include the use of at least one rare earth salt therein.

Any suitable soluble rare earth salt can be used, although water soluble rare earth salts are preferred. The preferred water soluble rare earth salt is $LaCl_3$. A preferred class of water soluble rare earth salts is the water soluble cerium salts, although the most preferred class is the water soluble lanthanum salts. The most preferred soluble rare earth salt is $LaCl_3$, and $CeCl_3$ is the next preferred. But it must be noted that in nature the rare earths usually occur in mixed form (with Ce being most plentiful and La next plentiful in such mixtures) and are expensive to separate, so in commercial usage of the invention mixtures of rare earth salts would most likely be used. Accordingly, mixtures of rare earth salts are most important in the invention from a commercial viewpoint.

The rare earths are the metallic oxides of the rare earth elements (or rare earth metals). The rare earth elements include the lanthanum series, that is, elements with atomic numbers 57 through 71. (The rare earth elements are chiefly trivalent.) The lanthanium series includes La, Ce, Pr, Nd, Pm, Sm, Eu, Gd, Tb, Dy, Ho, Er, Tm, Yb and Lu.

The preferred rare earth salts are those wherein the rare earth atom(s) are trivalent (i.e., the +3 oxidation state). Rare earth salts having rare earth elements of other oxidation states are also useful. (Tetravalent cerium was found in an experiment not to satisfactorily provide the beneficial results of the invention, but it is believed that further nonextensive experimentation would readily provide the experimental parameters for the tetravalent form of Ce and other rare earth elements to be useful within the scope of the invention.)

Examples of suitable soluble rare earth nitrates are $La(NO_3)_3$, $Ce(NO_3)_3$, $Nd(NO_3)_3$, $Sm(NO_3)_3$, $Eu(NO_3)_3$, $Gd(NO_3)_3$, $Tb(NO_3)_3$, $Dy(NO_3)_3$, $Er(NO_3)_3$, $Tm(NO_3)_3$, $Yb(NO_3)_3$, $Y(NO_3)_3$, $Sc(NO_3)_3$, $Y(NO_3)_3$ and $Sc(NO_3)_3$. Examples of suitable soluble rare earth halides are the chlorides, bromides, iodides and fluorides, such as $LaBr_3$, $LaCl_3$, $LaI_3$, $CeBr_3$, $CeCl_3$, $CeF_3$, $PrCl_3$, $PrI_3$, $NdBr_3$, $NdCl_3$, $NdI_3$, $SmCl_3$, $EuBr_3$, $EuI_3$, $GdBr_3$, $GdCl_3$, $GdI_3$, $TbBr_3$, $TbCl_3$, $TbI_3$, $TbI_3$, $DyI_3$, $DyCl_3$, $DyBr_3$, $HoI_3$, $HoCl_3$, $ErI_3$, $ErCl_3$, $ErBr_3$, $TmI_3$, $TmCl_3$, $TmBr_3$, $YbBr_3$, $YbCl_3$, $YbI_3$, $LuBr_3$, $LuI_3$, $LuCl_3$, $YCl_3$, $YI_3$, $YBr_3$ and $ScCl_3$. Examples of suitble soluble rare earth sulfates are $La_2(SO_4)_3$, $Ce_2(SO_4)_3$, $Pr_2(SO_4)_3$, $Nd_2(SO_4)_3$, $Sm_2(SO_4)_3$, $Eu_2(SO_4)_3$, $Gd_2(SO_4)_3$, $Tb_2(SO_4)_3$, $Dy_2(SO_4)_3$, $Er_2(SO_4)_3$, $Yb_2(SO_4)_3$, $Y_2(SO_4)_3$, $Sc_2(SO_4)_3$ and $Lu_2(SO_4)_3$. Examples of suitable soluble rare earth selenates are $Ce_2(SeO_4)_3$, $Pr_2(SeO_4)_3$, $Gd_2(SeO_4)_3$ and $Dy_2(SeO_4)_3$. Examples of other suitable soluble rare earth salts are cerium oxalate, cerium acetate, praseodymium acetate, neodymium acetate, samarium acetate, samarium bromate, dysporsium bromate, dysporsium acetate, yttrium acetate, yttrium bromate, and ytterbium acetate. The rare earth nitrates and chlorides are preferred because they are the most soluble of the rare earth salts in water. The rare earth salt preferably has at least a solubility constant, $Ksp$, which allows it to go into solution sufficiently to allow fast oligomer formation.

To provide methods of producing catalysts with large micropores, stabilization of the pillars from thermal degradation was necessary. Incorporation of rare earths into the structure of the oligomers provides stabilization of the pillars from thermal degradation.

The synthesis of the oligomer is preferably conducted in water. The synthesis can be conducted in a non-aqueous organic or inorganic solvent. Examples of useful non-aqueous solvents are acetone (preferred), benzene, toluene, cyclohexane, hexamethylsiloxane, ethyl ether, alcohols, such as methyl, ethyl, propyl and benzyl alcohol, ketones, organic acids, their anhydrides or esters, ketones, toluene, nitrobenzene, pyridine, ethylene glycol, dimethyl ether, tetrahydrofuran, acetonitrile and methyl isobutyl ketone. Preferably the non-aqueous solvent is a strongly polar solvent. The solvent should be inert. Mixtures of solvents can be used, in that one solvent can be used for the rare earth salt and another solvent for the metal complex—when different solvents are used, both solvents should be compatible or miscible.

The oligomer can be prepared in colloidal systems, that is, solid rare earth salts can be used in conjunction with liquid non-solvents.

The pillar forming aspect of the invention uses at least one pillaring metal which in conjunction with at least one rare earth provides hydrothermal stability and a $d_{001}$ value of at least 19.6 Å and preferably at least 25 Å. This means that the pillaring metal forms large polymeric cationic hydroxo inorganic metal complexes. Aluminum is preferred because it provides such large complexes having up to 13 aluminum atoms. Chromium and zirconium also provide suitable, but relatively smaller, complexes. Ti, Mg, As, Sb, Co, Mn and/or Zn, for example, can be used in conjunction with the Al, Cr, and Zr and/or other pillaring metals. Pillaring metals must form metal moieties which hydrolyze and form complexes. Aluminum chlorhydroxide and a soluble rare earth salt provided a $d_{001}$ value of 27.4 Å, which doubled the pore opening as opposed to the use of aluminum chlorhydroxide by itself. When the aluminum complexes are used, even after steaming (100 percent) at 1400° F. for 5 hours, the surface areas of about 400 $m^2/cm$. remains and the 27.4 Å pore size stays with a unique intensity.

The observation of temperature effects on the $d_{001}$ spacing is a convenient way to investigate the thermal stability and hydrothermal stability of an interlayered clay. Bragg's equation (or law) as applied in pillared clays is:

$$n\lambda = 2d \cdot \sin\theta$$

wherein n is the repeat number, $\lambda$ is 1.5418, d is $d_{001}$ and $\theta$ is the angle of incidence.

Cationic oligomers, as indicated above, form at a pH of about 3.1. Copolymerization and hydrolysis can occur at a pH of up to about 8. These pH values hold for aluminum-rare earth element-oxygen oligomers.

Generally, low Cl and iron levels in the oligomers are desired. For example, iron is a poison that prevents or hinders product formation (and causes coke formation). So Cl and iron should be removed by washing to as low levels as possible.

The clays or lamellar materials which can be utilized as starting materials for the clay product of the invention are those colloidal lattice clay minerals and their colloidal synthetic analogues which are capable of swelling. A suitable natural swellable clay is montmorillonite; the suitable synthetic swellable clays are certain fluorhectorites. Suitable clays include the expandable smectites, as well as synthetic forms thereof such as reduced charge montmorillonite. Hofmann et al., Z. Anorg. Allg. Chem., 212, 995–999 (1950), and Brindlev, G. W., et al., Clays and Clay Minerals, 19, 399–404 (1971), describe methods of preparing such synthetic clays. Natural or synthetic swellable clays can be used.

The clay preferably has a particle size equal to or less than 2 microns.

The clays useful in the invention are crystalline, expandable, colloidal clays or clay minerals. The clays should be of the three-layer type, namely, sheet structures composed of two layers of silica tetrahedrons and one central dioctahedral or trioctahedral layer. This type of clay includes equidimensional expanding lattice forms (e.g., the montmorillonite groups, such as montmorillonite and sauconite) and the elongate expanding lattice forms (e.g., the montmorillonite groups, such as montronite, saponite and hectorite). Vermiculite is not believed to be useful in the invention. The useful clays can be natural or synthetic forms.

Smectites are 2:1 layered clay minerals that carry a lattice charge and characteristically expand when solvated with water and alcohols, most notably ethylene glycol and glycerol, and are generally represented by the formula:

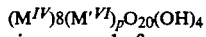

wherein p equals four cations with a +3 charge, equals 6 for cations with a +2 charge, IV indicates an ion coordinated to four other ions, and VI indicates an ion coordinated to six other ions. M is commonly $Si^{4+}$, optionally partially substituted by other ions such as $Al^{3+}$ and/or $Fe^{3+}$ as well as several other four coordinated. ions such as $P^{5+}$, $B^{3+}$, $Ge^{4+}$, $Be^{2+}$ and the like. M' is commonly $Al^{3+}$ or $Mg^{2+}$, but also can be partially substituted with hexacoordinate ions, such as $Fe^{3+}$, $Fe^{2+}$, $Ni^{2+}$, $Co^{2+}$, $Li^+$ and the like. The charge deficiencies created by the various substitutions into these four and six coordinate cation postions are balanced by one or several cations located between the structural units. Water can also be coordinated to these structural units, bonded either to the structure itself, or to the cations as a hydration shell. When dehydrated, the above structural units have a repeat distance or interlayer spacing of about 9 to 12 Å, as measured by Xray diffraction. Examples of suitable smectites include montmorillonite, bentonite, beidellite, hectorite, saponite, sauconite, nontronite, chlorite and analogues thereof. Both dioctahedral and trioctahedral smectites can be used.

The clays are usually in the alkali metal form, such as, sodium montmorillonite, with the sodium form being preferred. The clays can be in other metal forms, such as, Ca, other alkaline earth metals, Ce, Ni, Fe, Cr, Be, Ti, B, etc. For example, the montmorillonite used preferably has a high Na concentration rather than Ca because the former provides easier ion exchange and better layer expansion.

Swelling agents, that is, polar molecules, such as water, ethylene glycol and amines, substantially increase the distance between the interlamellar layers of clay by absorption of the swelling agent which enters the intermellar space and in doing so pushes apart the lamellar layers.

Experimentation has shown that vermiculite is not satisfactory within the scope of the invention.

The preferred smectite clays have a layer charge, x, of about 0.5 to 1.

The weight ratio of cerium to aluminum in the prepolymerized solution, measured as $CeO_2:Al_2O_3$, typically ranges from 1:52 to 1:1 without any apparent affect on the product. That is because only 1:52 is in the final pillars (i.e., the excess cerium is lost during washing). If the ratio is too high (e.g., 1:78) there is a negative effect on oligomer formation. The temperature for the reaction of a chlorhydrol solution at 2.4 weight percent of solids has preferably been between 145° C. and reflux with very satisfactory results (reflux at about 106° C. appears to be the best). The upper and lower temperature limits are not exactly known (but generally range from about 5° to about 200° C.). Within such preferred temperature range results can be observed within 24 hours. After 100 hours, the results are identical to those with reaction times over 1000 hours. After the clay has been intercalated, it can be aged up to 10 days or more without any degradation of the structure. However, if the oligomer is cooled to room temperature it should be reacted with the clay within one day to assure a good product (i.e., before the oligomer breaks down). The ratio of oligomer to clay can vary resulting in different materials (i.e., partially or fully intercalated clay) but the optimum stability is around 3 millimoles of Al per gram of clay.

The invention includes fully and partially intercalated clays, depending upon the ratio of oligomer to clay used. Along this line, see the examples below.

Generally, in preparing the intercalated clay, a solution of the oligomer is first prepared. The solution resulting from the preparation of the oligomer can be used. The clay can be added to the oligomer solution. Water or other inert liquid diluent can be used to prepare the oligomer solution. The clay preferably is added to the oligomer solution. Thorough mixing should be used. The concentration in the mixture of the clay suspension and the oligomer solution used to form the pillars should be sufficiently high to result in the formation of pillars. The solvents listed above for the oligomer formation can be used as the liquid medium to prepare the clay solution, suspension or slurry, although water is preferred.

The clay concentration in the final mixture, that is to say, after mixing of the oligomer solution and the initial clay suspension, should be sufficiently high to obviate the handling of large volumes of mixture, yet not excessively high since too high a clay concentration in the mixture would make the latter difficult to handle. The clay concentration in the final mixture preferably ranges from 1 to 20 weight percent, for example.

If desired, a suitable suspension or flocculating agent, such as ammonium carbonate (others can be anionic, for example), can be used when the clay is to be in solution, slurry or suspension form.

In the preparation of the intercalated clay of the invention, a 2:1 layered clay substrate is impregnated with the oligomer reactant which gives rise to a three-dimensional supporting structure (pillars) between the layers of the clay. (The factors which deal with securing uniform pillaring include reaction time, reaction temperature, purity of the clay and clay particle size; these are easily determinable for each oligomer/clay system.) When the clay is treated with the oligomer reactant, the oligomer diffuses between the layers of the clay and is bound to the layer by ionic bonds (throuqh ion exchange with the native metal ions in the clay) or by physical absorption (e.g., of the Van der Waal's or hydrogen bonding). The pillars serve to prop open the clay layers upon removal of water and form an internal interconnected micropore structure throughout the interlayer.

The temperature at which the clay is impregnated with the pillaring agent is apparently not critical. Preferably, the temperature used is about 106° C., although temperatures ranging from the freezing point to the boiling point of the solution containing the pillaring agent are satisfactory.

The clay substrate is exchanged with an amount of pillaring agent sufficient to given an intercalated structure. The amount of intercalated material within the layers should be an amount at least sufficient to maintain the spacing of the expanded clay (without being in so large an amount as to prevent the micropore system formation).

The pH of the solution containing the pillaring agent may have to be adjusted to provide for optimum intercalation (e.g., time of formation).

The intercalated clay slurry (based on most systems) is preferably aged for at least 10 days at room temperature, but economics is a crucial factor as whether or not to age and for how long. Elevated temperatures, say, 150.F., reduce the aging time period. The intercalated clay slurry should be washed to remove Cl, Fe, etc.

Adverse effects are obtained in the final product from any Na, phosphate, Cl or Fe that is present, so such agents should be removed at this stage in the preparation.

The pillared interlayered clay can thereafter be separated from the reaction medium by conventional means, such as, by centrifugation, air-drying, freeze-drying or filtration.

The heating and/or calcining step (plus steaming step) are used to remove the solvent and fix the structure of the expanded layer state of the clay. The object is to decompose the hydrolyzed metal complexes to pillars of table inorganic oxides.

Usually a calcination temperature of 500° to 800° C. or higher is used, although the examples below show a critical effect at 650° C.

Upon calcination, the interlayered metal complex is decomposed to form "inorganic oxide pillars" between the expanded clay layers. The resulting pillared interlayered clay products possess a unique interconnected internal micropore structure. Calcining at elevated temperatures in air or steam also removes the organic moieties in the clay. The temperature of stabilization is dependent upon the type of clay. The dehydroxylation temperature is different for each type of clay.

After calcining, the pillars can be defined as discrete/non-continuous inorganic oxide particles.

A representative way of preparing the intercalated clays of the invention is as follows. 5 parts by weight of 50 percent aluminum chlorhydroxide is mixed with 1 part of 60 percent $Ce(NO_3)_3$. This solution is then placed in a teflon Parr bomb at 130° C. for 100 hours. The contents are then poured into 1000 parts of $H_2O$ and, under high speed stirring, 7.5 parts of bentonite is added. The material is then usually filtered, redispersed with water for one or more additional times, and finally dried, calcined for example at 800° C. for 16 hours. Any suitable and useful treatment and purification steps can be used. The resultant intercalated clay is hydrothermally stable and possesses catalytic activity and selectivity which is eminately suitable for the cracking of heavy feed stocks.

The smectite type clays are capable of layer expansion to form pores with a different shape than the zeolites. The pillars maintain the expanded layer state in the clay and leave porosity framed by the pillars and the expanded layers in smectite clays. The resultant pores have a rectangular type opening due to this framing by the pillars and clay layers. Thus, the pores have a different shape than the zeolites, which are more circular in shape.

The invention intercalated clay preferably has a nitrogen BET surface area of about 300 to 600 $m^2/cm$, although even lower surface areas can be produced by using relative large amounts of clay compared to the oligomer.

The collapse of the prior art pillared clays and the invention pillared clays is both temperature and time dependent, but the invention pillared clays can withstand higher temperatures and longer time exposures than the prior art pillared clays.

The intercalated clay product of the invention is useful as an absorbent in a variety of applications, and can be used as a catalyst support for various catalytically active metals such as a Group VIII metal such as platinum, palladium, nickel, iron or cobalt; molydenum; tungsten; a rare-earth metal and the like. It can also be used in the proton form, i.e., with hydrogen and ammonium ions present. Moreover, the intercalated product can be used in admixture with other common adsorbents or matrix materials such as silica, alumina, silica-alumina hydrogel, crystalline aluminosilicate zeolite and the like. The catalysts which can be utilized in the proton form or which can be prepared by supporting a catalytically active metal on the intercalated clay product of the invention are especially useful in well known catalytic cracking hydrocarbon conversion processes. The metal can be incorporated within the interlamellar region of the expanded clay substrate by impregnation and/or as salts which exchange with metal ions in the clay. Upon reduction with some reducing agent, such as hydrogen, the metal ions are reduced to the metal. An especially useful cracking catalyst is that formed by supporting hydrogen ions, ammonium ions, an ion from Group IB to Group VIII of the periodic chart (but not iron) or mixture thereof in the intercalated clay product of the invention. The intercalated clay product of the invention is also useful as a molecular sieve adsorbent.

In a broader sense, the pillared interlayed clay product ion can be exchanged and/or impregnated with ions and/or metals of Groups IIB through VIII of the Periodic Table in order to prepare catalysts. The ion exchange or impregnation can be done, for example, with aqueous solutions of tetramineplatinum chloride. This matter is discussed in greater detail below.

An especially useful area of utility of the intercalated clay of the invention is in the conversion of hydrocarbon feedstocks, particularly heavy cracking oils. In recent years, because of the depletion of worldwide petroleum feedstocks, attention has been directed to the development of alternate sources of liquid synthetic fuel and gaseous fuels from raw materials, such as coal, oil shale and tar sands. Likewise, attention is also being directed to better utilization of native black oils and petroleum residuals. The conversion of heavy petroleum liquids to distillate products such as gasoline normally requires catalytic processing, one of the most important of which being catalytic cracking. Molecular sieves have had an important and tremendous impact in petroleum refining in that the use of the same in various refining operations has improved conversion rates as well as product distribution. The catalytic action of molecular sieves is characterized by the following features:

(a) Organic substrates are intersorbed in the sieve channel system, that is, because of the constraining pore size and the concave geometry of the internal molecular sieve surface. An incoming molecule is usually under the simultaneous action of an ensemble of surrounding catalytic sites. Consequently, substrate polarization is considerably stronger, that is, activation is easier, compared to that with conventional catalysts. Further, as a result of approximation and orientation effects operative in the channel systems, intrasorbed reactant molecules are in many cases favorably juxtaposed, with consequent decrease in the activation entropy of the reaction.

(b) Incorporation of catalytically active sites or chemically reactive species in the molecular sieve framework allows for the design and synthesis of a wide variety of specific adsorbents, catalysts and polymeric reagents.

(c) The specific geometry and dimensions of the channel system in a given molecular sieve catalyst allows for performance of molecular-shape selective processes.

Because of the unique characteristics of molecular sieves, they have been widely used in hydrocarbon conversion processes such as cracking, hydrocracking, isomerization, hydroisomerization, alkylation and dealkylation of simple aromatics. However, there are certain severe limitations with respect to the catalytic applications of prior molecular sieves. In particular, because of the narrow range of critical pore sizes found in such systems the intrasorption and reaction of bulky or even medium-sized organic molecules is impossible. For instance, it has been demonstrated that most of the molecules present in raw coal liquids cannot penetrate into the intercrystalline pores of conventional zeolite catalysts. Furthermore, certain organic substrates, including monocyclic aromatic compounds have exhibited low intracrystalline diffusivity in zeolite media, resulting in poor recoveries and fast catalyst aging.

The catalysts of the invention are heterogenous catalysts. The process of heterogeneous catalysis require the presence of discrete particles through which the reacting products can be passed under suitable conditions to be converted as required. Depending on the nature of the process, the discrete particles can be positioned in a fixed bed, a moving bed, or suspended in the reactants as in the fluid catalytic processes.

The invention catalysts have excellent high temperature and hydrothermal stability. They are useful as cracking catalysts, particularly for cracking processes involving large or bulky organic molecules. The invention catalysts are petroleum cracking catalysts with shape selectivities comparable to those of commercial zeolite catalysts.

Processes operating at high temperature, for example, petroleum cracking, operate with feed stocks which result in coke deposition. Such feed stocks in many cases contain metals or metal compounds, for example, nickel and vanadium, which as such or as a result of reaction, are converted into compounds which deposit in the pores of the catalyst. The fine pores will clog more rapidly than pores of greater radius. The vanadium, etc., contaminants in heavy cracking oil, gasoline and the like are absorbed and bound by the invention pillared clays, which deactivates such clays. Since the invention clays more readily binds vanadium and the like than zeolites, the invention clays can be used in conjunction with zeolites to protect the zeolites by removing the vanadiaum and like contaminants from the feed.

The intercalated catalysts of the invention have unique surface characteristics making them useful as molecular sieves and as catalysts or as bases for catalyts in a variety of separation, hydrocarbon conversions and oxidative combustion processes. The intercalated clays can be impregnated or otherwise associated with catalytically active metals by the numerous methods known in the art and used, for example, in fabricating catalysts compositions containing alumina or aluminosilicate materials.

The intercalated clays can be employed for separating molecular species in admixture with molecular species of a different degree of polarity or having different kinetic diameters by contacting such mixtures with at least one of the intercalated clays having pore diameters large enough to adsorb at least one but not all molecular species of the mixture based on the polarity of the adsorbed molecular species and/or its kinetic diameter. When the intercalated clays are employed for such separation processes, the intercalated clays are at least partially activated whereby some molecular species selectively enter the intracrystalline pore system thereof.

The hydrocarbon conversion reactions catalyzed by the intercalated clays compositions include: cracking; hydrocracking; alkylation of both the aromatic and isoparaffin types; isomerization (including xylene isomerization); polymerization; reforming; hydrogenation; dehydrogenation; transalkylation; dealkylation; and hydration. The intercalated clays are particularly useful in catalyzed hydrocarbon conversion reactions where relatively large hydrocarbon molecules are present in the feed.

When the intercalated clay catalysts contain a hydrogenation promoter, such promoter can be platinum, palladium, tungsten, nickel, cobalt or molybdenum and can be used to treat various petroleum stocks including heavy petroleum residual stocks, cyclic stocks and other hydrocrackable charge stocks. These stocks can be hydrocracked at a temperature in the range of between about 400° and about 825° F. using a molar ratio of hydrogen to hydrocarbon in the range of between about 2 and about 80, a pressure between about 10 and about 3500 psig, and a liquid hourly space velocity (LHSV) of between about 0.1 and about 20, preferably between about 1.0 and about 10.

The intercalated clay catalysts can also be employed in reforming processes in which the hydrocarbon feedstocks contact the catalyst at a temperature between about 700° and about 1000° F., a hydrogen pressure of between about 100 and about 500 psig, a LHSV value in the range between about 0.1 and about 10, and a hydrogen to hydrocarbon molar ratio in the range between about 1 and about 20, preferably between about 4 and about 12.

Further, the intercalated clay catalysts which contain hydrogenation promoters, are also useful in hydroisomerization processes wherein the feedstock, such as normal paraffins, is converted to saturated branchedchain isomers. Hydroisomerization processes are typically carried out at a temperature between about 200° and about 600° F , preferably between about 300° and about 550° F., with an LHSV value between about 0.2 and about 1.0. Hydrogen is typically supplied to the reactor in admixture with the hydrocarbon feedstock in molar proportions of hydrogen to the feedstock of between about 1 and about 5.

The intercalated clays which are similar in composition to those employed for hydrocracking and hydroisomerization can also be employed at between about 650° and about 1000° F., preferably between about 850° and about 950° F., and usually at a somewhat lower pressure within the range between about 15 and about 50 psig for the hydroisomerization of normal paraffins. The contact time between the feedstock and the intercalated clay catalyst is generally relatively short to avoid undesirable side reactions, such as, olefin polymerization and paraffin cracking. LHSV values in the range between about 0.1 and about 10, preferably between about 1.0 and about 6.0, are suitable.

The very low alkali metal content (often not measurable by current analytical techniques) of the intercalated clays make them particularly well suited for use in the conversion of alkylaromatic compounds, particularly for use in the catalytic disproportionation of toluene, xylene, trimethylbenezenes, tetramethylbenzenes and larger alkylaromatic compounds. In such disproportionation processes isomerization and transalkylation can also occur. The intercalated clay catalysts for such processes will typically include Group VIII noble metal adjuvants alone or in conjunction with Group VIB metals such as tungsten, molybdenum and chromium which are preferably included in such catalyst compositions in amounts between about 3 and about 15 weight percent of the overall catalyst composition. Extraneous hydrogen can be, but need not be, present in the reaction zone which is maintained at a temperature between about 400° and about 750° F., a pressure in the range between about 100 and about 2000 psig and a LHSV value in the range between about 0.1 and about 15.

One embodiment of the invention may be characterized as a process for cracking heavy oils under hydrocracking conditions utilizing hydrocracking catalyst comprising as at last one component thereof a hydrothermally-stable clay composition having pillars comprising an oligomer of (a) at least one pillaring metal, (b) at least one rare earth metal and (c) oxygen, intercalated between the layers of at least one colloidal expandable, swelling layered, lattice clay mineral or synthetic analogue thereof, wherein said oligomer imparts a surface area of at least 250 m$^2$/g after hydrothermal treatment at 760° C. for five hours, when exposed to 100% steam.

The intercalated clay catalysts can be employed in catalytic cracking processes wherein such are preferably employed with feedstocks, such as gas oils, heavy naphthas, deasphalted crude oil residues, etc., with gasoline being the principal desired product. Temperature conditions are typically between about 850° and about 1100° F., LHSV values between about 0.5 and about 10, and pressure conditions are between about 0 psig and about 50 psig.

In terms of catalyst usage and product value, catalytic cracking is the most important unit operation of the petroleum refining industry. In a typical fluid catalytic cracking unit, oil is contacted and vaporized by the hot fluidized catalyst in either the feed riser line or in the reactor. Cracking occurs in the riser at temperatures between 480° and 520° C. Catalyst and cracking products are mechanically separated, and occluded oil on the catalyst surface is removed by steam stripping at 500° to 540° C. Catalyst regeneration is completed by burning of coke deposits in controlled air at temperatures in the 600° to 700° C. range in the presence of small amounts of water. Then, from the regenerator, the catalyst flows into the incoming oil for reutilization. Catalyst stability at the thermal and hydrothermal conditions required for regeneration is essential for the maintenance of high activity and is critical in determining the commercial importance of a cracking catalyst.

The intercalated clay catalysts can be employed for dehydrocyclization reactions which employ paraffinic hydrocarbon feedstocks, preferably normal paraffins having more than 6 carbon atoms, to form benzene, xylenes, toluene and the like. Dehydrocyclization processes are typically carried out using reaction conditions similar to those employed for catalytic cracking.

The intercalated clay catalysts can be employed in catalytic dealkylations where paraffinic side chains are cleaved from aromatic nuclei without substantially hydrogenating the ring structure at a relatively high temperatures in the range between about 800° and about 1000° F. and at a moderate hydrogen pressure between about 300 and about 1000 psig, with the other conditions being similar to those described above for catalytic hydrocracking. The intercalated clay catalysts for catalytic dealkylation are of the same type described above in connection with catalytic dehydrocyclization. Particularly desirable dealkylation reactions contemplated herein include the conversion of methylnaphthalene to naphthalene and toluene and/or xylenes to benzene.

The intercalated clay catalysts can be used in catalytic hydrofining wherein the primary objective is to provide for the selective hydrodecomposition of organic sulfur and/or nitrogen compounds without substantially affecting hydrocarbon molecules present therewith. For this purpose it is preferred to employ the same general conditions described above for catalytic hydrocracking. The catalysts are typically of the same general nature as described in connection with dehydrocyclization operations. Feedstocks commonly employed for catalytic hydroforming include: gasoline fractions; kerosenes; jet fuel fractions; diesel fractions;

light and heavy gas oils; deasphalted crude oil residue; and the like. The feedstock can contain up to about 5 weight percent of sulfur and up to about 3 weight percent of nitrogen.

The intercalated clay catalysts can be employed for isomerization processes under conditions similar to those described above for reforming although isomerization processes tend to require somewhat more acidic catalyst than those employed in reforming processes. Olefins are preferably isomerized at a temperature between about 500° and about 900° F., while paraffins, naphthenes and alkyl aromatics are isomerized at a temperature between about 700° and about 1000° F. Particularly desirable isomerization reactions contemplated herein include the conversion of n-heptane and-/or n-octane to isoheptanes, iso-octanes, butane to isobutane, methylcyclopentane to cyclohexane, metaxylene and/or ortho-xylene to para-xylene, 1-butene to 2-butene and/or isobutene, n-hexene to isohexane, cyclohexane to methylcyclopentene, etc. The preferred form is a combination of the intercalated clay with polyvalent metal compound adjuvants (such as sulfides) of metals of Group IIA, Group IIB and rare earth metals. When employed for dealkylation of alkyl aromatics, the temperature is usually at least 350° F. and ranges up to a temperature at which substantial cracking of the feedstock or conversion products occurs, generally up to about 700° F. The temperature is preferably at least 450° F. and not greater than the critical temperature of the compound undergoing dealkylation. Pressure conditions are applied to retain at least the aromatic feed in the liquid state. For alkylation, the temperature can be as low as 250° F. but is preferably at least 350° F. In the alkylation of benzene, toluene and xylene, the preferred alkylation agents are olefins such as ethylene and propylene.

The intercalated clays of the invention can be used as hydroprocessing catalysts when they contain, as incorporated components, different combinations of catalytically active transition metal derivatives possessing high hydrogenolytic and/or hydrogenation activity, such as, in particular oxygen and/or sulfur containing oligomers and/or oligomeric cations, and/or simple or complex cations of Mo, Cr, Ni, Co, W and other transition metals. The catalytically-active components can be in the form of oligomers intercalated in the interlamellar space between the pillars of the invention intercalated clays. The catalytically active oligomeric components can be intercalated hydroxo-M or sulfhydro-M oligomers or oligomeric cations, where M is Mo, Cr, Ni, Co, W or various combinations of these transition metals. The interlamellar space also contains exchangeable metallic ion or H+ sites. Catalysts of this type can be prepared by a two-step procedure, as follows:

Step 1. Low molecular weight hydroxo-M oligomers, where M is Ni, Co, Cr, Mo or other transition metal, are prepared under mildly acidic conditions (pH in the range of 2.5 to 6) and introduced into the interlamellar space of the clay, yielding intermediate intercalation products with low $d_{(001)}$ values.

Step 2. The intermediate product obtained in Step 1 is subjected to pillaring with aluminum-rare earth element-oxygen oligomers to provide large $d_{001}$ values.

In a slightly modified step 1 of the above procedure, the low molecular weight hydroxo-M oligomers are incorporated into the interlameller space of the clay by intercalation of M halides, where M is Ni, Co, Cr, Mo or other transition metal, followed by titration with an aqueous NaOH solution and consequent in-situ hydrolysis of the M halides to catalytically active hydroxo-M oligomers.

The catalytically active components can also exhibit intrinsic acidity associated with acidic sites on the internal clay surface or on the surface of the pillars or on both surfaces. The catalytically active components can be exchangeable metallic cations of the transition metals such as Cr, Ni, Co, Mo, W and combinations thereof.

The catalytically active components can be in the form of oxides (such as, Mo oxide) mounted (superimposed) on the pillars. In addition, the catalyst form can contain catalytically active interlamellar cations, in particular $Ni^{2+}$ and/or $Co^{2+}$, and/or $H^+$. Other transition metal cations can be present. Preparation of hydroprocessing catalysts of this type can be performed using a stepwise procedure as follows:

Step 1. The starting clay is subjected to ion-exchange with a transition metal ion, in particular $Ni^{2+}$ or $Co^+$. Partial ion exchange with acidic ions, e.g., $Ce^{3+}$, $La^{3+}$, $NH^{4+}$ ($H^+$), is also done in some preparations to increase the acidity of the ion-exchanged clay.

Step 2. The ion-exchanged clay, such as Ni-montmorillonite or Co-monmorillonite is subjected to reaction with aluminum-rare earth element-oxygen oligomers. (The intercalated clay at this point can be used as a hydroprocessing catalyst.)

Step 3. The intercalated clay from step 2 is subjected to calcination at 400° to 450° C. to partially dehydrate and thermally stabilize the pillars.

Step 4. The calcined intercalated clay from step 3 is treated with an aqueous ammonium molybdate solution resulting in chemisorption mounting of Mo oxide on the pillars and, to a minor extent, on aluminol groups present at the edges of the clay layers.

The pertinent parts of U.S. Pat. No. 4,579,832 dealing with the above processes are incorporated herein by reference.

The intercalated clays of the invention can be employed in conventional molecular sieving processes as heretofore have been carried out using aluminosilicate, aluminophosphate or other commonly employed molecular sieves. The intercalated clays are preferably washed and calcined prior to their use in a molecular sieve process to remove any undesirable molecular species which may be present in the intracrystalline pore system as a result of synthesis or otherwise.

The intercalated clays of the invention are also useful as adsorbents and are capable of separating mixtures of molecular species both on the basis of molecular size (kinetic diameters) and based on the degree of polarity of the molecular species. When the separation of molecular species is based upon the selective adsorption based on molecular size, the intercalated clay is chosen in view of the dimensions of its pores, such that at least the smaller molecular specie of the mixture can enter the intracrystalline void space while at least the larger specie are excluded. When the separation is based on degree of polarity it is generally the case that the more hydrophilic intercalated clay will preferentially adsorb the more polar molecular species of a mixture having different degrees of polarity even though both molecular species can communicate with the pore system of the intercalated clay.

X-ray patterns of reaction products are obtained by X-ray analysis, using standard X-ray powder diffraction techniques. The radiation source is a high-intensity, copper target, X-ray tube operated at 50 Kv and 40 ma.

The diffraction pattern from the copper K-alpha radiation and graphite monochromator is suitably recorded by an X-ray spectrometer scintillation counter, pulse height analyzer and strip chart recorder. Flat compressed powder samples are scanned at 2 (2 theta) per minute, using a two second time constant. Interplanar spacings (d) in Angstrom units are obtained from the position of the diffraction peaks expressed as 2r where r is the Bragg angle as observed on the strip chart. Intensities are determined from the heights of diffraction peaks after subtracting background, "$I_o$" being the intensity of the strongest line or peak, and "I" being the intensity of each of the other peaks. Alternatively, the X-ray patterns can be obtained by use of computer based techniques using copper K-alpha radiation, Siemens type K-805 X-ray sources and Siemens D-500 X-ray powder diffractometers available from Siemens Corporation, Cherry Hill, N.J.

As will be understood by those skilled in the art, the determination of the parameter 2 theta is subject to both human and mechanical error, which in combination, can impose an uncertainty of about ±0.4. on each reported value of 2 theta. This uncertainty is, of course, also manifested in the reported values of the d-spacings, which are calculated from the 2 theta values. This imprecision is general throughout the art and is not sufficient to preclude the differentiation of the invention intercalated clay materials from each other and from the compositions of the prior art.

As used herein, all parts, ratios, proportions and percentages are on a weight basis and all temperatures are expressed in ° C., unless otherwise stated herein or otherwise obvious herefrom to one skilled in the art.

In the following examples, unless otherwise stated, the clays used were HPM-20 (American Colloid Corporation) and Ca-montmorillonite STX-1 (the Clay Minerals Society). These clays are high swelling smectites with varying amounts of alumina. HPM-20 is a bentonite clay and contains 64.3 weight percent of $SiO_2$, 20.7 weight percent of $Al_2O_3$, 0.5 weight percent of CaO, 2.3 weight percent of MgO, 2.6 weight percent of $Na_2O$, 3.0 weight percent of $Fe_2O_3$ and 5.1 weight percent of $H_2O$. STX-1 is a montmorillonite clay and contains 71.5 weight percent of $SiO_2$, 16.1 weight percent of $Al_2O_3$, 1.3 weight percent of $Fe_2O_3$, 0.9 weight percent of CaO, 3.9 weight percent of MgO, 0.5 weight percent of $Na_2O$ and 4.0 weight percent of $H_2O$. The purity of these clays is about 90 percent; the other 10 percent consists of other minerals, such as feldspar, gypsum, calcium carbonate and quartz. The sodium and calcium are the principle exchangeable cations that give the raw clay an ion exchange capacity of approximately 100 milliequivalents per 100 g of smectite. The clays used in all of the examples were neither purified nor treated prior to intercalation.

Since nearly all reactions reach equilibrium quicker at higher temperatures, the reactants were either refluxed at 106° C. or a Parr bomb (for temperatures greater than 106° C.) was employed. The reactants used to synthesize the oligomer were chlorhydrol, 23.8 percent $Al_2O_3$, and $Ce(NO_3)_3$ solution, 29.3 percent $CeO_2$. In all of the examples, aqueous systems were used.

The intercalated clays were calcined at 1400° F. for 16 hours, (unless otherwise noted) before characterization. A Philips X-ray diffraction unit model PW1710 with Cu K V radiation was used to determine the position of the $d_{001}$ peak. The intensity of this peak also helped to determine the crystallinity of the intercalated material. The surface areas were calculated with a Micromeritics Flowsorb II Model 2300 which utilized the BET isotherm. Finally, the activity of the intercalated clay was determined by an automated fixed bed microreactor with an in-line Hewlett Packard 5880A gas chromatograph.

EXAMPLES 1 TO 12

Preparation Of Intercalated Clay Using Oligomers Synthesized In A Bomb

Bombs were prepared by mixing 20 g of chlorhydrol with 20 g of $Ce(NO_3)_3$ solution in Parr bombs. The bombs were placed in an oven at 125° to 140° C. for 22 to 90 hours. The resultant mixture formed a creamy precipitate that was partially soluble in water (cerium was in excess and fell out of solution as an insoluble colloidal precipitate). This entire mixture was added to 3.6 liters of $H_2O$ containing 30 g of HPM-20, stirred for 1 hour, filtered, washed, dried at 115° C., calcined at 800° C. for 16 hours, and then steamed at 1400° F. for 5 hours. The data is shown in Table I.

TABLE 1

| Surface Areas of Intercalated Clay Using Oiligomers Synthesized in a Bomb | | | | | |
|---|---|---|---|---|---|
| Example Number | Composition of Oligomer | Bomb Temp. °C. | Time hrs. | Surface Area $m^2/g$ 800° C. 16 hrs. | Surface Area $m^2/g$ 1400° F. 5 hrs., steam |
| 1 | Al—Ce | 125° | 40 | 277 | |
| 2 | Al—Ce | 130° | 22 | 257 | 171 |
| 3 | Al—Ce | 130° | 44 | 219 | 220 |
| 4 | Al—Ce | 130° | 70 | 262 | 279 |
| 5 | Al—Ce | 130° | 90 | 238 | 254 |
| 6 | Al—Ce | 140° | 16 | 219 | |
| 7 | Al—Ce | 140° | 40 | 230 | |
| 8 | Al | 80° | 285 | 157 | |
| 9 | Al | 130° | 90 | 125 | |
| 10[1] | Al | 140° | 22 | 143 | |
| 11 | Al | 140° | 22 | 158 | |
| 12 | Al | 155° | 168 | 86 | |

Note:
[1]Surface area (SA), 500° C., 1 hr., 274 $m^2/g$

Examples 1 to 7 represent the invention and Examples 8 to 12 are comparative examples. The intercalated clays of Examples 1 to 7 were also found to be catalytically active by obtaining 52 to 68 percent conversions from standard microactivity tests. In contrast, experiments performed as a baseline case (i.e., chlorhydrol only) had significantly lower surface areas. A typical sample had a surface area of 274 $m^2/g$ after heating to 500° C. (below the dehydroxylation temperature), which indicates well-intercalated material. However, after calcining at 800° C. (above the dehydroxylation temperature) the pillars collapsed as reflected by the absence of the $d_{001}$ peak and the loss of surface area to 143 $m^2/g$ concerning two samples synthesized under identical conditions except that one contained cerium. The difference in their surface areas (238 and 125 $m^2/g$, respectively) clearly shows that the presence of cerium was essential to the overall stability of the intercalated clay.

EXAMPLES 13 TO 18

Preparation Of Intercalated Clay Using Oligomers Synthesized From Reflux

A mixture containing 95 percent of chlorhydrol and 5 percent $Ce(NO_3)_3$ solution by weight was brought to reflux (106° C.). At intervals of 24, 48 and 192 hours, 120 grams of reflux was diluted with 2 liters of H20, followed by the dispersion of 30 g of HPM-20. This slurry was then filtered, redispersed in 4 liters of $H_2O$, filtered, dried, and calcined at 1400° F. for 16 hours. The growth of the oligomer is reflected by the surface areas after calcination, as shown in Table II.

of clay is 2, 3 or 5). This data is found below in Table III. Even oligomer Al/Ce ratios between 4 and 52 yield the same $d_{001}$ spacing of 27.4 Å. Therefore, cerium present in concentrations greater than one part per 52 aluminum atoms is probably in excess. Also, since no intermediate $d_{001}$ spacings have been observed at various Al/Ce ratios, such finding indicates that one type of oligomer exists that controls the interlayer spacing. One possible structure is that one cerium atom is tetrahedrally bound to 4 chlorhydrol (total of 52 Al atoms) molecules.

When the Al atom to Ce atom ratio was 75:1, the result was unsuccessful.

EXAMPLE 22

The fairly constant difference (23 percent) in surface area observed over the 2 to 8 week period for a given set of runs indicates that the reacted and unreacted oligomers are stable as a function of time or are changing exactly the same over the period of time. A composite of two samples was prepared to see if this additional surface area would be reflected in higher microactivity conversions. [A mixture of 2500 g of chlorhydrol and

TABLE II

Surface Areas of Intercalated Clay Using Oligomers Synthesized from Reflux

| Data | Example Number | | | | | |
|---|---|---|---|---|---|---|
| | 13 | 14 | 15 | 16 | 17 | 18 |
| Composition of oligomer | Al-Ce | Al-Ce | Al-Ce | Al | Al | Al |
| Time, hrs. refluxing | 24 | 48 | 192 | 24 | 48 | 192 |
| Surface area, 1400° F., 16 hrs., $m^2/g$ | 172 | 278 | 416 | 102 | 122 | 103 |
| Surface area, 1400° F., 5 hrs., steam, $m^2/g$ | | 248 | 350 | | | |

Examples 13 to 15 represent the invention and Examples 16 to 18 are comparative examples. The comparative examples using only chlorhydrol refluxed and reacted with clay under identical conditions did not exhibit similar growth to that of the invention examples. These experiments demonstrate the importance of cerium to the stability of the oligomer. In comparison to Examples 1 to 7, it is seen that less cerium provides the same results (Al/Ce=52 instead of 2.75) and that such is probably desirable. In addition, the oligomer can be formed at lower temperatures enhancing the practicality of the invention synthesis.

EXAMPLES 19 TO 21

X-Ray Diffraction Scans Of Intercalated Clay

Figure 2:
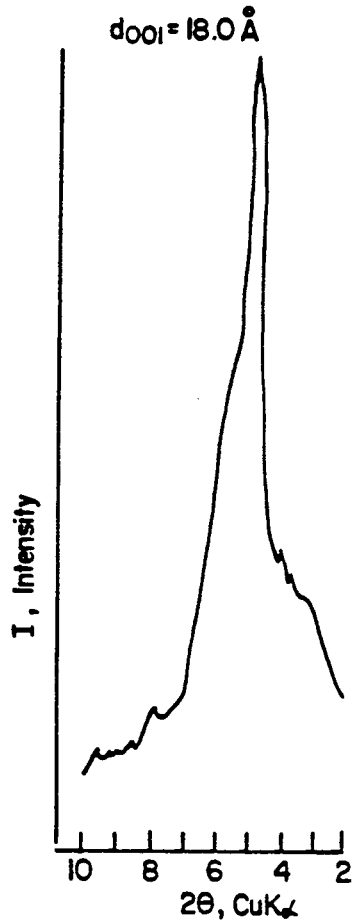
FIG. 2 is an X-ray diffraction scan of Al-intercalated bentonite.
Figure 3:
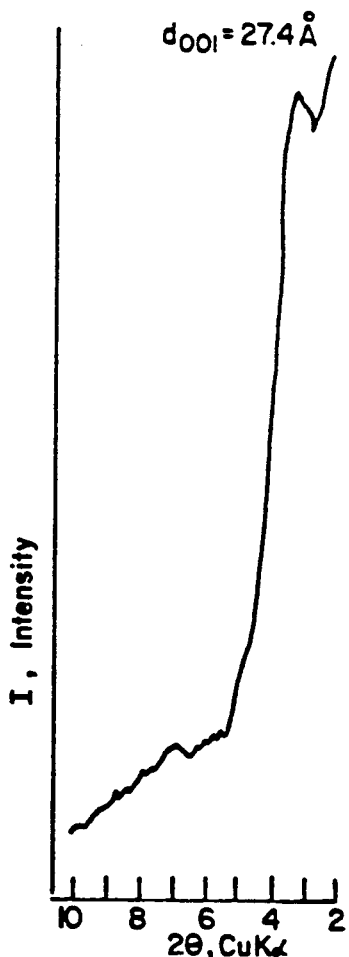
FIG. 3 is an X-ray diffraction scan of the intercalated bentonite of the invention.

One of the fundamental differences between chlorhydrol only and chlorhydrol/cerium prepared intercalated clay is the distance between the unit layers of clay ($d_{001}$ spacing). As can be seen from FIG. 1, water-expanded unreacted clay (HPM-20) (Example 19) has a $d_{001}$ spacing of 9.6 Å. As can be seen from FIG. 2, clay reacted in water with oligomers (Example 20) prepared from chlorhydrol only has a $d_{001}$ spacing of 18.0 Å. The intensity of this peak diminishes as the calcination temperature increases. This is especially obvious near the dehydroxylation temperature (about 650° C.) when the pillars collapse. In contrast, clay reacted in water with oligomers prepared from chlorhydrol/cerium (Example 21) has a $d_{001}$ spacing of 27.4 Å. (See FIG. 3). This larger $d_{001}$ spacing is consistent regardless of other reaction conditions (e.g., oligomer synthesis of temperature 106° to 190° and mm moles of Al in oligomer per gram 500 g of $Ce(NO_3)_3$ solution was refluxed for 78 days (equilibrium). To secure the first sample, 216 g of reflux was diluted with 36 liters of $H_2O$ to which 270 g of HPM-20 was added. The first sample was aged for two weeks. To secure the second sample, after aging under ambient conditions for two weeks, 24 g of reflux was diluted with 4 liters of water, to which 30 g of HPM-20 was added and stirred for 1 hour. In both cases, the mixture was filtered, redispersed in 4 liters of water, filtered, dried at 130° C. and calcined at 1400° F. for 16 hours.] Even though this material was very hydrothermally stable (the surface area only decreased from 370 to 339 $m^2/g$ after 1400° F. steaming), higher conversions were not realized.

EXAMPLE 23

Microactivity Tests Of Intercalated Clay With Normal Feed

Intercalated clays were synthesized under a variety of conditions to see what effect they might have on the product distribution from microactivity tests (MATS). A suitable microactivity test is the one described in Ciapetta, F. G., and D. Anderson, Oil Gas J., (1967), 65, 88. It was found that, regardless of the reaction conditions (e.g., temperature 106° to 190° C.), the end product gave similar microactivity test results with a normal feed (KLS-185). (Normal feed KLS-185 was a paraffinic vacuum gas oil, the API gravity at 60° was 27.5, the carbon percent was 0.15, the initial distillation boiling point was 479° F. and the 95 percent distillation boiling point was 1005° F.) See Table III.

TABLE III

Typical MAT[1] Of Intercalated Clays Synthesized Under Various Conditions

| | Sample Numbers | | | | | |
|---|---|---|---|---|---|---|
| | 23-1 | 23-2 | 23-3 | 23-4 | 23-5 | 23.6 |
| | SYNTHESIS CONDITION | | | | | |
| | BOMB | BOMB | BOMB | BOMB | BOMB | BOMB |
| Al/Ce of Reactant, Mole Ratio | 2.75 | 17.2 | 9.0 | 13.7 | 26 | 52 |
| SA, POST 1400° F., 5 Hrs. Steam[2] | 279 | 276 | 231 | 321 | 282 | 334 |
| Conversions, %[3] | 67.6 | 68.1 | 64.1 | 65.3 | 66.2 | 69.8 |
| Gas Factor[4] | 2.2 | 1.9 | 1.5 | 2.1 | 2.0 | 2.2 |
| $H_2/C_4$ | 1.7 | 1.8 | 2.2 | 1.8 | 1.7 | 1.6 |
| $C_1$-$C_4$ | 13.0 | 9.4 | 13.7 | 12.8 | 11.7 | 12.7 |
| $C_4$=Total $C_4$ | 0.53 | 0.54 | 0.40 | 0.51 | 0.51 | 0.47 |
| Gasoline, Wt. % | 49.4 | 53.9 | 46.6 | 47.2 | 48.1 | 50.6 |
| LCO, Wt. %[5] | 26.4 | 26.0 | 29.2 | 27.6 | 27.1 | 25.1 |
| LCO/(LCO+HCO), % | 81.5 | 81.3 | 81.4 | 79.6 | 80.1 | 82.7 |
| HCO, Wt. %[6] | 6.0 | 6.0 | 6.7 | 7.1 | 6.7 | 5.3 |
| Coke, Wt. % | 5.1 | 4.7 | 3.8 | 5.2 | 6.3 | 6.6 |
| Coke Factor[7] | 2.4 | 2.2 | 2.1 | 2.7 | 3.2 | 2.8 |

[1]MAT is microactivity test
[2]SA is surface area
[3]Conversion, %, is 100%-(HCO wt. % + LCO wt. %)
[4]Gas factor is calculated by dividing the quantity of gas produced by the quantity of gas produced by standard catalyst USY at that particular conversion.
[5]LCO is light cycle oil
[6]HCO is heavy cycle oil
[7]Coke factor is calculated by dividing the quantity of coke produced by the quantity of coke produced by standard catalyst USY at that particular conversion.

Interestingly, when the ratio of Al to Ce was varied from 2.75 to 52, a stable oligomer was always formed. Knowing that cerium is essential to the stability of the oligomer suggests that only a very small quantity of cerium was required. One possible explanation is that one cerium atom is tetrahedrally bound to 4 chlorhydrol (total of 52 Al atoms) molecules. If this is so, additional cerium would either form fragments of the ideal oligomer or be washed out during the rinse. If one assumes that intercalated clay is inherently similar to all cases, several conclusions might be reached. First, these catalysts produce a lot of gas, especially hydrogen. This is due to the presence of contaminant metals (such as iron) in the clay. Second, the high $C_4$=/Total $C_4$ demonstrates the poor hydrogen transfer ability of these catalysts. Third, these catalysts show excellent LCO selectivity (81 percent) over HCO and respectable gasoline plus LCO yields of 76 percent. (LCO is light cycle oil and HCO is heavy cycle oil.) Finally, these catalysts produce a lot of coke. This high coke factor could be attributed to the large pores allowing penetration of coke precursors or from iron in the clay.

It can be generally concluded that the parameters involved with the synthesis of intercalated clay are not sensitive enough to adversely affect the obtaining of a consistent product. However, it should be cautioned that different intercalated clays indeed may have been formed, but the normal feed (too light) was unable to differentiate between them.

EXAMPLE 24

Microactivity Tests Of Intercalated Clay With Heavy Feed

In order to ascertain any advantage in catalytic activity/selectivity from intercalated clay, a heavy ARCO feed (KLS-428) was employed to quantify potential benefits. (The heavy ARCO feed was an aromatic heavy vacuum oil, the API gravity at 60° was 26.2, the carbon percent was 1.37, the initial distillation boiling point was 433° F. and the 92 percent distillation boiling point was 1055° F.) Spray-dried catalysts containing the invention intercalated clay neat and with 20 percent of USY catalyst (LZY-82) were prepared. These two catalysts, along with DELTA-400 catalyst (KLS-747) as a control, were tested at various catalyst-/oil (cat/oil) ratios. USY is a designation for an ultrastable Y-type zeolite catalyst, exchanged with rare earths, produced by UOP. DELTA-400* is a trademark for a Y-type zeolite cracking catalyst produced by the Katalistiks unit of UOP.

Figure 4:
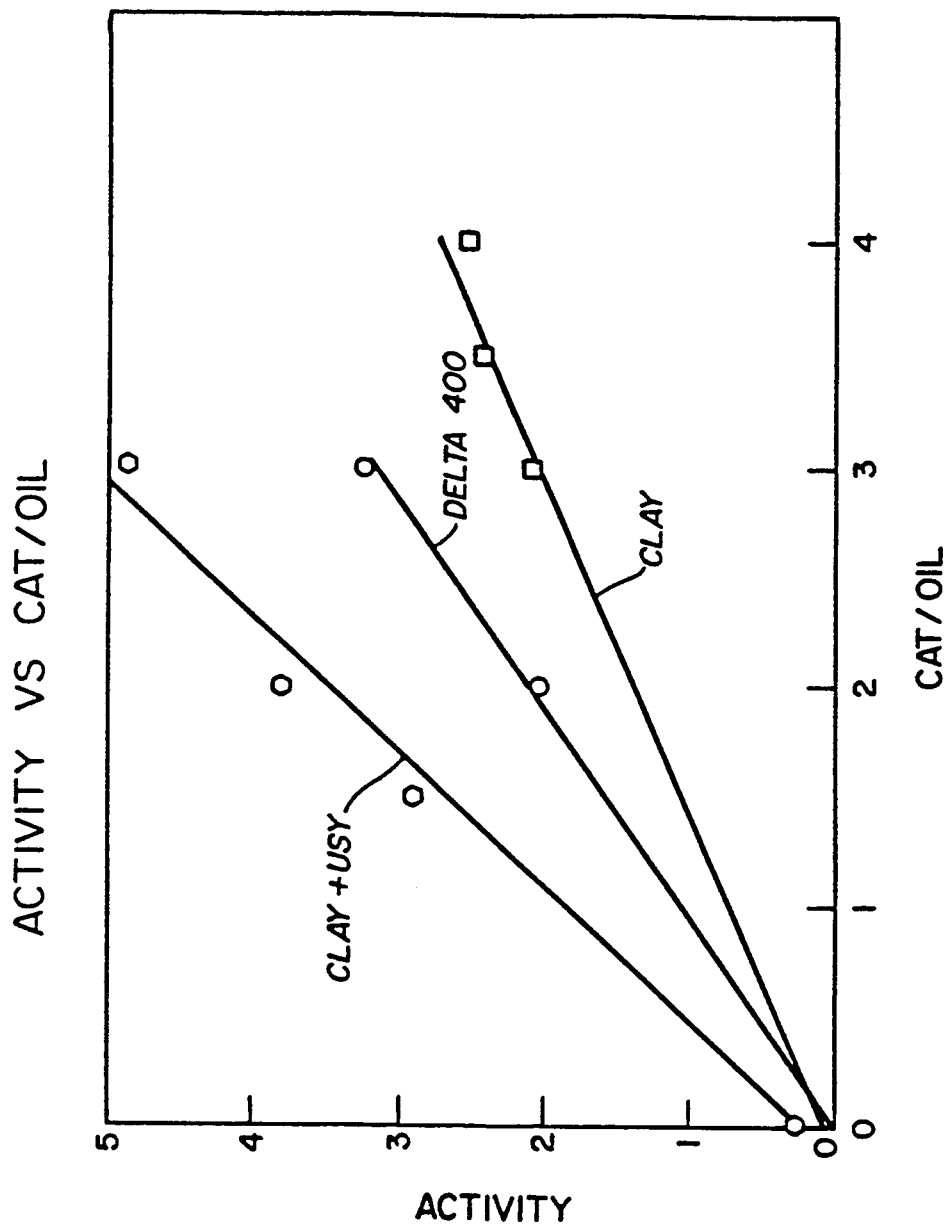
FIG. 4 is a graph of activity versus the weight ratio of catalyst versus feed oil for various catalysts.

FIGS. 4 to 10 show activity and selectivity for the three catalysts in the cracking of ARCO feed. The activity of the intercalated clay/USY mixture was clearly higher than either DELTA-400 catalyst or the neat intercalated clay. A synergistic effect must have been present, since the mixed component activity was greater than the sum of the other two activities. The invention clay probably intereacts with the heavier molecules such that molecular traffic to and from the zeolitic component is facilitated. In FIG. 4, "CAT-/OIL" is the weight ratio of catalyst to feed. In FIGS. 4 to 10 (plus FIG. 11), "clay" means the invention intercalated clay.

Figure 5:
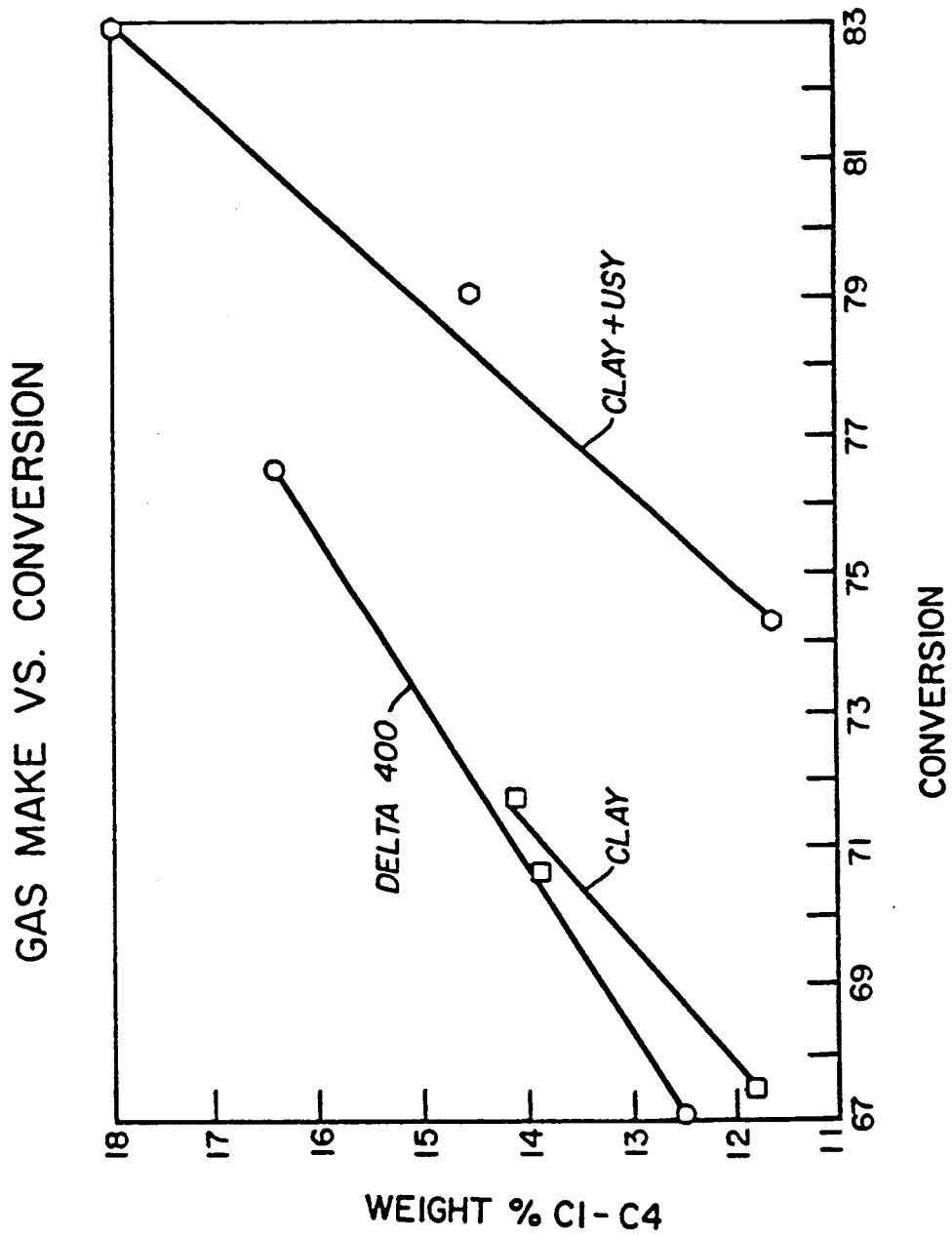
FIG. 5 is a graph of gas-make versus conversion for various catalysts.

FIG. 5 demonstrates the lower gas ($C_1$-$C_4$) making ability of the mixed component catalyst with respect to DELTA-400 catalyst or the neat clay. Again, a synergism is occurring since neither USY nor neat clay exhibit such low gas make.

Figure 6:
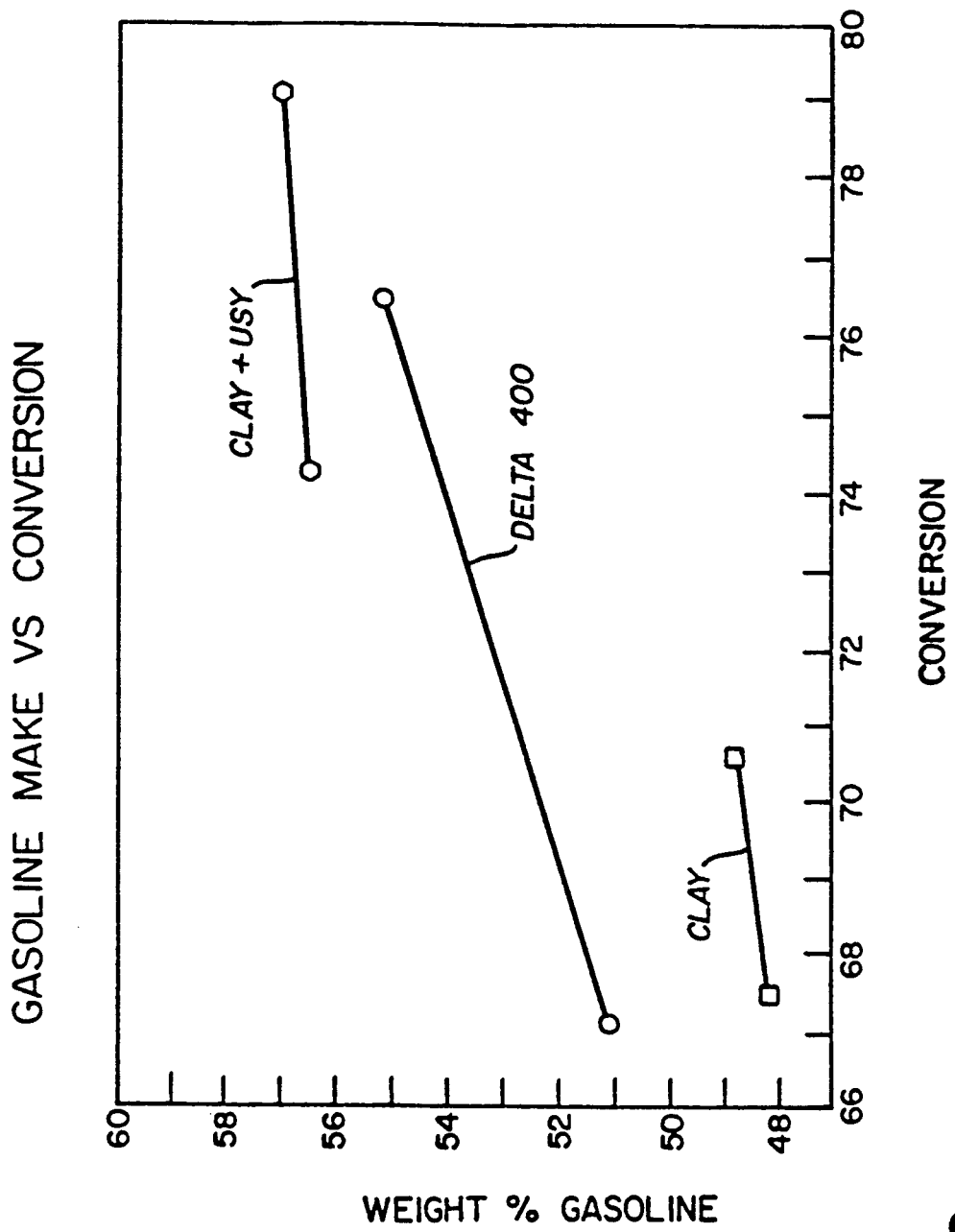
FIG. 6 is a graph of gasoline-make versus conversion for various catalysts.
Figure 7:
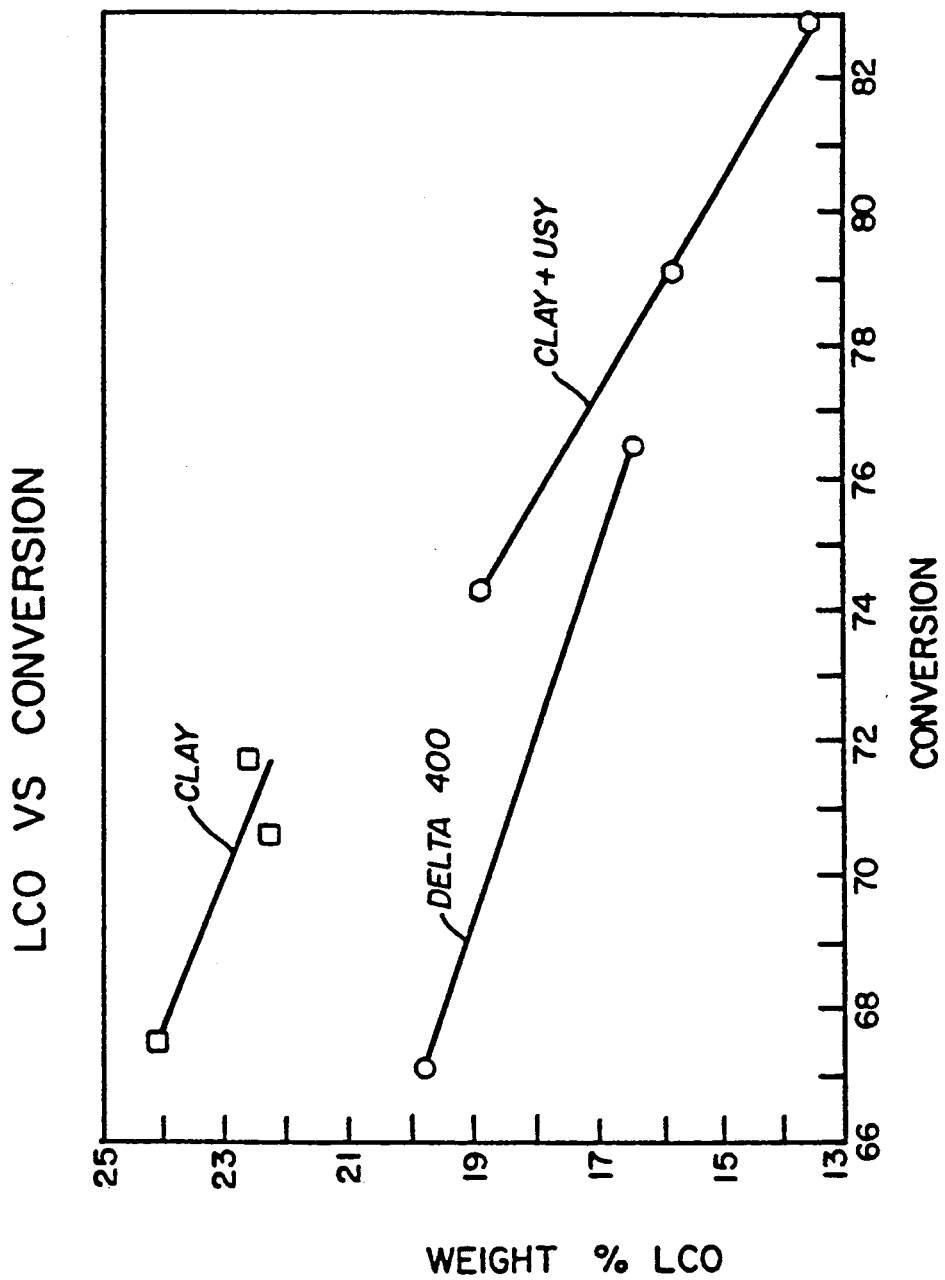
FIG. 7 is a graph of light cycle oil (LCO) make versus conversion for various catalysts.
Figure 8:
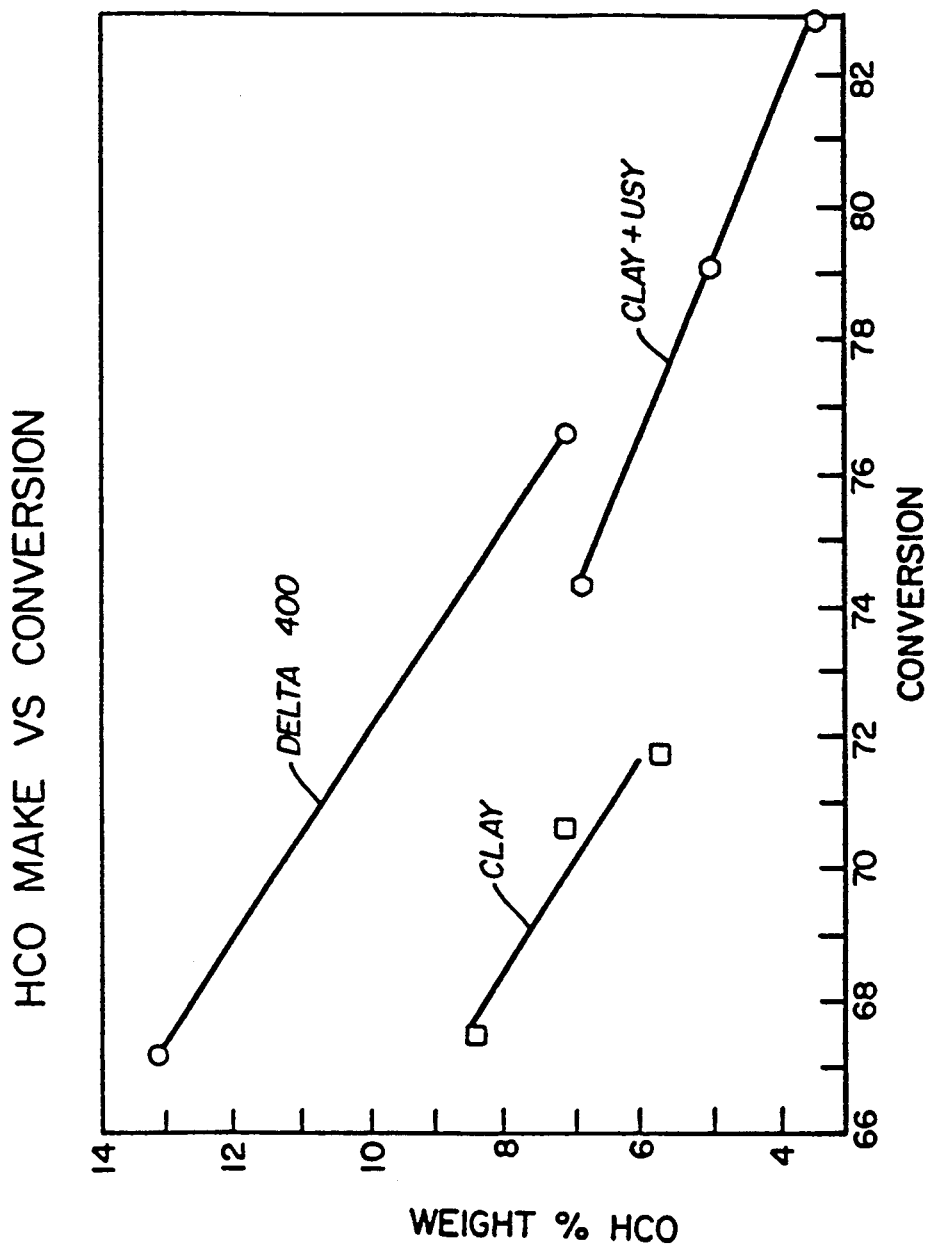
FIG. 8 is a graph of heavy cycle oil (HCO) make versus conversion for various catalysts.
Figure 9:
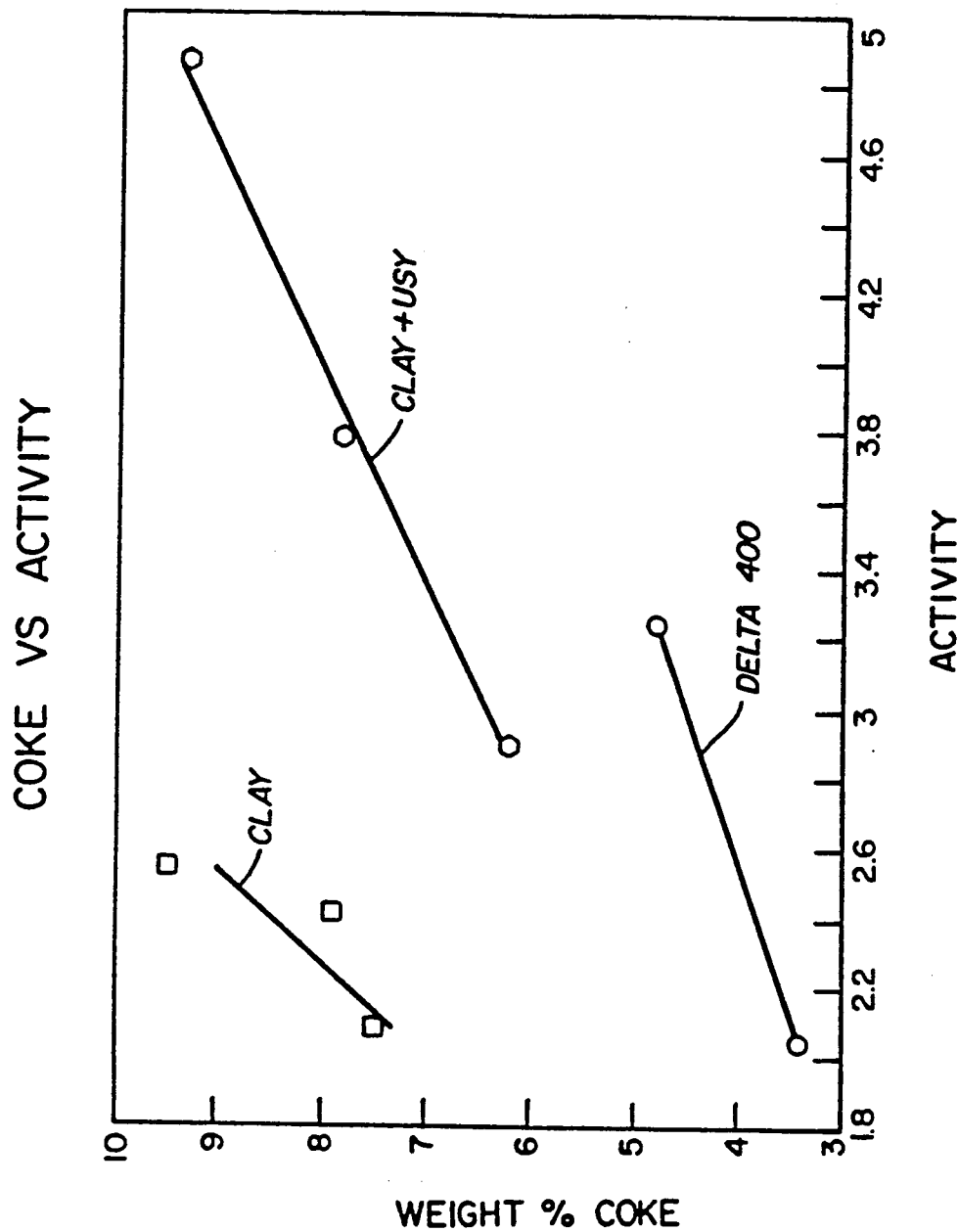
FIG. 9 is a graph of coke make versus activity for various catalysts.
Figure 10:
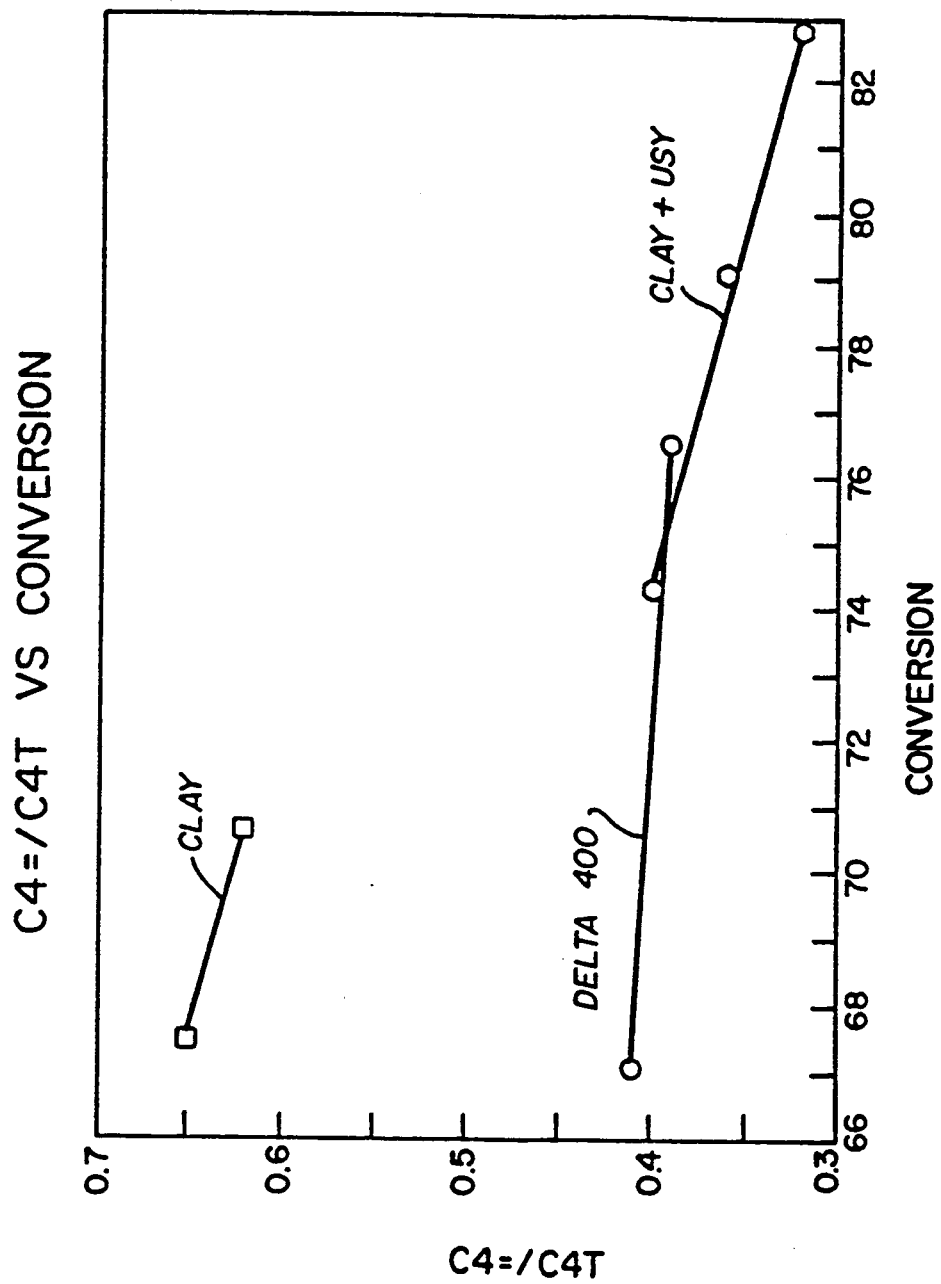
FIG. 10 is a graph of C$_4$=/C$_4$ total versus conversion for several catalysts.

The liquid yield distributions for these materials shown in FIGS. 6 to 8 are also unique. The neat clay makes less gasoline than DELTA-400 catalyst at constant conversion because of its greatly enhanced coke make. However, the mixed component system shows extremely low gas make, resulting in better gasoline selectivity than DELTA-400 catalyst. Both clay containing catalysts significantly reduce HCO make compared to DELTA-400 catalyst and show improved LCO selectivity. At 67 percent conversion, the mixed component catalyst shows a 17 percent increase while the neat clay produces 25 percent more LCO than DELTA-400 catalyst. The large less restrictive pore size of the clay is undoubtedly responsible for this difference in LCO/HCO distribution. The coke make of the neat clay as shown in FIG. 9 is much greater than the other two catalysts, while the DELTA-400 catalyst produces significantly less coke than even the mixed component catalyst. The large coke-make is attributable to several factors. First, since the clay probably has weak acidity and large porosity it could readily absorb large molecules which could not be cracked but were dehydrogenated or condensed to coke. This behavior would be typical of any system which strongly interacts with large aromatic molecules, which do not readily undergo bond rupture. Second, as can be seen in FIG. 10, these clay systems exhibit poor hydrogen transfer ability as reflected in the high olefin to paraffin ratio. Part of this is due to the high iron content of the clay, while part is also due to its low active site density.

iron in the clay translates to an additional 1.2 percent coke (with an iron-free clay producing 1.4 percent coke) at 60 percent conversion. Though large pore openings and low active site density are undoubtedly responsible for some of the coke-make, the iron in the clay contributes a substantial quantity.

To observe the effect of contaminant metals on intercalated clay the catalysts described in Example 24 (spray-dried intercalated clay neat and containing 20 percent of USY catalyst were tested for vanadium poisoning along with DELTA-400 catalyst as a standard. Vanadium tolerance of the three catalysts is shown in Table IV.

TABLE IV

Microactivity Data for the Vanadium Poisoning of Intercalated Clay With and Without LZY-82

| | Sample Number | | | | | | | | |
|---|---|---|---|---|---|---|---|---|---|
| | 25-1 | 25-2 | 25-3 | 25-4 | 25-5 | 25-6 | DELTA-400 | DELTA-400 | DELTA-400 |
| LZY-82, Wt. % | 0 | 0 | 0 | 20 | 20 | 20 | 30 | 30 | 30 |
| INTERCALATED CLAY, WT. % | 100 | 100 | 100 | 80 | 80 | 80 | 0 | 0 | 0 |
| VANADIUM, WT. % | 0 | 0.5 | 1.0 | 0 | 0.5 | 1.0 | 0 | 0.5 | 1.0 |
| SA, AFTER 1400° F. STEAM 5 HRS. | 262 | 140 | 51 | 360 | 166 | 78 | | | |
| CONVERSION, % | 64.1 | 37.3 | 14.9 | 82.4 | 63.3 | 27.1 | 75.4 | 63.1 | 33.4 |
| $C_1$-$C_4$, WT. % | 13.7 | 4.6 | 1.8 | 15.7 | 9.9 | 2.6 | | | |
| GASOLINE, W. % | 46.6 | 28.5 | 11.2 | 61.0 | 48.5 | 24.6 | 57.1 | 49.2 | 26.3 |
| LCO, WT. % | 29.2 | 35.0 | 39.4 | 145.4 | 26.1 | 41.5 | 18.6 | 24.4 | 31.1 |
| LCO SELECTIVITY | 81.4 | 55.8 | 46.3 | 87.9 | 71.0 | 57.0 | 75.6 | 66.1 | 46.7 |
| HCO, WT. % | 6.7 | 27.7 | 45.7 | 2.1 | 10.7 | 31.3 | 6.0 | 12.5 | 35.5 |
| COKE, WT. % | 3.8 | 4.2 | 4.1 | 5.7 | 4.8 | 4.4 | 2.2 | 2.8 | 2.4 |

The flexibility of a mixed catalyst system (including the intercalated clay of the invention) provides a wide range of product distributions because of the different catalytic behavior (i.e., selectivity) between intercalated clay and zeolite. The mixed catalyst systems may include blends of intercalated clay with zeolite and other additives (e.g., peptized or amorphous alumina). A specific example contains 1 to 60 percent intercalated clay, 1 to 40 percent of zeolite catalyst, g1 to 30 percent of alumina, with the balance being kaolin. Catalysts of such mixed component system exhibit optimum LCO selectivity, bottoms cracking and/or heavy metals resistance.

EXAMPLE 25

Effect Of Contaminant Metals On Intercalated Clays

Up to this point in the experiments, the products distributions of the intercalated clays have been very similar regardless of the reaction conditions during synthesis of the oligomer. The coke-make is relatively high (coke factor about 3) compared to USY catalyst containing catalysts using normal feed (KLS-185). One possible reason is that the pores of these clays are larger than conventional cracking catalysts whereby larger molecules such as coke precursors are no longer restricted. Another contributor to coke could be that the iron present in the clay may be active and responsible for dehydrogenation reactions.

Figure 11:
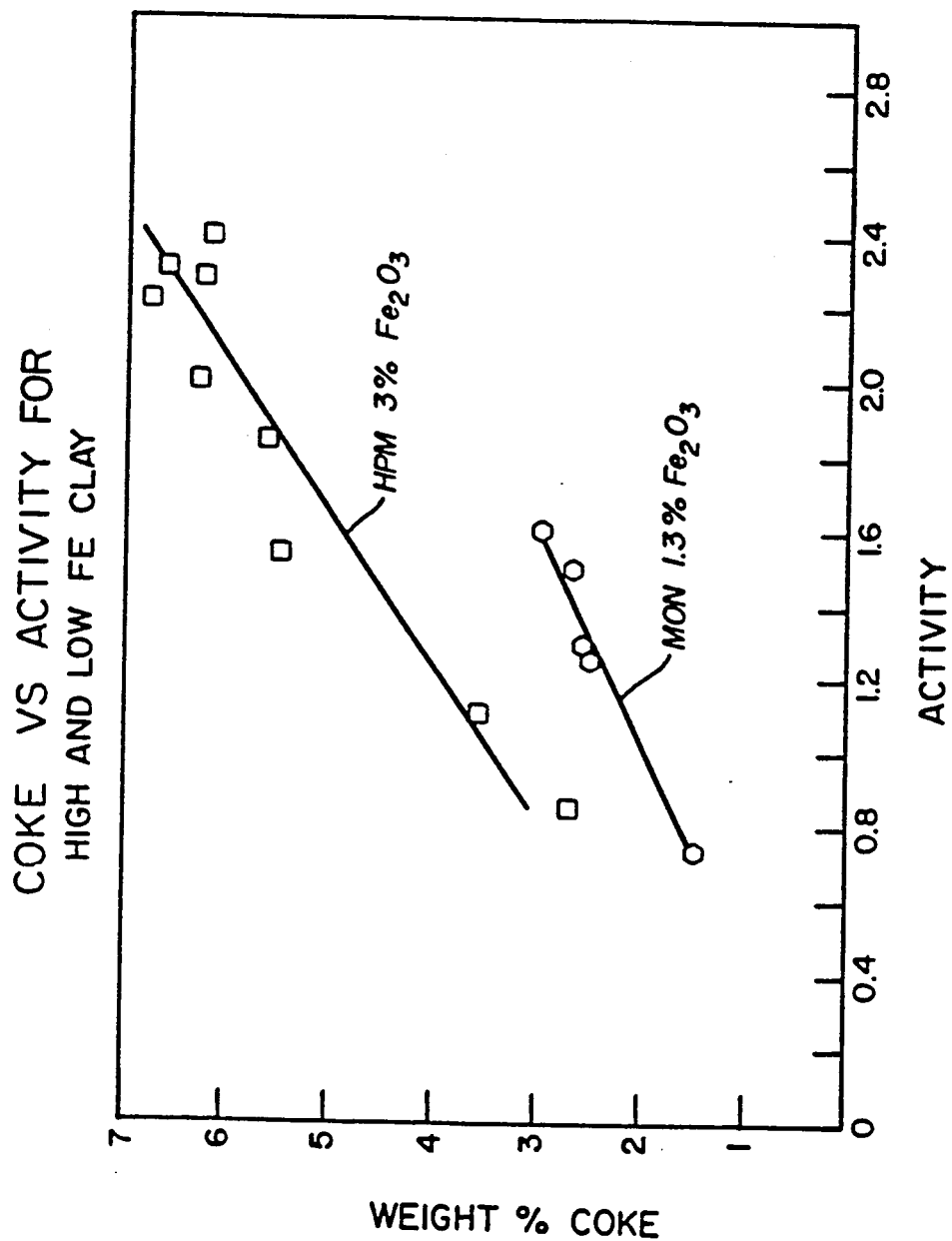
FIG. 11 is a graph of coke versus activity for high and low iron pillared clays.

Two clays containing different quantities of iron (montmorillonite $Fe_2O_3$ was 1.3 percent and HPM-20 $Fe_2O_3$ was 3.0 percent) were intercalated as described in the previous sections. Since coke-make is a function of activity, several preparations were made so results could be compared at constant activity. In FIG. 11, "HPM" is a bentonite clay and "MON" is a montmorillonite clay the higher iron clay produces approximately 65 percent more coke than the lower iron clay. Though the data is limited, it appears that every weight percent Neat clay shows very poor vanadium tolerance while the mixed component system is superior (on a zeolite content basis) to DELTA-400 catalyst. Since 20 percent of USY in an alumina matrix without vanadium poisoning gives 68 percent conversion, the preponderant effect of the vanadium is on the clay portion of the mixed component system. It is not known whether the drastic loss of conversion between 0.5 and 1.0 weight percent vanadium for the mixed component results from vanadium attacking the zeolite or if destruction of the clay produced a diffusional barrier to the zeolite. Vanadium tolerance of a physical blend of USY-containing catalyst and a neat clay catalyst, therefore, might be superior to the one particle mixture.

EXAMPLES 26 AND 27

Figure 12:
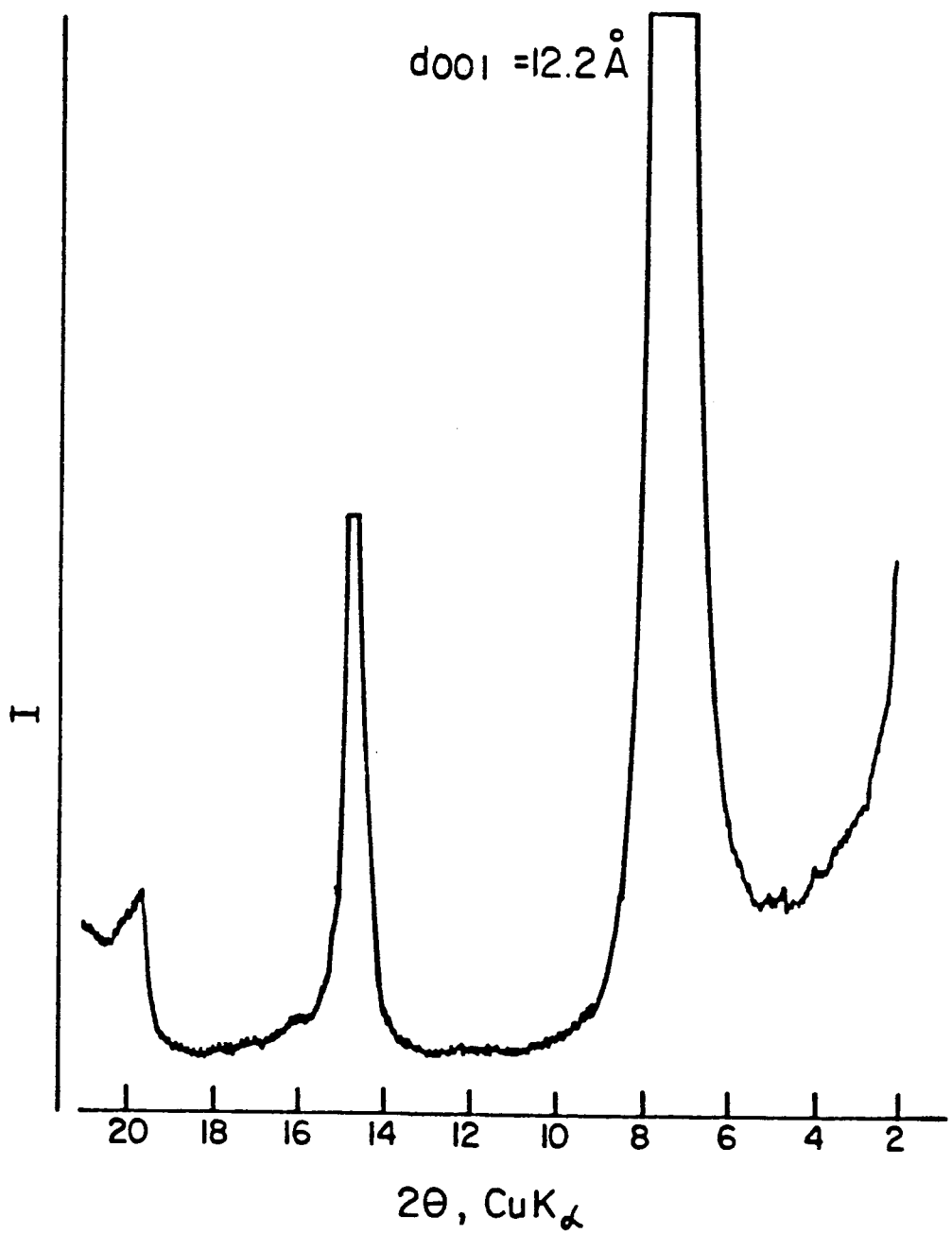
FIG. 12 is an X-ray diffraction scan of unreacted (raw) fluorhectorite.

An X-ray diffraction scan (FIG. 12) was made of unreacted fluorhectorite (a synthetic clay) which had been expanded by inclusion in water (Example 26). As can be seen from FIG. 12, the unreacted fluorhectorite has a $d_{001}$ spacing of 12.2 Å. The X-ray diffraction scan data for the unreacted (raw) fluorhectorite is:

TABLE V

| $2\theta$, CuK$\alpha$ | Å | Intensity[1] |
|---|---|---|
| 7.238 | 12.2132 | 8029 |
| 14.555 | 6.0856 | 640 |
| 19.627 | 4.5229 | 207 |
| 26.591 | 3.3521 | 285 |
| 29.376 | 3.0404 | 2056 |
| 34.429 | 2.6049 | 324 |
| 36.354 | 2.4712 | 357 |
| 39.626 | 2.2744 | 341 |
| 42.473 | 2.1283 | 180 |
| 44.337 | 2.0430 | 300 |
| 44.880 | 2.0196 | 363 |
| 47.028 | 1.9322 | 124 |
| 53.445 | 1.7144 | 198 |
| 55.607 | 1.6527 | 301 |
| 59.999 | 1.5418 | 246 |
| 61.176 | 1.5150 | 638 |

TABLE V-continued

| 2θ, CuKα | Å | Intensity[1] |
|---|---|---|
| 67.008 | 1.3966 | 343 |

Note:
[1] Intensity is measured in counts per second.

Figure 13:
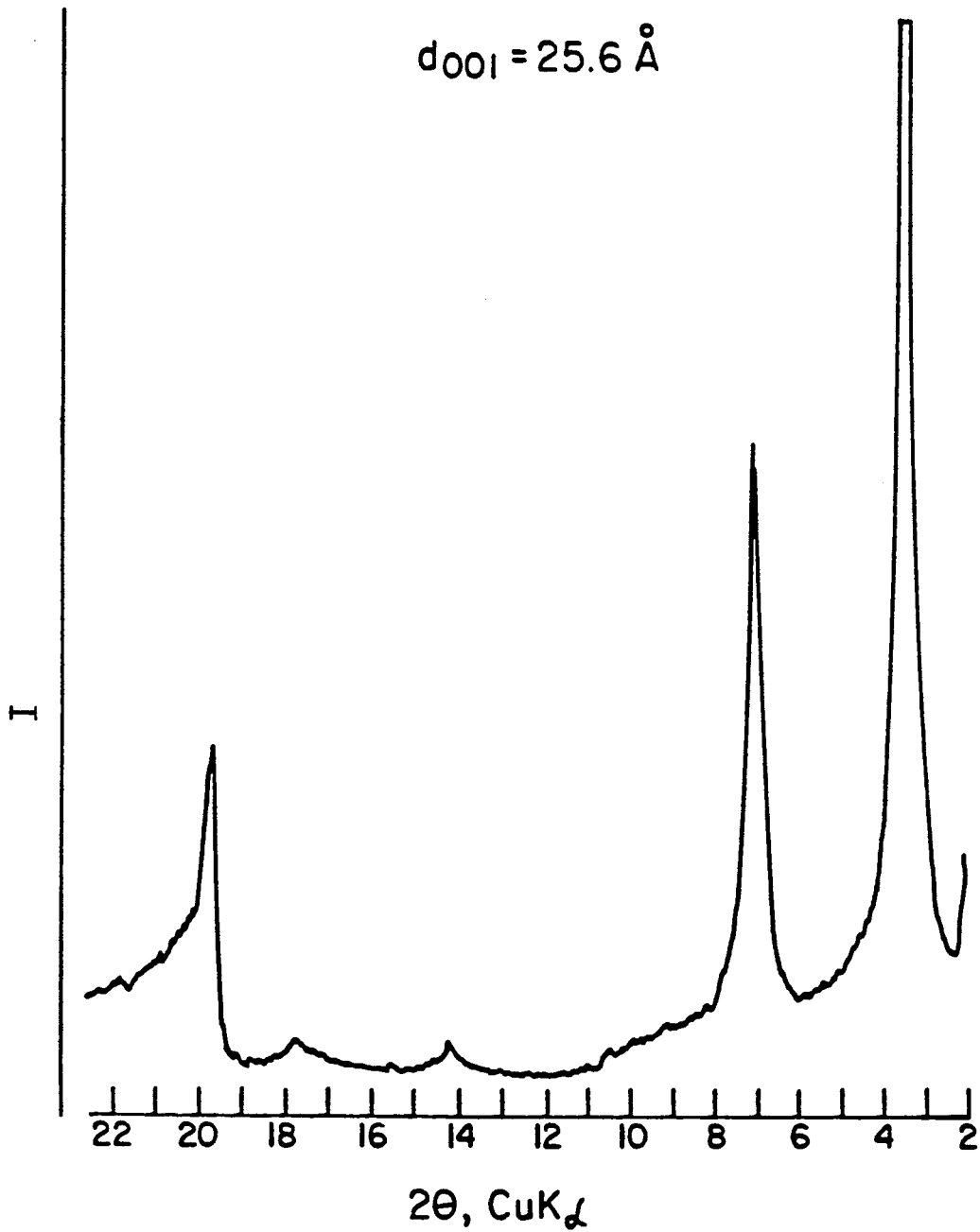
FIG. 13 is an X-ray diffraction scan of the intercalated fluorhectorite of the invention.

An X-ray diffraction scan was made (FIG. 13) of intercalated fluorhectorite (that is, fluorhectorite reacted in water with oligomers prepared from chlorhydrol/cerium), Example 27. As can be seen from FIG. 13, the intercalated fluorhectorite has a $d_{001}$ spacing of 25.6 Å. The X-ray diffraction scan data for the intercalated fluorhextorite is:

TABLE VI

| 2θ, CuKα | Å | Intensity[1] |
|---|---|---|
| 3.455 | 25.5722 | 2654 |
| 6.955 | 12.7084 | 1230 |
| 14.025 | 6.314 | 140 |
| 17.544 | 5.0549 | 147 |
| 19.567 | 4.5367 | 712 |
| 26.597 | 3.3513 | 304 |
| 28.238 | 3.165 | 307 |
| 29.143 | 3.0642 | 276 |
| 34.569 | 2.5946 | 478 |
| 35.970 | 2.4967 | 483 |
| 37.797 | 2.3801 | 394 |
| 39.674 | 2.2717 | 353 |
| 40.397 | 2.2327 | 343 |
| 44.036 | 2.0563 | 294 |
| 53.291 | 1.7190 | 356 |
| 61.064 | 1.5175 | 1168 |
| 62.956 | 1.4763 | 290 |

The pore opening of the intercalated fluorhextorite clay is 13.4 Å (that is, the difference between the $d_{001}$ value of the intercalated fluorhectorite and the $d_{001}$ value of the expanded unreacted fluorhectorite). The pore opening of the intercalated bentonite (invention) of Example 21 is 17.8 Å, whereas the intercalate bentonite of Example 20 is only 8.4 Å.

EXAMPLES 28 TO 35

Figure 14:
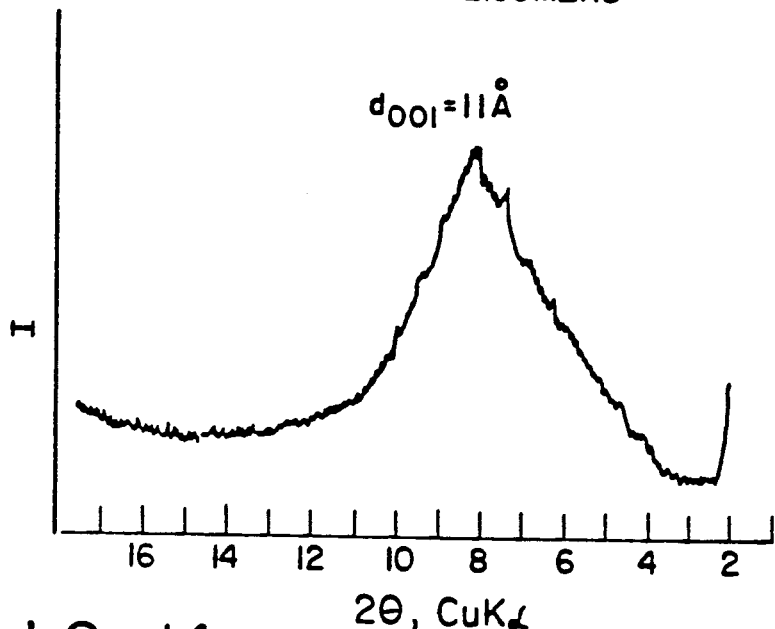
FIG. 14 is an X-ray diffraction scan of oligomers prepared from aqueous chlorhydrol.

An X-ray diffraction scan (FIG. 14) was made of oligomers which were prepared from chlorhydrol in water (Example 28) to refluxing at 106° C. There was no clay present in this example. As can be seen from FIG. 14, the oligomers had a somewhat amorphous $d_{001}$ value of 11 Å. The X-ray diffraction scan data for the oligomers is:

TABLE VII

| 2θ, CuKα | Å | Intensity[1] |
|---|---|---|
| 4.035 | 21.8952 | 98 |
| 5.786 | 15.2730 | 191 |
| 6.752 | 13.0903 | 248 |
| 7.383 | 11.9737 | 296 |
| 7.968 | 11.0955 | 355 |
| 8.570 | 10.3176 | 293 |
| 9.423 | 9.3849 | 210 |

Figure 15:
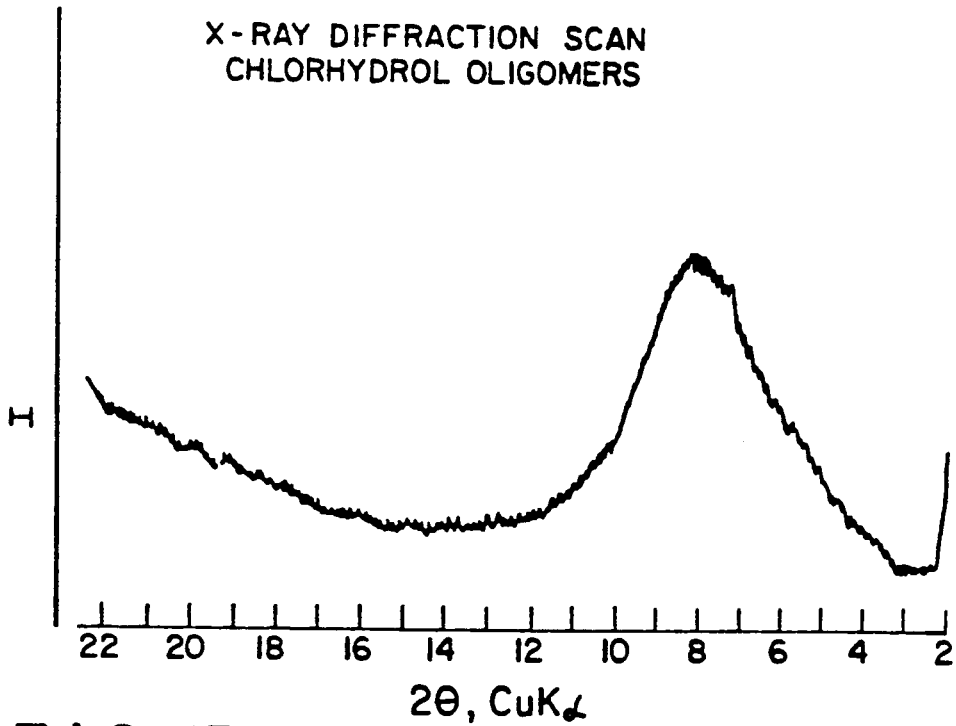
FIG. 15 is another X-ray diffraction scan of oligomers prepared from aqueous chlorhydrol.

FIG. 15 is another X-ray diffraction scan made of oligomers which were prepared from chlorhydrol in water (Example 29).

Figure 16:
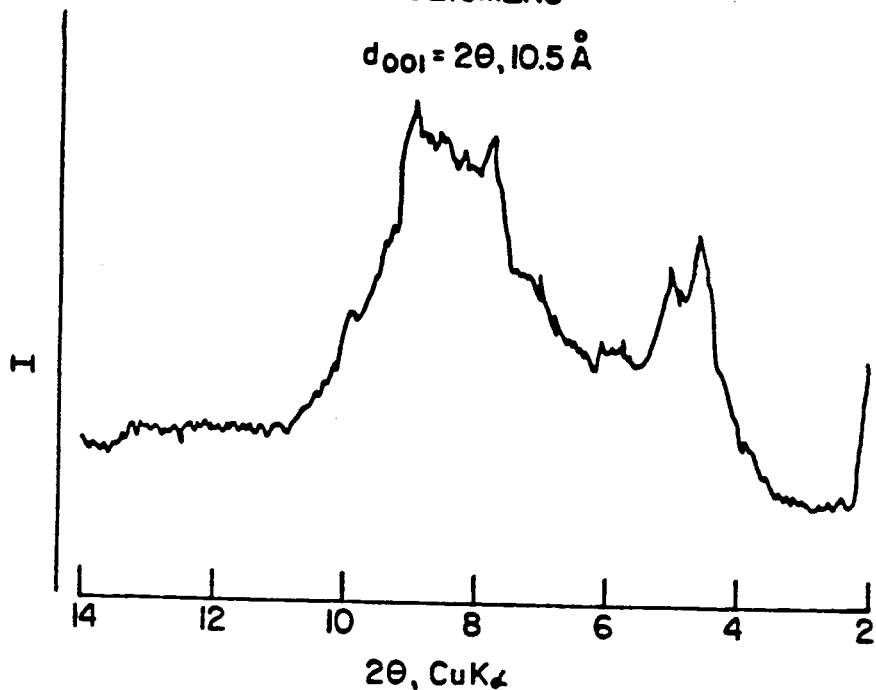
FIG. 16 is an X-ray diffraction scan of oligomers prepared from an aqueous Ce(NO$_3$)$_3$ and chlorhydrol.

An X-ray diffraction scan (FIG. 16) was made of oligomers which were prepared by refluxing (106° C.) chlorhydrol in an aqueous solution of Ce(NO3)3 for one day (Example 30). The ratio of Al to Ce was 52:1. There was no clay present in this example. As can be seen from FIG. 16, the oligomers had an ordered structure with a $d_{001}$ value of about 20 Å or 10.5 Å. The X-ray diffraction scan data for the oligomers is:

TABLE VIII

| 2θ, CuKα | Å | Intensity[1] |
|---|---|---|
| 4.500 | 19.6342 | 219 |
| 4.979 | 17.6342 | 195 |
| 5.863 | 15.0743 | 148 |
| 7.184 | 12.3047 | 179 |
| 7.738 | 11.4249 | 265 |
| 8.894 | 9.9419 | 291 |
| 12.955 | 6.8334 | 107 |

Figure 17:
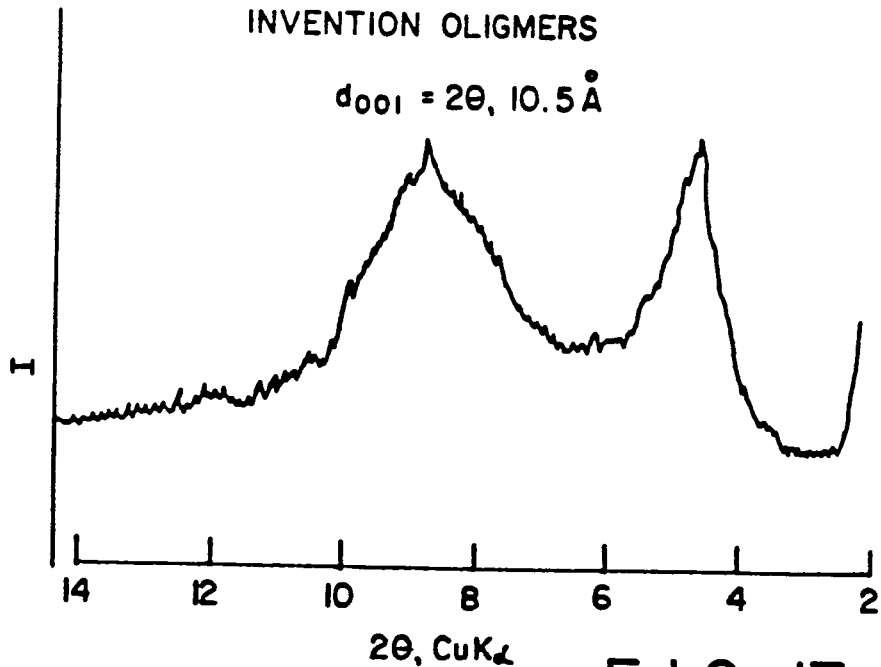
FIG. 17 is an X-ray diffraction scan of oligomers prepared from aqueous Ce(NO$_3$)$_3$ and chlorhydrol.

An X-ray diffraction scan (FIG. 17) was made of oligomers which were prepared by refluxing (106° C.) chlorhydrol in an aqueous solution of Ce(NO3)3 for four days (Example 31). The ratio of Al to Ce was 52:1.

There was no clay present in this example. As can be seen from FIG. 17, the oligomers had an ordered structure with a $d_{001}$ value of about 20 Å or 10.5 Å. The X-ray diffraction scan data for the oligomers is:

TABLE IX

| 2θ, CuKα | Å | Intensity[1] |
|---|---|---|
| 4.401 | 20.0791 | 263 |
| 8.453 | 10.4601 | 245 |

Figure 18:
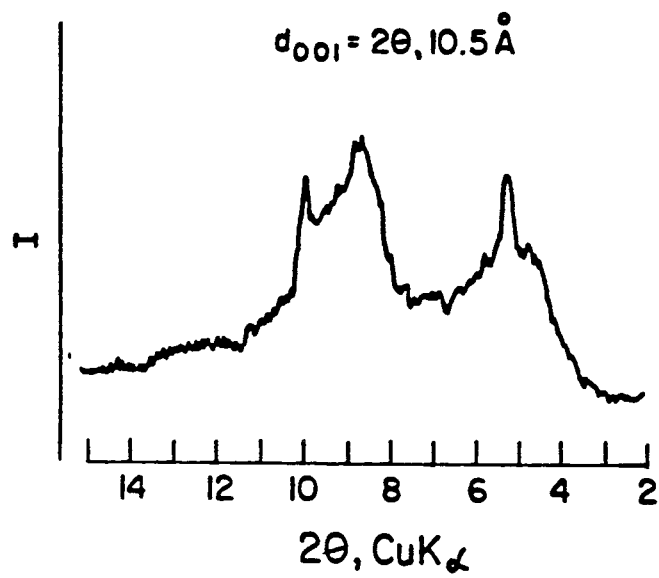
FIG. 18 is an X-ray diffraction scan of oligomers prepared from aqueous LaCl$_3$ and chlorhydrol.

An X-ray diffraction scan (FIG. 18) was made of oligomers which were prepared by refluxing (106° C.) chlorhydrol in an aqueous solution of LaCl3 for 3 months and then drying at room temperature (Example 32). The ratio of Al to La was 52:1. There was no clay present in this example. As can be seen from FIG. 18, the oligomers had an ordered structure with a $d_{001}$ value of about 20 Å or 10.5 Å. The X-ray diffraction scan data for the oligomers is:

TABLE X

| 2Θ, CuKα | Å | Intensity[1] |
|---|---|---|
| 4.606 | 19.1857 | 181 |
| 5.101 | 17.3250 | 250 |
| 5.646 | 15.6531 | 186 |
| 6.791 | 13.0151 | 155 |
| 8.535 | 10.3595 | 283 |
| 9.756 | 9.0660 | 236 |

Figure 19:
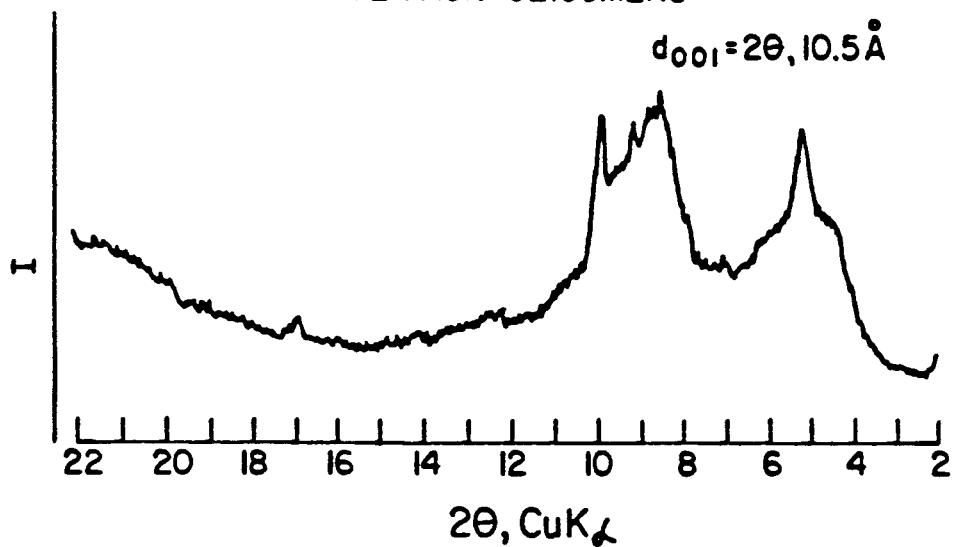
FIG. 19 is an X-ray diffraction scan of oligomers prepared from aqueous LaCl$_3$ and chlorhydrol.

FIG. 19 is another X-ray diffraction scan made of oligomers which were prepared by refluxing (106° C.) chlorhydrol in an aqueous solution of LaCl3 for 3 months and then air drying (Example 33).

Figure 20:
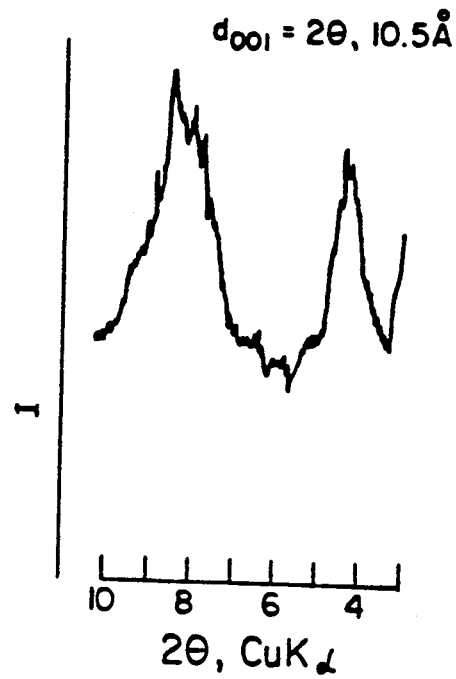
FIG. 20 is an X-ray diffraction scan of oligomers prepared from aqueous Ce(NO$_3$)$_3$ and chlorhydrol.

An X-ray diffraction sc an (FIG. 20) was made of oligomers which were prepared by refluxing (106° C.) chlorhydrol in an aqueous solution of LaCl3 for 40 days and then drying at room temperature (Example 34). The ratio of Al to La was 52:1. There was no clay present in this example. As can be seen from FIG. 20, the oligomers had an ordered structure with a $d_{001}$ value of about 20 Å or 10.5 Å. The X-ray diffraction scan data for the oligomers is:

TABLE XI

| 2Θ, CuKα | Å | Intensity[1] |
|---|---|---|
| 4.228 | 20.8971 | 168 |
| 7.931 | 11.1468 | 176 |
| 8.402 | 10.5238 | 210 |

Figure 21:
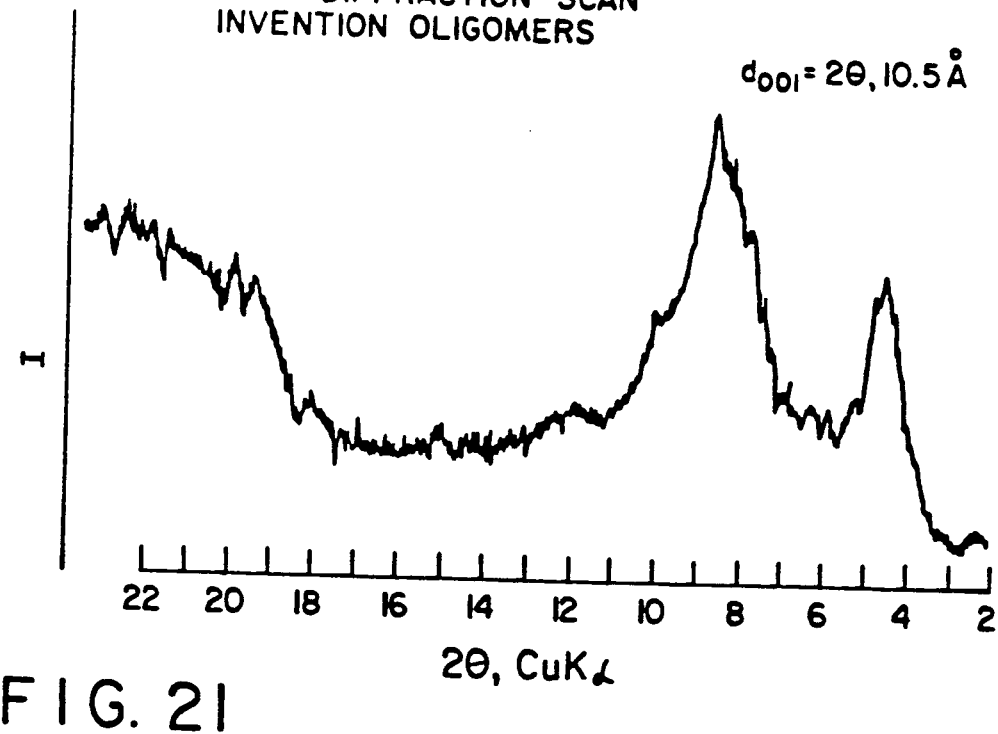
FIG. 21 is an X-ray diffraction scan of oligomers prepared from aqueous Ce(NO$_3$)$_3$ and chlorhydrol.

FIG. 21 is another X-ray diffraction scan made of oligomers which were prepared by refluxing (106° C.) chlorhydrol in an aqueous solution of Ce(NO3)3 for 40 days and then air drying (Example 35).

The above data indicates that the Al oligomer changes structure when refluxed with the rare earth element Ce or La from a somewhat amorphous $d_{001}$ value of 11 Å to a more ordered structure of about 20 Å (dependent upon the drying temperature and the reflux time).

EXAMPLES 36 TO 38

These examples illustrate the surface areas of various intercalated clays of the invention after calcining. Various oligomer refluxing preparation times and clay reaction solution aging times were used.

Several oligomer suspensions were prepared from mixtures (Al/Ce=52:1) of chlorhydrol and an aqueous solution of $Ce(NO_3)_3$ (Example 36). The mixtures were refluxed at 106° C. for 1 day. Bentonite (HPM-20) was dispersed in each of the refluxed oligomer suspensions and aged from 0 to 27 days. The following table sets out some of the experimental data and the surface areas ($m^2/g$) of the intercalated clays after calcination at 1400° F. for 16 hours.

TABLE XII

| Example No. | Weight Ratio Of Al In Oligomer To Clay | Oligomer Refluxed 1 Day Surface Areas Reacted Clay Aged, Days | | | | |
|---|---|---|---|---|---|---|
| | | 0 | 1 | 3 | 9 | 27 |
| 36-1 | 4.0 mmoles Al/g clay | 192 | 197 | 242 | 204 | 240 |
| 36-2 | 3.0 mmoles Al/g clay | 172 | 202 | 235 | 208 | 246 |
| 36-2 | 2.0 mmoles Al/g clay | 114 | 79 | 151 | 47 | 138 |

In this example, significantly larger surface areas were obtained when 3 and 4 mmoles of Al per gram of clay were used.

Example 36-2, wherein the reacted clay was aged 3 days, had a surface area of 110 $m^2/g$ after the calcination was followed by 5 hours of steam (100 percent) treatment.

Several oligomer suspensions were prepared from mixtures (Al/Ce=52:1) of chlorhydrol and an aqueous solution of $Ce(NO_3)_3$ (Example 37). An oligomer suspension was also prepared from a mixture of water and chlorhydrol. All of the mixtures were refluxed at 106° C. for 4 days. Bentonite (HPM-20) was dispersed in each of the refluxed oligomer suspensions and aged from 0 to 27 days. The following table sets out some of the experimental data and the surface areas ($m^2/g$) of the intercalated clays after calcination at 1400° F. for 16 hours.

TABLE XIII

| Example No. | Weight Ratio Of Al In Oligomer To Clay | Oligomer Refluxed 4 Days Surface Areas Reacted Clay Aged, Days | | | | |
|---|---|---|---|---|---|---|
| | | 0 | 1 | 3 | 9 | 27 |
| 37-1 | Al only (baseline case) 3.0 mmoles Al/g clay AL/CE = 52 | 46 | 165 | 175 | 164 | 134 |
| 37-2 | 3.0 mmoles Al/g clay | 278 | 258 | 281 | 353 | 328 |
| 37-3 | 2.0 mmoles Al/g clay | 192 | 118 | 126 | 124 | 156 |
| 37-4 | 1.5 mmoles al/g clay | 107 | 76 | 72 | 79 | 88 |
| 37-5 | 1.0 mmoles al/g clay | 60 | 47 | 52 | 56 | 61 |

In this example, invention intercalated clays prepared using 2 and 3 mmoles of Al per gram of clay had significantly larger surface areas than when lesser amounts of Al were used. This tends to show that wider pores (of the same height) were formed when less Al was used because there were fewer oligomer pillars formed between the expanded clay layers. The fewer the pillars, the larger the pores (due to larger widths), and hence smaller surface areas. (The d001 spacings would have stayed about the same for all of the invention intercalated clays in this example.)

Microactivity tests using a normal feed were conducted for the intercalated clays of Example 37-2. The test results are set out in the following table.

TABLE XIV

| Age Of Reflux, Days | 4 | 4 | 4 | 4 | 4 |
|---|---|---|---|---|---|
| Age of Reacted Clay, Days | 0 | 1 | 3 | 9 | 27 |
| SA 1400° F., 16 hrs, $m^2g$ | 278 | 258 | 281 | 353 | 328 |
| SA 1400° F., 5 hrs steam, $m^2/g$ | 245 | 207 | 246 | 348 | 289 |
| Conversion, % | 60.7 | 59.2 | 60.9 | 65.0 | 69.8 |
| Activity | 1.54 | 1.45 | 1.55 | 1.85 | 2.31 |
| Coke, Wt. % | 5.46 | 4.56 | 4.87 | 5.60 | 6.59 |
| Coke Factor | 3.45 | 3.05 | 3.05 | 2.97 | 2.83 |
| Gas Factor | 2.87 | 2.38 | 2.08 | 2.66 | 2.17 |
| $H_2/CH_4$ | 2.58 | 2.41 | 1.89 | 2.14 | 1.60 |
| SUM $C_1$-$C_4$, Wt. % | 10.7 | 10.5 | 11.5 | 12.4 | 12.7 |
| $C_4$=/Total $C_4$ | 0.55 | 0.56 | 0.51 | 0.51 | 0.47 |
| Gasoline, Wt. % | 44.4 | 44.0 | 44.4 | 46.9 | 50.4 |
| LCO, Wt. % | 29.0 | 29.8 | 29.7 | 27.2 | 25.0 |
| LCO, Selectivity | 73.7 | 73.1 | 75.8 | 77.7 | 82.7 |
| HCO, Wt. % | 10.4 | 11.0 | 9.47 | 7.82 | 5.23 |

The conversion and activity test results and LCO selectivity values increased and the coke factor and gas factor values decreased as the length of aging of the reacted clay increased.

Several oligomer suspensions were prepared from mixtures (Al/Ce-52:1) of chlorhydrol and an aqueous solution of $Ce(NO_3)_3$ (Example 38). The mixtures were refluxed at 106° C. for 20 days. Bentonite (HPM-20) was dispersed in each of the refluxed oligomer suspensions and aged from 0 to 27 days. The following table sets out some of the experimental data and the surface areas ($m^2/g$) of the intercalated clays after calcination at 1400° F. for 16 hours.

TABLE XV

| Example No. | Weight Ratio Of Al In Oligomer To Clay | Oligomer Refluxed 20 Days Surface Areas Reacted Clay Aged, Days | | | |
|---|---|---|---|---|---|
| | | 1 | 3 | 9 | 27 |
| 38-1 | 5.0 mmoles Al/g clay | 394 | 408 | 438 | 378 |
| 38-2 | 3.0 mmoles Al/g clay | 416 | 418 | 431 | 433 |

TABLE XV-continued

| Example No. | Weight Ratio Of Al In Oligomer To Clay | Oligomer Refluxed 20 Days Surface Areas Reacted Clay Aged, Days | | | |
|---|---|---|---|---|---|
| | | 1 | 3 | 9 | 27 |
| 38-3 | 2.0 mmoles Al/g clay | 229 | 217 | 223 | 247 |

In this example, the intercalated clays containing 3 and 5 moles of Al per gram of clay had significantly larger surface areas than when lesser amounts of Al were used. Comparison of the 3 mmole of Al levels in Example 36 to 38 shows that larger reflux times during oligomer preparation results in larger surface areas.

Micrcactivity tests using a normal feed were conducted for the intercalated clays of Example 38-2. The test results are set out in the following table.

TABLE XVI

| Age of Reflux, Days | 20 | 20 | 20 | 20 |
|---|---|---|---|---|
| Age of Reacted Clay, Days | 1 | 3 | 9 | 27 |
| SA 1400° F., 16 hrs, m²g | 416 | 418 | 431 | 433 |
| SA 1400° F., 5 hrs steam, m²/g | 357 | 349 | 382 | 374 |
| Conversion, % | 67.9 | 66.1 | 67.9 | 68.4 |
| Activity | 2.12 | 1.95 | 2.11 | 2.17 |
| Coke, Wt. % | 5.46 | 6.73 | 6.37 | 6.29 |
| Coke Factor | 2.55 | 3.40 | 2.98 | 2.87 |
| Gas Factor | 2.07 | 2.29 | 2.37 | 2.22 |
| $H_2/CH_4$ | 1.56 | 1.62 | 1.66 | 1.52 |
| SUM $C_1$-$C_4$, Wt. % | 14.6 | 12.4 | 13.1 | 13.8 |
| $C_4$=/Total $C_4$ | 0.52 | 0.50 | 0.52 | 0.48 |
| Gasoline, Wt. % | 47.8 | 46.8 | 48.3 | 48.2 |
| LCO, Wt. % | 26.6 | 27.7 | 26.2 | 25.6 |
| LCO, Selectivity | 82.9 | 81.6 | 81.5 | 81.1 |
| HCO, Wt. % | 5.48 | 6.24 | 5.96 | 5.97 |

EXAMPLE 39

A series of oligomer suspensions was prepared from mixtures (Al/Ce=52:1) of chlorhydrol and an aqueous solution of $Ce(NO_3)_3$. The mixtures were refluxed at 106° C. for 4 days. Bentonite (HPM-20) was dispersed in each of the refluxed oligomer suspensions and aged for 3 days. The series of intercalated clay suspensions were filtered, dried and calcined at 1400° F. for 16 hours. Some of the intercalated clay suspensions were washed (i.e., redispersed in water and refiltered) at least one time between the filtering and drying steps. The test results are set out in the following table.

TABLE XVII

| Number of Washings | S.A., m²/g |
|---|---|
| 0 | 85 |
| 1 | 277 |
| 2 | 411 |
| 3 | 398 |
| 4 | 371 |

The surface areas (S.A.) of the intercalated clays increased dramatically with the second washing.

EXAMPLE 40

A series of oligomer suspensions were prepared from mixtures (Al/Ce-52:1) of chlorhydrol and an aqueous solution of $Ce(NO_3)_3$. The initial pH of each mixture was varied as set out in the table below. The mixtures were refluxed at 106° C. for 4 days. As shown in the following table, the pH of the refluxed oligomer suspensions went to 3.1 regardless of the initial pH (within the range tested).

TABLE XVIII

| Mixture | Initial pH | Final pH |
|---|---|---|
| 40-1 | 3.96 | 3.11 |
| 40-2 | 3.80 | 3.10 |
| 40-3 | 3.66 | 3.12 |
| 40-4 | 2.90 | 3.09 |

EXAMPLE 41

An oligomer suspension was prepared from a mixture of chlorhydrol and water; and an oligomer suspension was prepared from a mixture of (Al/Ce=52:1) of chlorhydrol and an aqueous solution of $Ce(NO_3)_3$. Both mixtures were refluxed at 106° C. for 18 days. Bentonite (HPM-20) was dispersed in each of the refluxed oligomer suspensions and aged for 3 days. The intercalated clay suspensions were calcined at 1400° F. for 16 hours and treated with steam 100 percent for 5 hours. Microactivity tests using a normal feed were conducted for the intercalated clays. The test results are set out in the following table.

TABLE XIX

| Oligomer | Time Refluxed | SA After 1400° F. 5 hr., (100%) Steam | Mat Conversion | Activity[1] |
|---|---|---|---|---|
| Chlorhydrol (Al) only | 18 Days | 58 m2/g | 25.45 | 0.34 |
| Chlorhydrol and $Ce(NO_3)_3$ (Al/Ce = 52:1) | 18 Days | 255 m2/g | 67.92 | 2.12 |

Note:
[1]Activity, assuming a first order reaction, is the conversion divided by the quantity (100-conversion)

The steam treatment caused the structure of the intercalated clay prepared from chlorhydrol (Al only) to collapse, as shown by its very low surface area, whereas the structure of the invention intercalated clay did not collapse, as shown by its much larger surface area. The activity of the steam-treated intercalated clay was at least six times as large as activity of the steam-treated intercalated clay prepared from chlorhydrol (Al only).

EXAMPLE 42

Three oligomer suspensions were prepared from mixtures (Al/Ce=13.7:1g) of chlorhydrol solution (50 percent by weight; 23.8 percent $Al_2O_3$) and an aqueous $Ce(NO_3)_3$ solution (29 percent $CeO_2$). In the mixtures, the $CeO_2$ content was 29 weight percent and the $Al_2O_3$ content was 23.8 weight percent. The mixtures were refluxed at 106 for 101 hours and then aged 10 days at room temperature. Bentonite was dispersed in each of the refluxed oligomer suspensions (with the pH of the resultant highly water diluted solutions being 4.56) and aged for 3 days. After filtering and drying, the intercalated clays were calcined for one hour at 500° C. and the surface areas were measured. The intercalated clays were then calcined for 16 hours at 800° C. and the surface areas were measured. The calcined intercalated clays were treated with steam (100 percent) for 5 hours at 1400° F. and the surface areas were measured. The test conditions and results are set out in the following table.

TABLE XX

| Example No. | 41-1 | 41-2 | 41-3 |
|---|---|---|---|
| Intercalated Clay[1] | 40 | 55 | 80 |

TABLE XX-continued

| Example No. | 41-1 | 41-2 | 41-3 |
|---|---|---|---|
| SA, 500° C., 1 hr. | 300 | 266 | 239 |
| SA, 800° C., 16 hrs. | 178 | 183 | 118 |
| WSA | −40.7 | −31.2 | −50.6 |
| SA, 1400° F., 5 hrs. Steam | 202 | 166 | 126 |
| WSA After Steaming, % | +13.5 | −9.3 | +6.8 |
| Conversion | 58.4 | 42.3 | 44.8 |
| Activity | 1.40 | 0.73 | 1.81 |
| $C_1$-$C_4$, Wt. % | 10.5 | 10.1 | 7.7 |
| Gasoline, Wt. % | 43.4 | 28.6 | 34.0 |
| LCO, Wt. % | 29.2 | 23.43 | 2.3 |
| HCO, Wt. % | 12.5 | 34.32 | 2.9 |
| $\frac{LCO \times 100}{LCO + Gasoline} = A$ | 40.2 | 45.0 | 51.3 |
| $\frac{LCO \times 100}{HCO + LCO} = B$ | 70.0 | 40.6 | 58.5 |
| Selectivity, (A + B) | 110.2 | 85.6 | 109.8 |
| Coke, Wt. % | 4.4 | 3.5 | 3.1 |

Note:
[1] Grams of oligomer per 30 grams of clay.

The test data demonstrates that refluxed oligomers (Al/Ce=13.7:1) at an initial pH will react with expandable clays to yield intercalated clays, which are very hydrothermally stable catalysts.

EXAMPLES 43 TO 49

These examples demonstrate, by the high conversions after steaming achieved thereby, that the ratio of Al/Ce/$H_2O$ (and as a consequence, the pH) can be varied during the formation of the oligomers over a wide range.

Three oligomer suspensions were prepared from mixtures of chlorhydrol and an aqueous solution of Ce($NO_3$)$_3$ (Example 43 to 45). The ratio of Al to Ce to $H_2O$ is given in the following table. The mixtures were refluxed at 106° C. for the times indicated in the following table. The clays (and their amounts) indicated in the following table were dispersed in the oligomer suspensions and aged for 3 days. The reacted clays were filtered, dried, calcined at 760° C. for 6 hours (except for Example 45) and then steamed (100 percent steam at 1400° F. for 5 hours. The test results are set out in the following table.

Four oligomer suspensions were prepared from mixtures of chlorhydrol and an aqueous solution of Ce($NO_3$)$_3$ (Examples 46 to 49). The ratio of Al to Ce to $H_2O$ is given in the following table. The mixtures were placed in Parr bombs at the temperatures and for the times indicated in the following table. The clays (and their amounts) indicated in the following table were dispersed in the oligomer suspensions and aged for 3 days. The reacted clays were filtered, dried, calcined at 760° C. for 16 hours and then steamed (100 percent steam) at 1400° F. for 5 hours. The test results are set out in the following table.

TABLE XXI

| Example No. | 43 | 44 | 45 | 46 | 47 | 48 | 49 |
|---|---|---|---|---|---|---|---|
| Reaction Type | Reflux[1] | Reflux[1] | Reflux[1] | Bomb[2] | Bomb[2] | Bomb[2] | Bomb[3] |
| Clay | Mon[4] | HPM-20[5] | Ben[6] | Ben[6] | Ben[6] | Ben[6] | Ben[6] |
| Ratio Al/Ce/$H_2O$[7] | 5/1/5 | 5/1/0 | 5/1/5 | 20/10/16 | 20/20/0 | 25/4/20 | 20/20/0 |
| Ratio $\frac{React.}{Clay}$ | — | 24/30 | 55/30 | 46/30 | 40/30 | 49/30 | 40/30 |
| Time, Hr. | 46 | 305 | 49 | 70 | 90 | 192 | 92 |
| Sa, 760° C., 16 hr.[8] | 283 | 286 | — | 262 | 238 | 315 | 255 |
| SA, 1400° F., 5 hr. Steam | 123 | 248 | 176 | 279 | 254 | 320 | 253 |
| ΔSA, After Steaming, % | — | −13.3 | — | — | — | +1.6 | −0.8 |
| Conversion | 59.4 | 65.8 | 66.1 | 67.6 | 63.9 | 67.0 | 64.3 |
| $C_1$-$C_4$, Wt. % | 13.5 | 11.3 | 11.2 | 13.0 | 12.4 | 13.5 | 11.5 |
| Gasoline, Wt. % | 43.1 | 50.1 | 50.4 | 49.4 | 46.6 | 48.0 | 47.9 |
| LCO, Wt. % | 29.0 | 26.7 | 25.9 | 26.4 | 29.0 | 27.0 | 27.8 |
| HCO, Wt. % | 11.6 | 7.5 | 8.0 | 6.0 | 7.1 | 6.0 | 8.0 |
| Coke, Wt. % | 2.7 | 4.3 | 4.4 | 5.1 | 4.7 | 5.4 | 4.8 |

Notes:
[1] Refluxed at 106° C.
[2] Temperature was 130° C.
[3] Temperature was 145° C.
[4] Mon is monmorillonite
[5] HPM-20 is a bentonite
[6] BEN is bentonite
[7] The Al was present as an aqueous chlorhydrol solution (50 percent by weight; 23.8 percent $Al_2O_3$). The Ce was present as an aqueous Ce($NO_3$)$_3$ solution (29 percent $CeO_2$).
[8] Calcined

EXAMPLES 50 TO 63

These examples demonstrate that oligomer formation is a function of time and temperature [that is, 106° C. vs. 130° C. vs. 145° C. (the latter is less favorable)]. Seven oligomer suspensions were prepared from mixtures (Al/Ce=2.74:1) of chlorhydrol and an aqueous solution of Ce($NO_3$)$_3$ (Examples 50 to 56). The mixtures were refluxed at 106° C. for the times indicated in the following table. The same amount of bentonite was dispersed in equal amounts of the oligomer suspensions and aged for three days. The reacted clays were filtered, dried, calcined at 800° C. for 16 hours and then, in Examples 54 to 56, steamed (100 percent steam) at 1500° F. for 5 hours. The test results are set out in the following table.

TABLE XXII

| Example No. | 50 | 51 | 52 | 53 | 54 | 55 | 56 |
|---|---|---|---|---|---|---|---|
| Time, hr.[1] | 0 | 24 | 48 | 72 | 98 | 168 | 192 |
| SA, 800° C., 16 hr.[2] | 20 | 40 | 90 | 150 | 214 | 221 | 193 |
| SA, 1500° F., 5 hr. Steam | | | | | 89 | 117 | 109 |

TABLE XXII-continued

| Example No. | 50 | 51 | 52 | 53 | 54 | 55 | 56 |
|---|---|---|---|---|---|---|---|
| ΔSA After Steaming, % | | | | | −58.4 | −47.1 | −43.5 |
| Conversion | | | | | 38.0 | 43.8 | 44.6 |
| $C_1$-$C_4$, Wt. % | | | | | 5.9 | 7.0 | 7.3 |
| Gasoline, Wt. | | | | | 29.6 | 33.9 | 34.6 |
| LCO, Wt. % | | | | | 33.2 | 33.9 | 32.5 |
| HCO, Wt. % | | | | | 28.8 | 22.3 | 22.9 |
| $\frac{LCO \times 100}{LCO + Gasoline} = A$ | | | | | 52.9 | 50.0 | 51.6 |
| $\frac{LCO \times 100}{HCO + LCO} = B$ | | | | | 53.5 | 60.3 | 58.7 |
| Selectivity, (A + B) | | | | | 106 | 110 | 110 |
| Coke, Wt. % | | | | | 2.4 | 2.8 | 2.6 |

Notes:
[1] Reflux time
[2] Calcined

Four oligomer suspensions were prepared from mixtures (Al/Ce=2.74:1) of chlorhydrol and an aqueous solution of $Ce(NO_3)_3$ (Examples 57 to 60). The mixtures were placed in Parr bombs at 130° C. for the times indicated in the following table. The same amount of bentonite used above in Examples 50 to 56 was dispersed in the same amounts of the oligomer suspensions used above in Examples 50 to 56 and aged for 3 days. The reacted clays were filtered, dried, calcined at 800° C. for 16 hours and then steamed (100 percent steam) at 1500° F. for 5 hours. The test results are set out in the following table.

TABLE XXIII

| Example No. | 57 | 58 | 59 | 60 |
|---|---|---|---|---|
| Time, hr.[1] | 22 | 44 | 70 | 90 |
| SA, 800° C., 16 hr.[2] | 257 | 219 | 262 | 238 |
| SA, 1500° F., 5 hr. Steam | 171 | 220 | 279 | 254 |
| WSA After Steaming, % | −33.5 | −0.5 | 6.5 | 6.7 |
| Conversion | 51.7 | 61.9 | 67.6 | 63.9 |
| $C_1$-$C_4$ Wt. % | 8.9 | 12.1 | 13.0 | 12.4 |
| Gasoline, Wt. % | 38.6 | 44.9 | 49.4 | 46.6 |
| LCO, Wt. % | 32.0 | 23.2 | 26.4 | 29.0 |
| HCO, Wt. % | 16.3 | 14.9 | 6.0 | 7.1 |
| $\frac{LCO \times 100}{LCO + Gasoline} = A$ | 45.3 | 34.1 | 34.8 | 38.4 |
| $\frac{LCO \times 100}{HCO + LCO} = B$ | 66.3 | 60.9 | 81.5 | 80.3 |
| Selectivity, (A + B) | 111.6 | 95.0 | 116.3 | 118.7 |
| Coke, Wt. % | 4.1 | 4.8 | 5.1 | 4.7 |

Notes:
[1] Bomb reaction time at 130° C.
[2] Calcined

Three oligomer suspensions were prepared from mixtures (Al/Ce=2.74:1) of chlorhydrol and an aqueous solution of $Ce(NO_3)_3$ (Examples 61 to 63). The mixtures were placed in Parr bombs at 145° C. for the times indicated in the following table. The same amount of bentonite used above in Examples 50 to 56 was dispersed in the same amounts of the oligomer suspensions used above in Examples 50 to 56 and aged for 3 days. The reacted clays were filtered, dried, calcined at 800° C. for 16 hours and then steamed (100 percent steam) at 1500° F. for 5 hours. The test results are set out in the following tale.

TABLE XXIV

| Example No. | 61 | 62 | 63 |
|---|---|---|---|
| Time, hr.[1] | 22 | 44 | 92 |
| SA, 800° C., 16 hr.[2] | 238 | 304 | 255 |
| SA, 1500° F., 5 hr. Steam | 187 | 224 | 253 |
| WSA After Steaming, % | −21.4 | −26.3 | −0.8 |
| Conversion | | 47.5 | 64.3 |
| $C_1$-$C_4$, Wt. % | | 9.6 | 11.5 |
| Gasoline, Wt. % | | 33.4 | 47.9 |
| LCO, Wt. % | | 26.4 | 27.8 |
| HCO, Wt. % | | 26.1 | 8.0 |
| $\frac{LCO \times 100}{LCO + Gasoline} = A$ | | 44.1 | 36.7 |
| $\frac{LCO \times 100}{HCO + LCO} = B$ | | 50.3 | 77.7 |
| Selectivity, (A + B) | | 94.4 | 114.4 |
| Coke, Wt. % | | 4.4 | 4.8 |

Note:
[1] Bomb reaction time at 145° C.
[2] Calcined

EXAMPLES 64-68

Examples 64-68 demonstrate the preference of La as the desired rare earth in the alumina oligomer as shown by its more intense X-ray diffraction peaks.

EXAMPLE 64

Figure 23:
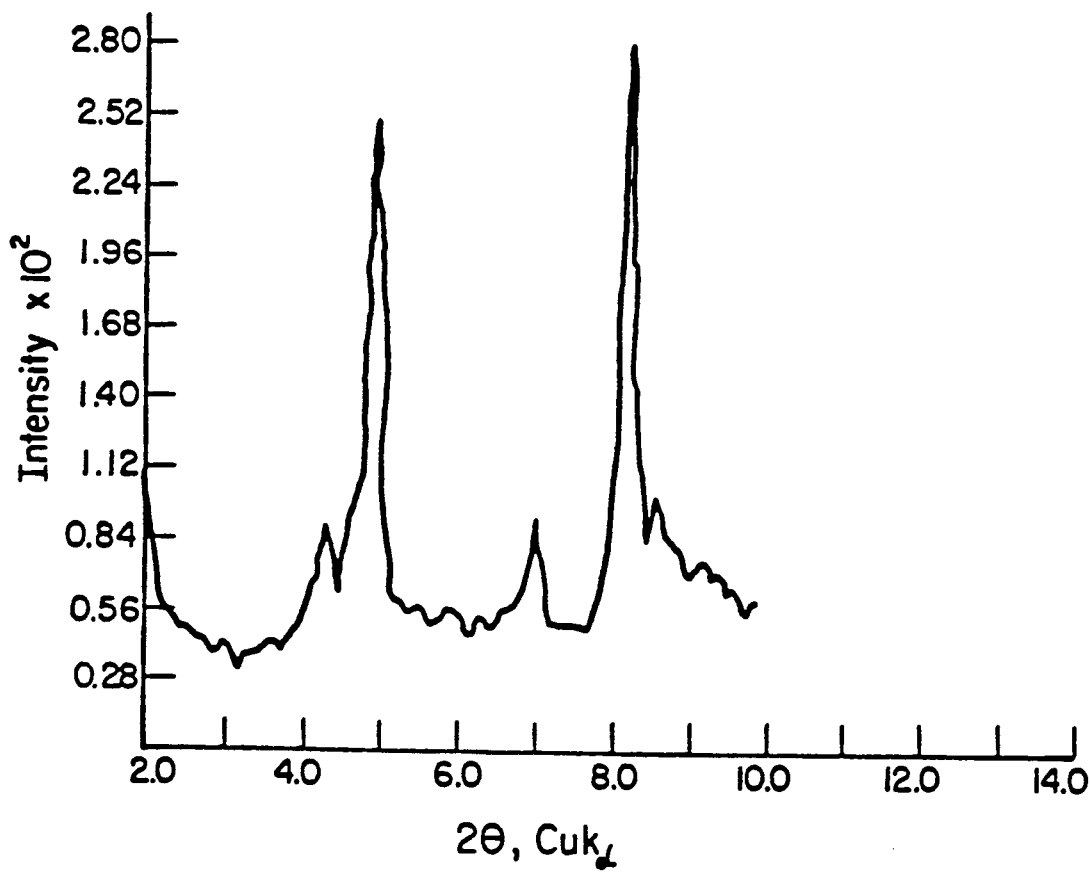
FIG. 23 is an X-ray diffraction scan of an Al-La oligomer.

22 g of Chlorhydrol and 1.5 g of $LaCl_3$ (such that mole ratio of Al:La=26:1) were mixed in a Parr bomb and heated to 130° C. for 88 hours and dried at 60° C. X-ray diffraction scan of this material is shown in FIG. 23.

EXAMPLE 65

Figure 24:
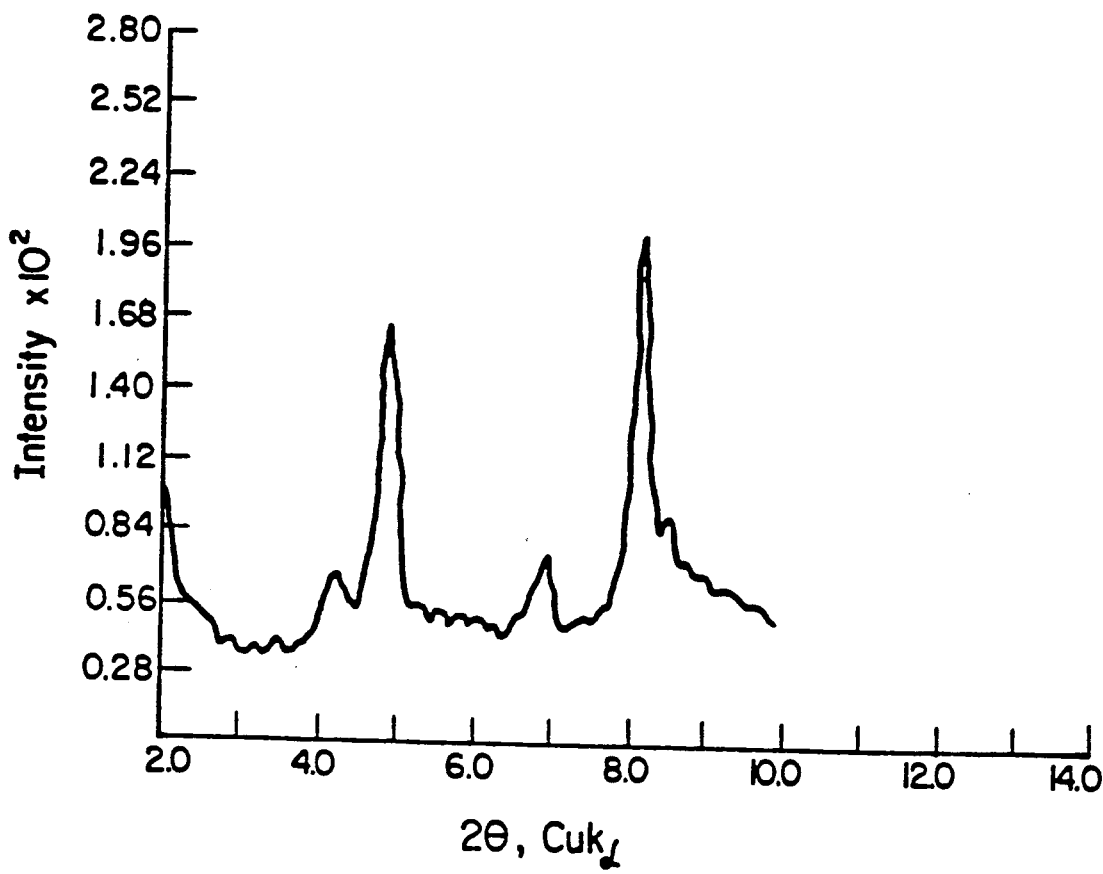
FIG. 24 is an X-ray diffraction scan of an Al-Ce oligomer.

22 g of Chlorhydrol and 1.5 g of $CeCl_3$ (such that mole ratio of Al:Ce=26:1) were mixed in a parr bomb and heated to 130° C. for 88 hours and dried at 60° C. X-ray diffraction scan of this material is shown in FIG. 24.

EXAMPLE 66

Figure 25:
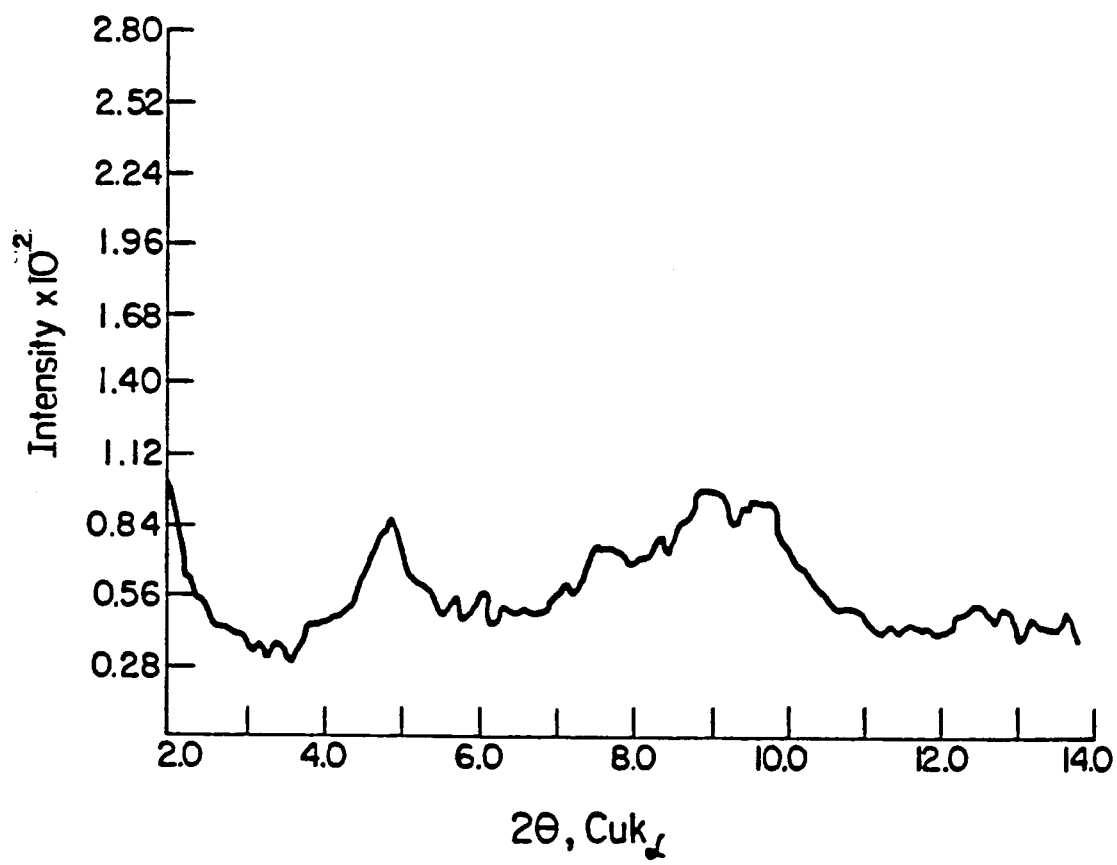
FIG. 25 is an X-ray diffraction scan of Al-Pr oligomer.

22 g of Chlorhydrol and 2.5 g of $Pr(NO_3)_3$ solution (such that mole ratio of Al:Pr=26:1) were mixed in a Parr bomb and heated to 130° C. for 72 hours and dried at 60° C. X-ray diffraction scan of this material is shown in FIG. 25.

EXAMPLE 67

Figure 26:
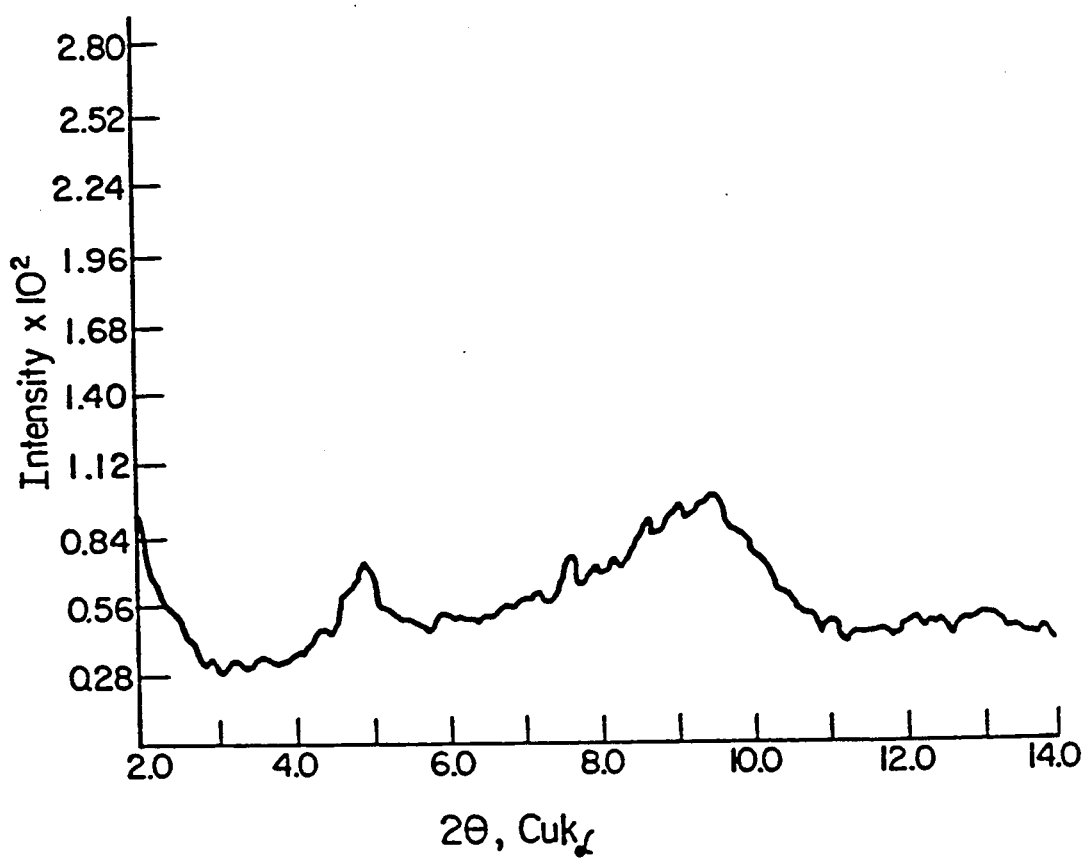
FIG. 26 is an X-ray diffraction scan of Al-Nd oligomer.

22 g of Chlorhydrol and 2.31 g of $Nd(NO_3)_3$ solution (such that mole ratio of Al:Nd=26:1) were mixed in a Parr bomb and heated to 130° C. for 72 hours and dried at 60° C. X-ray diffraction scan of this material is shown in FIG. 26.

EXAMPLE 68

Figure 27:
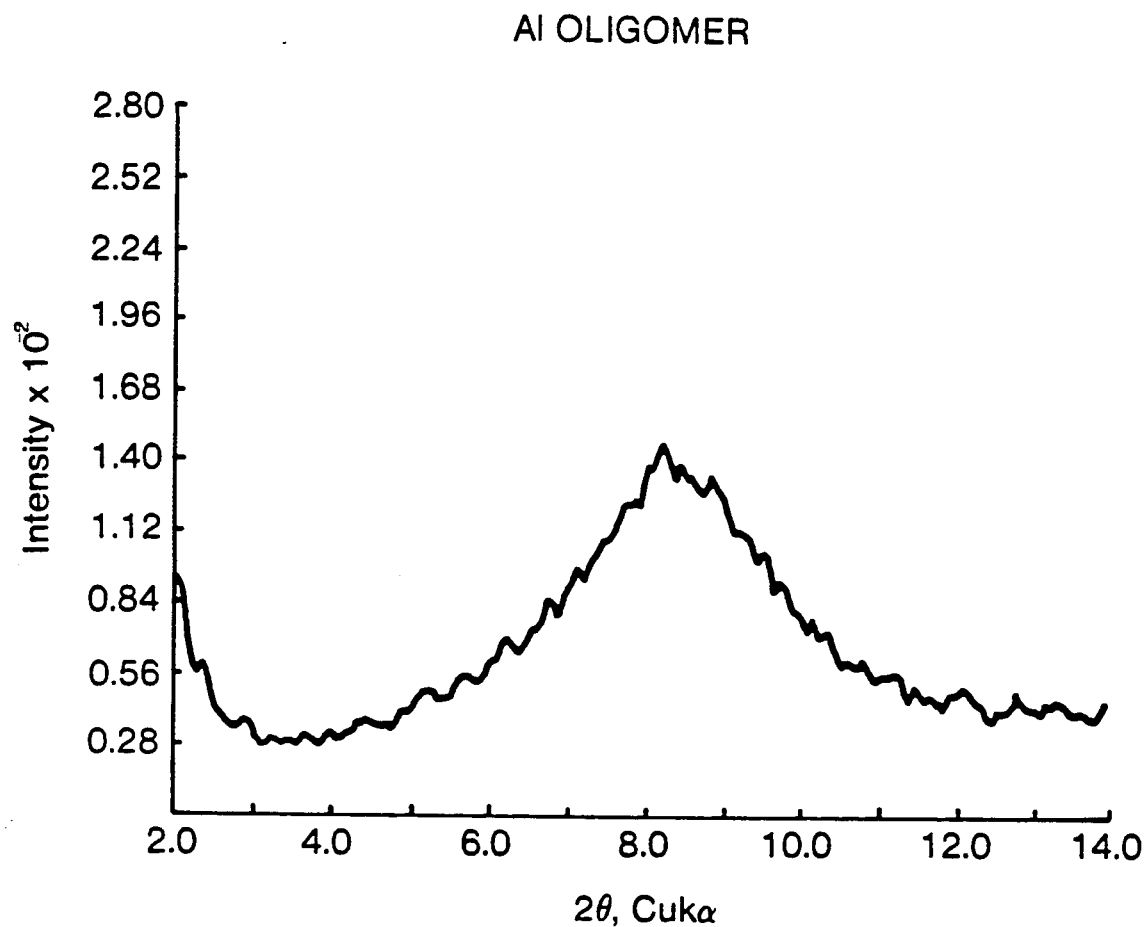
FIG. 27 is an X-ray diffraction scan of Al oligomer.
Figure 28:
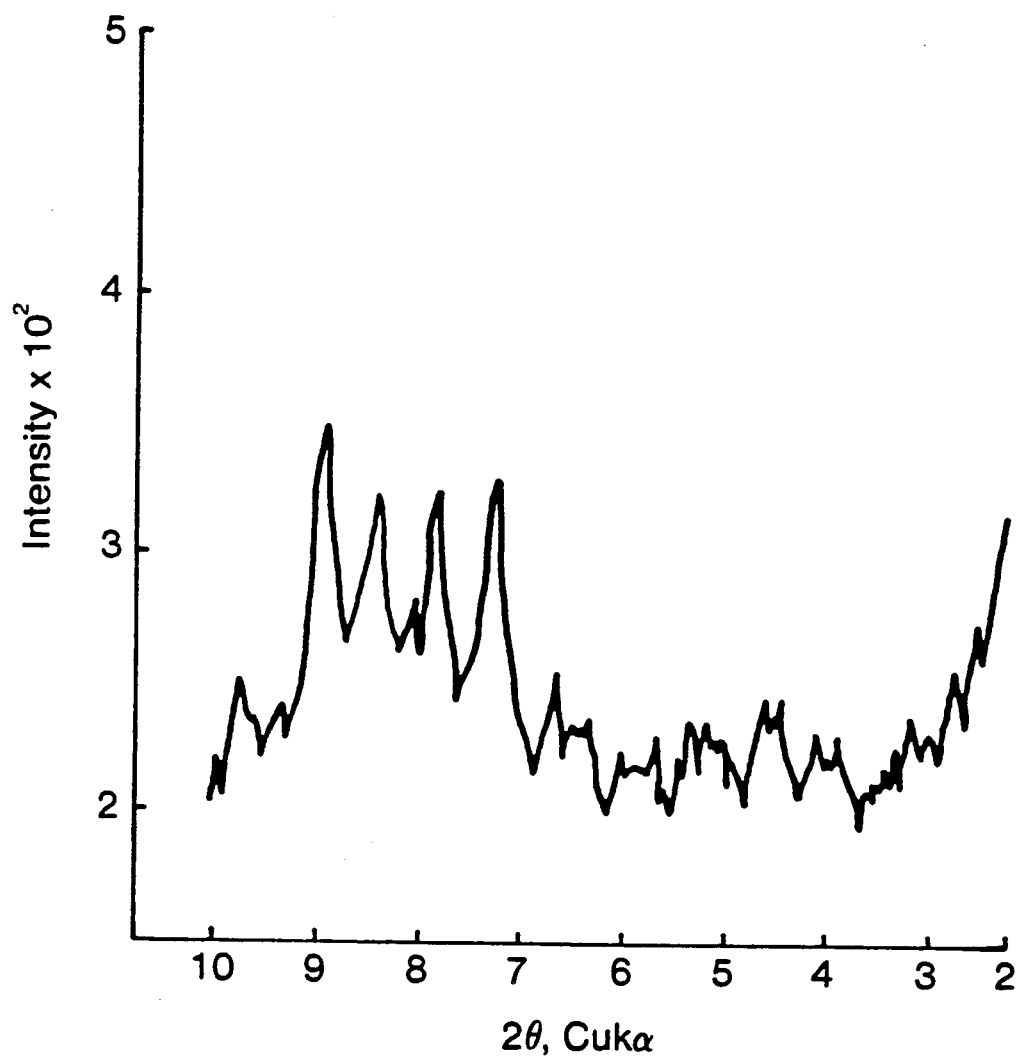
FIG. 28 is an X-ray diffraction scan of pH adjusted Alumina Rare Earth Oligomers.

An X-ray diffraction scan was taken of Chlorhydrol dried at 60° C. and is shown in FIG. 27. Material taken from examples 1 through 4 prior to the bomb treatment exhibited identical X-ray diffraction scans to that of Chlorhydrol only (FIG. 27).

EXAMPLES 69-72

In examples 69 through 72 it is again demonstrated that La is the preferred rare earth in the alumina structure as indicated by the higher conversion and post steam surface area.

EXAMPLE 69

44 g of Chlorhyrol and 3.0 g of $LaCl_3$ (such that mole ratio of Al:La=26:1) were mixed in a Parr bomb and heated to 130° C. for 88 hours. This solution was diluted with 3.5 liters of water to which 68 g of montmorillonite was added and washed until the chloride concentration was 0.67%.

EXAMPLE 70

44 g of Chlorhydrol and 3.0 g of $CeCl_3$ (such that mole ratio of Al:Ce=26:1) were mixed in a Parr bomb and heated to 130° C. for 88 hours. This solution was diluted with 3.5 liters of water to which 68 g of montmorillonite was added and washed until the chloride concentration was 0.64%.

EXAMPLE 71

44 g of Chlorhydrol and 11.0 g of $SmCl_3$ (such that mole ratio of Al:Sm=13:1) were mixed in a Parr bomb and heated to 130° C. for 88 hours. This solution was diluted with 3.5 liters of water to which 68 g of montmorillonite was added and washed until the chloride concentration was 0.11%.

EXAMPLE 72

44 g of Chlorhydrol and 11.1 g of $DyCl_3$ g(such that mole ratio of Al:Dy=13:1) were mixed in a Parr bomb and heated to 130° C. for 88 hours. This solution was diluted with 3.5 liters of water to which 68 g of montmorillonite was added and washed until the chloride concentration was 0.47%.

TABLE XXV

Activity and Post Steamed Surface Areas for Pillared Clay

| Example # | Conversion % | Surface Area[1] $m^2/g$ |
|---|---|---|
| 69 (Al—La) | 64.5 | 220 |
| 70 (Al—Ce) | 61.8 | 198 |
| 71 (Al—Sm) | 47.7 | 78 |
| 72 (Al—Dy) | 20.6 | 21 |

[1]1400° F., 5 hours, 100% steam

The following Example demonstrates that the desired oligomer can be formed from a starting solution containing a mole ratio of aluminum to rare earth of 2.

EXAMPLE 73

A solution containing 10.94 g of NaOH in 97.4 g of water was added to 2585 g of $Ce(No_3)_3$ (23.0% $CeO_2$). Then 1480 g of Chlorhydrol (23.8% $Al_2O_3$) was added (such that the mole ratio Al:Ce=2:1) and brought to reflux. After 12 weeks the solution was cooled and divided into 4 parts for chemical analysis. The first portion contained no precipitate and was found to have a mole ratio of Al:Ce=0.23. The top layer of precipitate had a mole ration of Al:Ce=10. The middle layer of precipitate had a mole ratio of Al:Ce=8.8. And the bottom layer of precipitate had a mole ration of Al:Ce=3.7. precipitate with a mole ratio of Al:Ce=10 was suitable for making pillared clay with $d_{001}$ spacings of 27A.

What is claimed:

1. An intercalated smectite clay having pillars which comprise at least one rare earth metal, said clay characterized by an interlayer spacing greater than about 16 angstroms.

2. The clay of claim 1 wherein the pillars comprise an additional metal chosen from the group consisting of aluminum, zirconium, chromium and iron.

3. The clay of claim 1 wherein the clay has an interlayer spacing of about 16–18 angstroms.

4. An intercalated clay having pillars which comprise a rare earth metal and a metal chosen from the group consisting of aluminum, chromium and zirconium and also characterized by an interlayer spacing of about 16–18 angstroms.

5. The clay of claim 4 wherein the pillars contain cerium or lanthanium.

6. The clay of claim 4 wherein the pillars comprise aluminum and cerium.

7. The clay of claim 6 wherein said clay is a smectite clay.

8. The clay of claim 4 wherein the clay contains at least one metal chosen from the group consisting of molybdenum, tungsten, platinum, nickel and cobalt.

9. The clay of claim 4 wherein the clay is montmorillonite, bentonite, hectorite, beidellite, saponite, nontronite or sauconite.

10. The clay of claim 4 wherein the clay is fluorhectorite.

11. A composition comprising a zeolite and an intercalated clay having an interlayer spacing greater than about 16 angstroms, with the clay having pillars which comprise a rare earth metal and a pillaring metal chosen from the group consisting of aluminum, zirconium, chromium and iron.

12. The composition of claim 11 wherein the rare earth metal is cerium.

13. The composition of claim 11 wherein the rare earth metal is lanthanum.

14. The composition of claim 11 wherein the interlayer spacing is less than about 40 angstroms.

* * * * *